US010560955B2

(12) United States Patent
Shoshan et al.

(10) Patent No.: US 10,560,955 B2
(45) Date of Patent: Feb. 11, 2020

(54) APPARATUS AND METHODS FOR MOVING RELAY INTERFERENCE MITIGATION IN MOBILE E.G. CELLULAR COMMUNICATION NETWORKS

(71) Applicant: ELTA SYSTEMS LTD., Ashdod (IL)

(72) Inventors: Yaakov Shoshan, Ashkelon (IL); Adi Schwartz, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/396,282

(22) PCT Filed: Apr. 22, 2013

(86) PCT No.: PCT/IL2013/050345
§ 371 (c)(1),
(2) Date: Oct. 22, 2014

(87) PCT Pub. No.: WO2013/160892
PCT Pub. Date: Oct. 31, 2013

(65) Prior Publication Data
US 2015/0351116 A1    Dec. 3, 2015

(30) Foreign Application Priority Data

Apr. 22, 2012  (IL) .......................................... 219328
Aug. 6, 2012   (IL) .......................................... 221322
Oct. 21, 2012  (IL) .......................................... 222563

(51) Int. Cl.
*H04W 72/12*  (2009.01)
*H04J 4/00*   (2006.01)
(Continued)

(52) U.S. Cl.
CPC .......... *H04W 72/1226* (2013.01); *H04J 4/00* (2013.01); *H04L 5/0005* (2013.01);
(Continued)

(58) Field of Classification Search
None
See application file for complete search history.

(56) References Cited

U.S. PATENT DOCUMENTS 5,657,317 A   8/1997  Mahany et al.
5,729,826 A   3/1998  Gavrilovich
(Continued)

FOREIGN PATENT DOCUMENTS

EP   0 942 615       9/1999
WO      0018052 A1   3/2000
(Continued)

OTHER PUBLICATIONS

Alcatel-Lucent, et al., Technology Issues for Heterogeneous Network for LTE-A, Oct. 12-16, 2009, pp. 1-5.
(Continued)

*Primary Examiner* — Faruk Hamza
*Assistant Examiner* — Alan L Lindenbaum
(74) *Attorney, Agent, or Firm* — Browdy and Neimark, PLLC

(57) ABSTRACT

A system for multicarrier cellular communication in a cellular network including a multiplicity of nodes, the system comprising, at an individual moving relay from among the multiplicity of nodes, an rBS having downlink communication, according to a protocol, with UEs served thereby; and a co-located rRM (relay Resource Manager) having a controller; wherein the controller is operative to induce the rBS to generate a selective minimally interfered region in a domain and/or to coordinate between schedulers in the relay to ensure that each user has its own time and/or frequency such that channels do not overlap because time and/or frequency are shifted to prevent the overlap.

39 Claims, 40 Drawing Sheets

(51) Int. Cl.
*H04W 72/04* (2009.01)
*H04L 5/00* (2006.01)

(52) U.S. Cl.
CPC ....... *H04L 5/0092* (2013.01); *H04W 72/0446* (2013.01); *H04W 72/0453* (2013.01)

(56) References Cited

U.S. PATENT DOCUMENTS

| | | | |
|---|---|---|---|
| 6,137,444 | A | 10/2000 | Pettersson et al. |
| 6,278,881 | B1 | 8/2001 | Balck |
| 6,408,005 | B1 | 6/2002 | Fan et al. |
| 6,424,678 | B1 | 7/2002 | Doberstein et al. |
| 7,103,644 | B1 | 9/2006 | Zhang et al. |
| 7,383,049 | B2 | 6/2008 | Deloach et al. |
| 7,471,626 | B2 | 12/2008 | Naghian et al. |
| 8,583,137 | B2 | 11/2013 | Rezaiifar et al. |
| 8,711,716 | B2 | 4/2014 | Chen et al. |
| 2002/0187762 | A1 | 12/2002 | Whikehart et al. |
| 2004/0136345 | A1 | 7/2004 | Yano et al. |
| 2005/0122999 | A1 | 6/2005 | Scherzer et al. |
| 2005/0197122 | A1 | 9/2005 | Sliva |
| 2005/0255851 | A1 | 11/2005 | Schreiber |
| 2007/0076681 | A1* | 4/2007 | Hong ................ H04L 29/12216 370/349 |
| 2008/0031197 | A1 | 2/2008 | Wang et al. |
| 2008/0140628 | A1 | 6/2008 | Ubalde et al. |
| 2008/0274759 | A1* | 11/2008 | Chen ................... H04W 72/005 455/507 |
| 2009/0052319 | A1 | 2/2009 | Muqattash et al. |
| 2009/0096663 | A1 | 4/2009 | Thomas et al. |
| 2009/0219854 | A1* | 9/2009 | Okuda ................... H04B 7/155 370/315 |
| 2009/0245165 | A1 | 10/2009 | Li |
| 2009/0312030 | A1 | 12/2009 | Lee et al. |
| 2010/0015983 | A1 | 1/2010 | Anigstein |
| 2010/0056170 | A1* | 3/2010 | Lindoff ................ H04L 1/0026 455/452.1 |
| 2010/0080139 | A1* | 4/2010 | Palanki ................ H04B 7/2606 370/252 |
| 2010/0081442 | A1 | 4/2010 | Kronestedt et al. |
| 2010/0120392 | A1 | 5/2010 | Youn et al. |
| 2010/0185743 | A1 | 7/2010 | Berggren et al. |
| 2010/0220645 | A1 | 9/2010 | Kwon et al. |
| 2010/0234071 | A1 | 9/2010 | Shabtay et al. |
| 2010/0260113 | A1 | 10/2010 | Liu et al. |
| 2011/0034212 | A1 | 2/2011 | Gavrilovich |
| 2011/0038284 | A1 | 2/2011 | Senarath et al. |
| 2011/0044183 | A1 | 2/2011 | Huang et al. |
| 2011/0151790 | A1 | 6/2011 | Khandekar et al. |
| 2011/0170437 | A1 | 7/2011 | Zhou et al. |
| 2011/0305183 | A1 | 12/2011 | Hsu et al. |
| 2011/0310791 | A1 | 12/2011 | Prakash et al. |
| 2011/0310802 | A1 | 12/2011 | Song et al. |
| 2013/0059585 | A1* | 3/2013 | Giloh ..................... H04L 45/54 455/436 |

FOREIGN PATENT DOCUMENTS

| | | | |
|---|---|---|---|
| WO | 2007136220 | A1 | 11/2007 |
| WO | 2009112809 | A1 | 9/2009 |
| WO | 2012120510 | A2 | 9/2010 |
| WO | 2011092698 | A1 | 8/2011 |
| WO | 2012070044 | A1 | 5/2012 |
| WO | 2012070045 | A2 | 5/2012 |
| WO | 2012070048 | A1 | 5/2012 |
| WO | 2012070049 | A1 | 5/2012 |
| WO | 2012120515 | A2 | 9/2012 |
| WO | 2012120519 | A1 | 9/2012 |

OTHER PUBLICATIONS

Liang, et al., A Game-Theoretic Framework for Interference Coordination in OFDMA Relay Networks, IEEE Transactions on Vehicular Technology, Jan. 2012, pp. 321-332, vol. 61, No. 1.
Sharp, Information exchange over a wireless X2 interface between relay nodes, 3GPP RSG RAN WG2 Meeting #6, San Francisco, May 4-8, 2009, pp. 1-3.
TSG RAN WG3, LS about TDD Synchronisation Methods, TSGR3#6(99)A43, TSG-RAN Working Group 3 meeting #6, Sophias Antipolis, France, Aug. 23-27, 1999, pp. 1-6.
S. Sesia et al., LTE—the UMTS long term evolution: from theory to practice. John Wiley & Sons (2011).
R. Zekavat et al., Handbook of position location: Theory, practice and advances (vol. 27). John Wiley & Sons (2011).
Stefania et al "LTE: the UMTS long term evolution".Theory of Practice. New York: John Wiley & Sons, 1-794 (2011).
Wikipedia "Multicast-broadcast single-frequency network" https://en.wikipedia.org/w/index.php?title=Multicast-broadcast_single-frequency_network&oldid=474160489, 1-2 (Jan. 31, 2012).
Wikipedia "Multimedia Broadcast multicast Service" http://en.wikipedia.org/w/index.php?title=Multimedia_Broadcast_Multicast_Service&oldid=462172966, 1-3 (Nov. 23, 2011).
IBM "User Interface for Controlling and Originating One-to-One, One-to-Many, Many-to-One, and Many-to-Many Communication Sessions". Technical Disclosure. IPCOM000029026D. 1-2(Jun. 2004).
3GPP TS 36.806 3rd Generation Partnership Project; Technical Specification Group Radio Access Newtwork; Evolved Universal Terrestrial Radio Access (E-UTRA); Relay architectures for E-UTRA (LTE-Advanced) (Release 9) Technical Report (Mar. 2010).
3gpp "The Mobile Broadband Standard" http://www.3gpp.org/specifications (Feb. 2012).

* cited by examiner

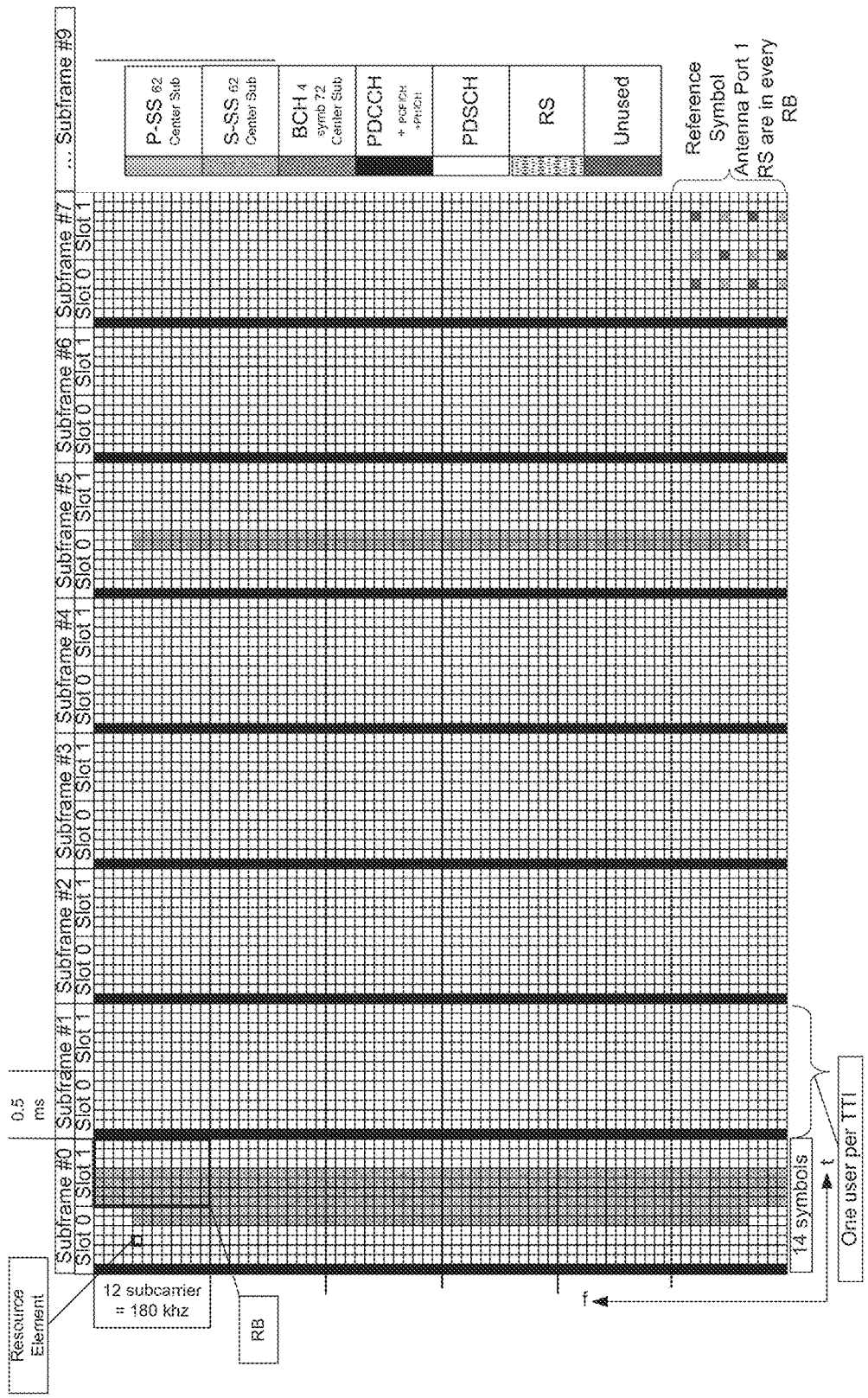

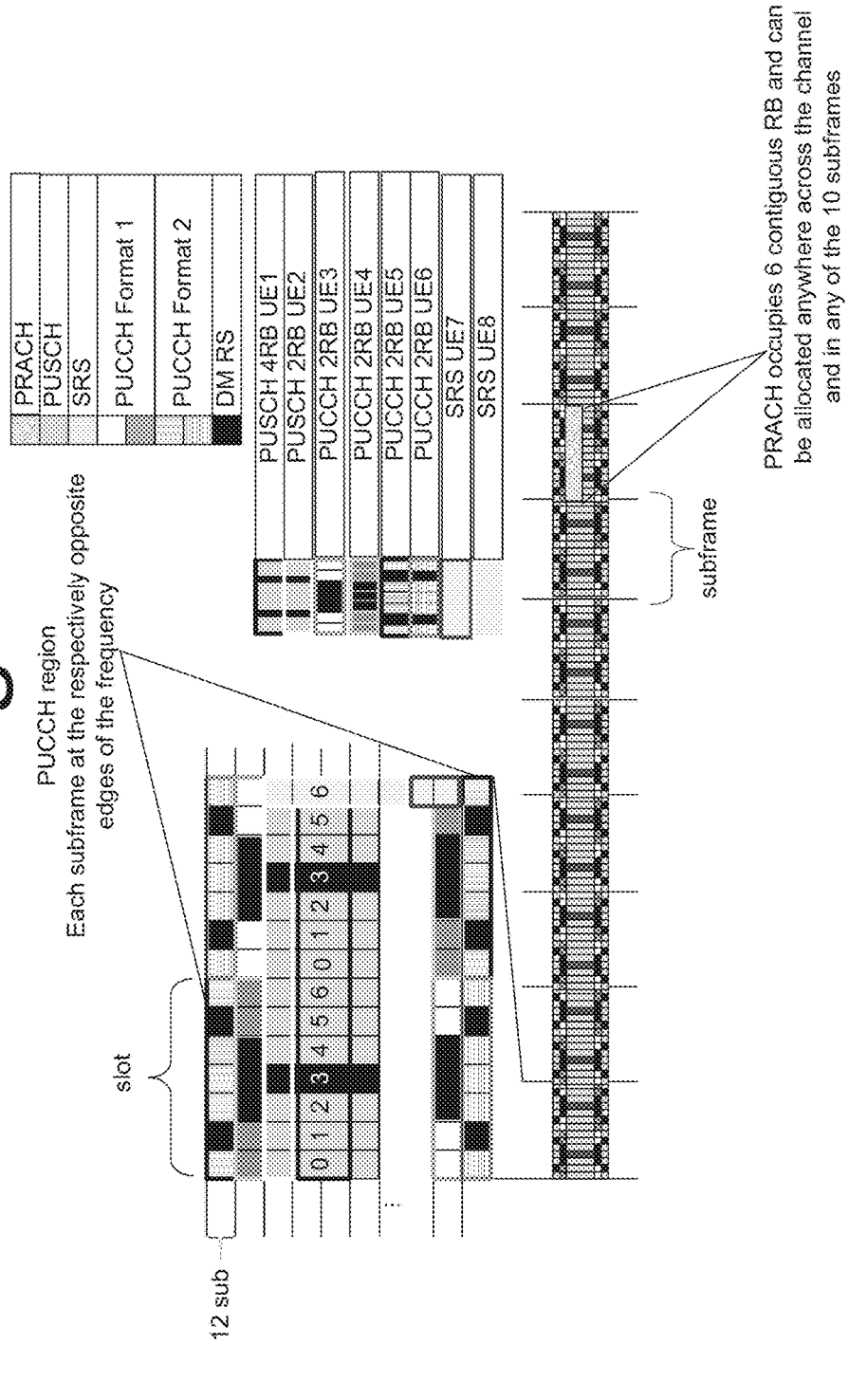

Fig. 3

| Radio link | Channel type | Channel | Physical Channel | Purpose |
|---|---|---|---|---|
| Uplink | TrCh (between MAC and Phy) | UL-SCH | PUSCH | Carries user UL data |
| | | RACH | PRACH | UE establish connection |
| | Control Information | UCI (Uplink Control Information) | PUSCH | Scheduling request, HARQ, CQI |
| | | | PUCCH | |
| Downlink | TrCh | DL-SCH | PDSCH | Carries user UL data / RRC |
| | | BCH | PBSCH | MIB |
| | | PCH | PDSCH | Paging |
| | | MCH | PMCH | Multicast |
| | Control Information | CFI (Control Format Indicator) | PCFICH | Number of symbols are used for PDCCH in a subfr |
| | | HI( HARQ Indicator) | PHICH | Ack/Nack feedback to the UE for the uplink blocks |
| | | DCI (Downlink Control Information) | PDCCH | PUSCH grant, PDSCH assignment, |
| | | | P-SS S-SS | Synchronization |
| | | | RS | Channel estimation |

Prior Art

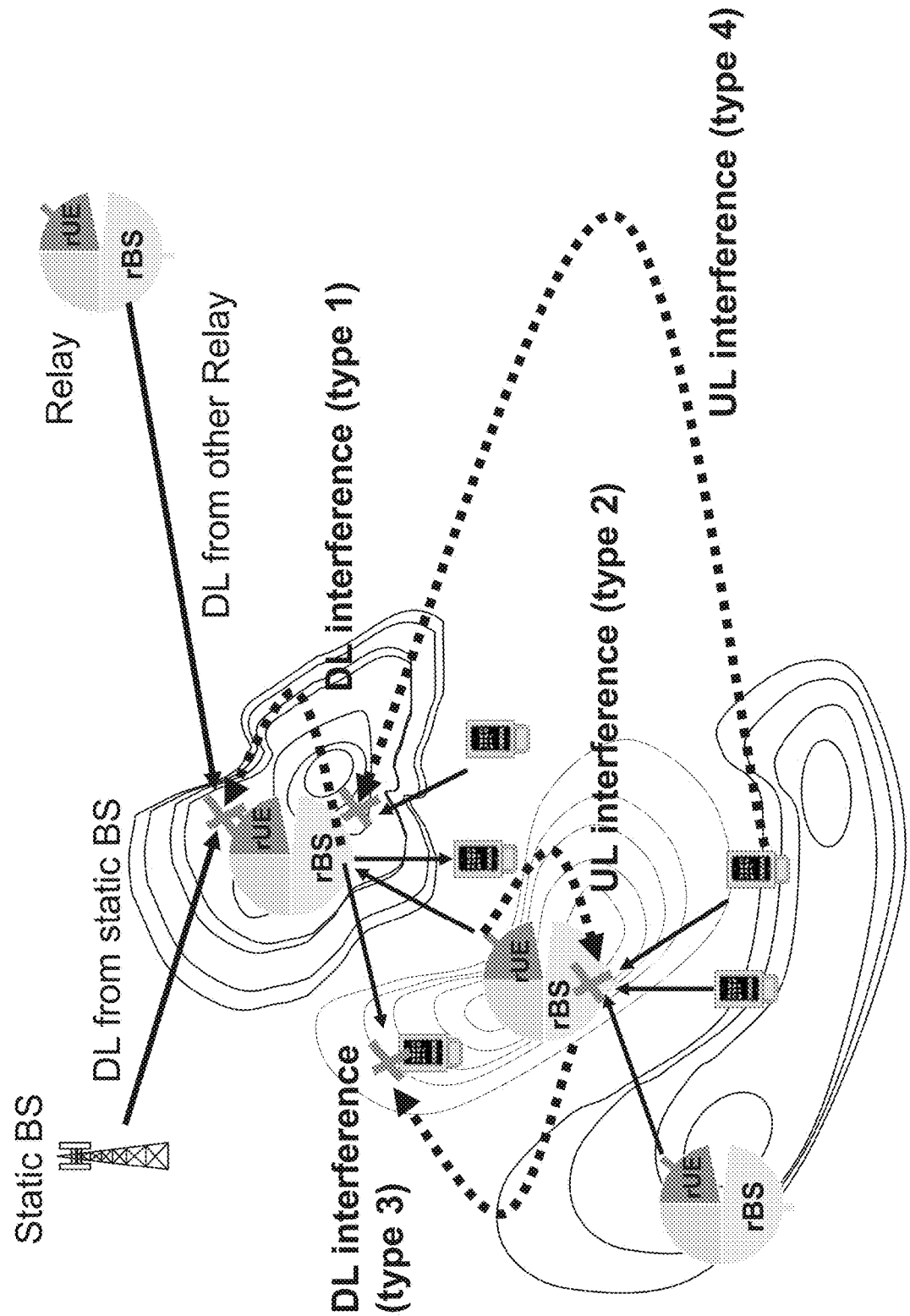

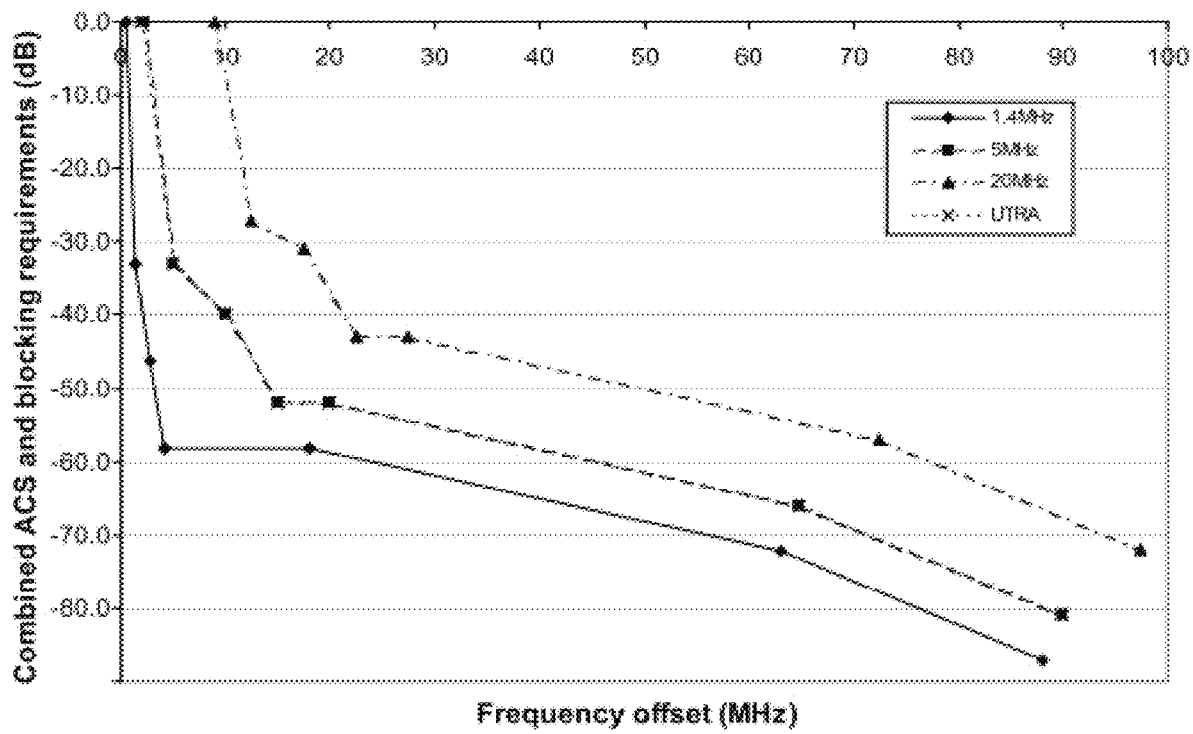

Figure 4-10: Inter-carrier interference coupling mechanism.

The 3GPP specifications define separate sets of values for the above parameters for base stations and user equipments. A summary of the values is given in Table 4-3.

Table 4-3: Transmitting and receiving imperfection limits defined by 3GPP.

| | ACLR | ACS |
|---|---|---|
| Base station [3GPP36104] | 45 dB | 46 dB |
| User equipment [3GPP36101] | 30 dB | 33 dB |

Fig. 8: prior art

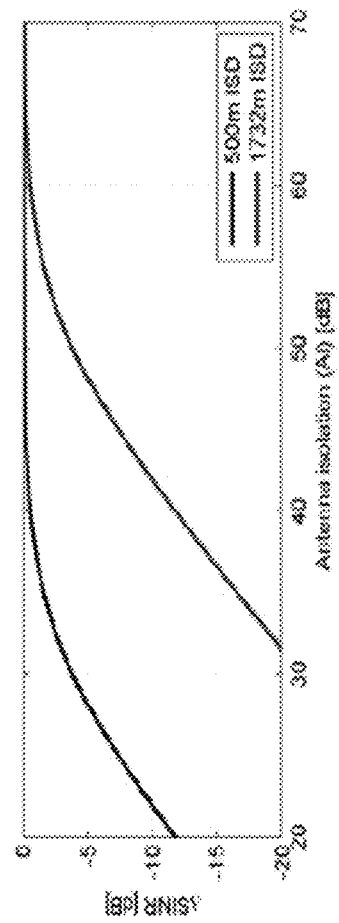

Table 4-4: Typical radio conditions on RN backhaul links without the loop interference.

| | Received backhaul link signal power (S) | Backhaul link signal quality (SINR₀) |
|---|---|---|
| 3GPP Case 1 (ISD = 500 m) | -44 dBm | 16 dB |
| 3GPP Case 3 (ISD = 1732 m) | -64 dBm | 16 dB |

¹⁾ Based on system level simulations done according to the 3GPP defined and ARTIST4G WP5 accepted simulation assumptions [3GPP36814][ARTD51]

By substituting the parameters in equation (4.10) with the values from Table 4-4, $P_{RN}$ = 13 dBm/PRB and ACIR = 42.5 dB, the calculated RN backhaul link signal quality degradation as a function of RN antenna isolation is as depicted in Figure 4-12.

Figure 4-12: Out-band RN backhaul link signal quality degradation caused by inter-carrier loop interference.

Fig. 9
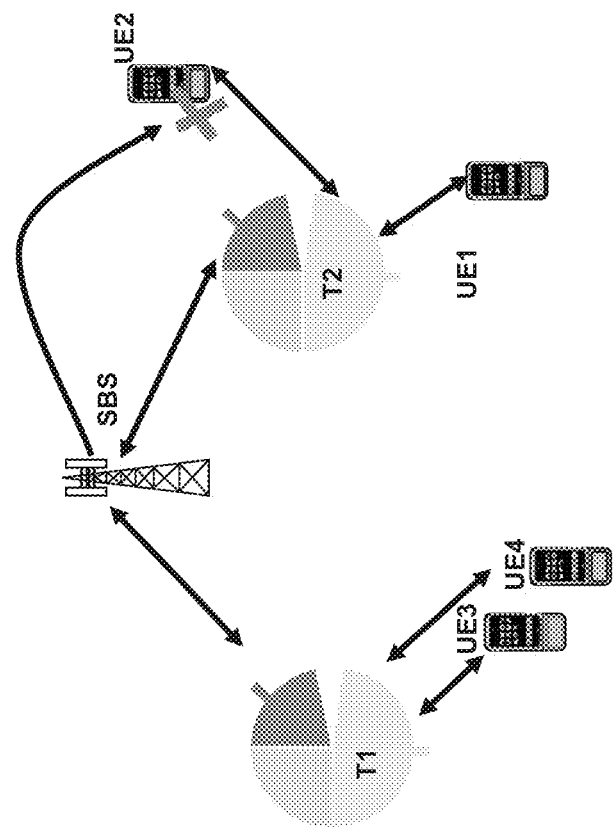
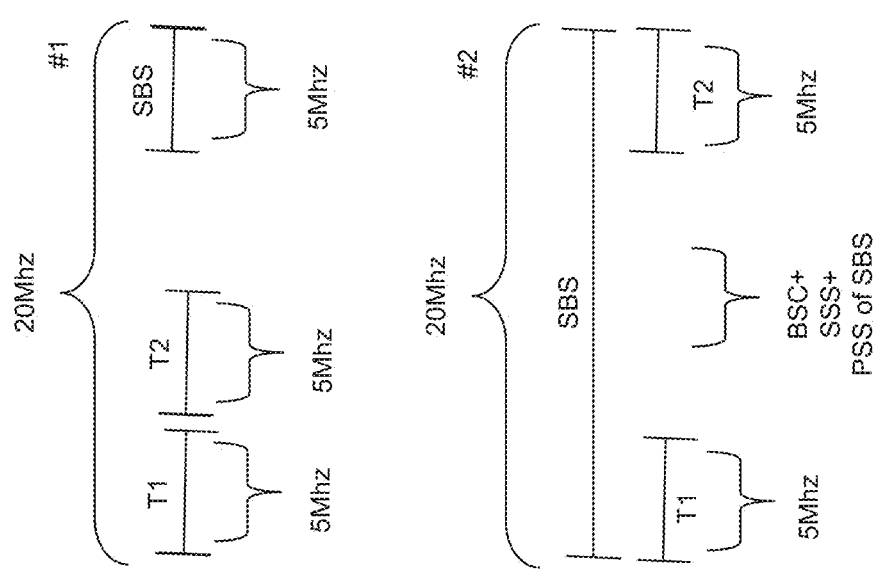

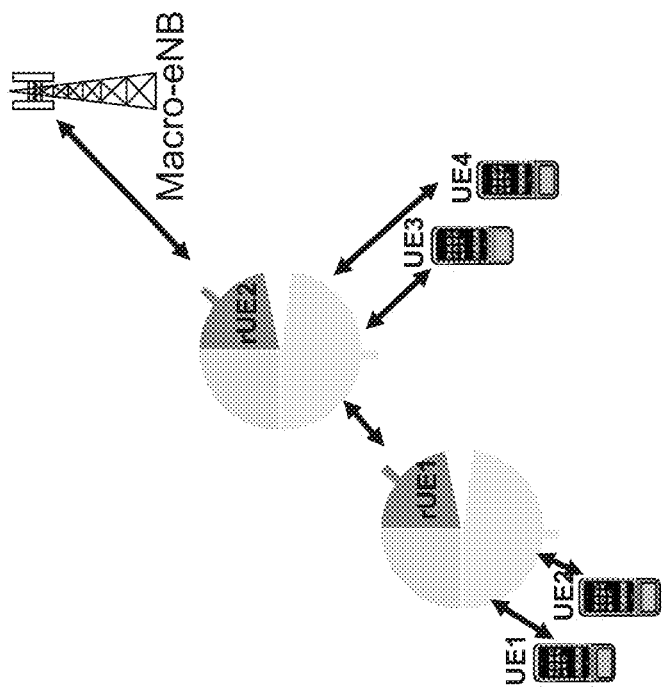

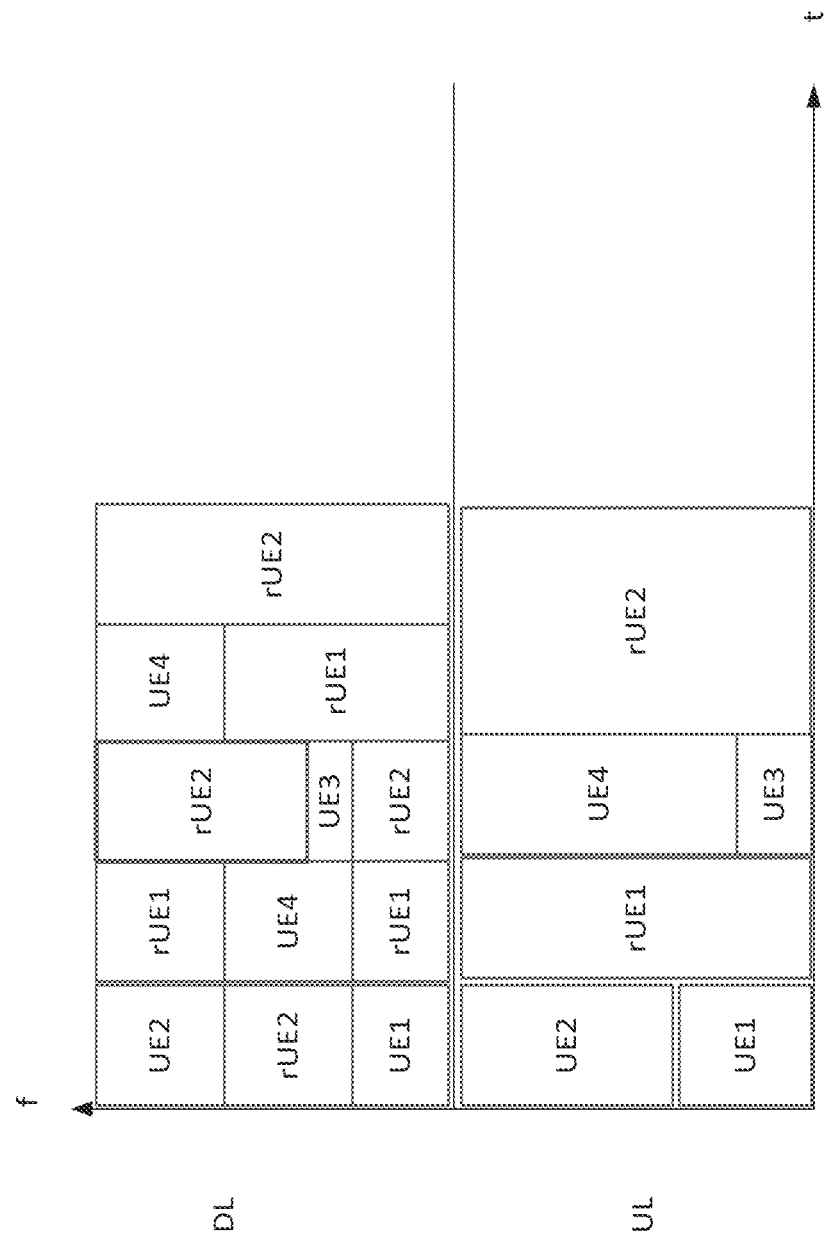

Figure 13.2: EPS reference architecture for MBMS broadcast mode [1]. Reproduced by permission of © 3GPP.

Prior Art

Figure 13.8: LTE protocol extensions to support MBMS.

Prior Art

Fig. 18

| 0 | 1 | 2 | 3 | 4 | 5 | 6 | 7 | 8 | 9 |
|---|---|---|---|---|---|---|---|---|---|
| x | MBSFN Enabled | MBSFN Enabled | MBSFN Enabled | x | x | MBSFN Enabled | MBSFN Enabled | MBSFN Enabled | x |

FDD

| 0 | 1 | 2 | 3 | 4 | 5 | 6 | 7 | 8 | 9 |
|---|---|---|---|---|---|---|---|---|---|
| x | x | x | MBSFN Enabled | MBSFN Enabled | x | x | MBSFN Enabled | MBSFN Enabled | x |

TDD

Prior Art

APPARATUS AND METHODS FOR MOVING RELAY INTERFERENCE MITIGATION IN MOBILE E.G. CELLULAR COMMUNICATION NETWORKS

REFERENCE TO CO-PENDING APPLICATIONS

Priority is claimed from:

Israeli Patent Application No. 219328 entitled "Apparatus And Methods For Moving Relay Interference Mitigation In Mobile e.g. Cellular Communication Networks" filed 22 Apr. 2012.

Israel Patent Application No. 221322 entitled "Advanced multi-directional relay architecture and apparatus and methods of operation useful in conjunction therewith" and filed 6 Aug. 2012.

Israeli Patent Application No. 222563 "Controller generating selective low-interference mobile phone reception region".

FIELD OF THIS DISCLOSURE

The present invention relates generally to mobile communication networks and more particularly to mobile communication networks whose base stations are not stationary.

BACKGROUND FOR THIS DISCLOSURE

Published PCT Application No. WO2011092698 describes a cellular communication system with moving base stations and methods and apparatus useful in conjunction therewith.

"LTE, The UMTS Long Term Evolution: From Theory to Practice", by Wiley, is a treatise on certain aspects of mobile (LTE, e.g.) communications. Certain of the prior art drawings in this application are taken from this treatise, e.g. from the 2011 version.

The disclosures of all publications and patent documents mentioned in the specification and materials appended thereto, and of the publications and patent documents cited therein directly or indirectly, are hereby incorporated by reference.

SUMMARY OF CERTAIN EMBODIMENTS

Certain embodiments of the present invention seek to provide apparatus and methods useful for enhanced moving relay interference mitigation in mobile e.g. cellular networks.

Certain embodiments of the present invention seek to provide moving relay interference mitigation in mobile e.g. cellular networks using Time and Frequency Separation which may be algorithmic.

Certain embodiments of the present invention seek to provide moving relay interference mitigation in mobile e.g. cellular networks using Separation Via a Dedicated Scheduler.

Certain embodiments of the present invention seek to provide moving relay interference mitigation in mobile e.g. cellular networks using Separation in Time Using MBSFN Channels.

Certain embodiments of the present invention seek to provide moving relay interference mitigation in mobile e.g. cellular networks using Separation Via a Dedicated Scheduler Integrated with MBSFN-based separation.

Certain embodiments of the present invention seek to provide an improved radio resource subsystem which may reside within a moving relay's relay resource manager. The radio resource subsystem may include a radio resource manager.

Certain embodiments of the present invention seek to provide alternative schemes for using radio resources allocations/manipulations to mitigate interferences which might otherwise hamper operation of the moving relays network. Radio resources may include some or all of: center frequency, bandwidth, time (e.g. frame timing), transmitted power, antenna beam. Using certain radio resources allocations/manipulations to mitigate interferences in conventional networks which lack moving relays, is known.

Certain embodiments of the present invention are particularly suited to moving relays which are more compact than conventional relays such as LTE standard or artist4G relays in which, often, only 60-80 dB of isolation/separation are needed.

Certain embodiments of the present invention seek to provide isolation/separation in a moving relay network at a level of 100-120 dB. (whereas in others only 60-80 dB is needed).

Certain embodiments of the present invention seek to provide a relay e.g. as per co-pending patent applications of Applicant, in which, typically, at least some nodes include an rRM, an RBS and an rUE and in which NOISE FROM ADJACENT NODES is reduced by employing, at certain times, an rRM-controllable channel (such as mbssn channel) to which blank content has been assigned.

Embodiments may for example include:

Embodiment 1

A system for cellular communication in a cellular network including a multiplicity of nodes, the system comprising:

at an individual node from among the multiplicity of nodes, an rBS having downlink communication, according to a protocol, with UEs served thereby;

a co-located rRM having a controller;

wherein said controller is operative to induce said rBS to generate a selective quiet region in a domain by:

instructing the rBS to employ an rRM-controllable channel whose content the rRM controls, for downlink communication in said region; and assigning blank content to said rRM-controllable channel for downlink communication in said region.

Embodiment 2

A system according to Embodiment 1 wherein said rRM-controllable channel comprises a single-frequency channel and said domain comprises a time-domain.

Embodiment 3

A system according to Embodiment 1 wherein said protocol comprises a 3GPP protocol operating in MBMS broadcast mode, said rBS comprises an eNB, and said rRM comprises an MCE.

Embodiment 4

A system according to Embodiment 3 wherein said rRM-controllable channel comprises an MBSSN channel.

Embodiment 5

A system according to Embodiment 1 wherein the individual node also comprises an rUE and wherein at least one additional node within the multiplicity of nodes is close enough to said individual node such that an additional rBS residing at the additional node communicates with said rUE, and wherein said individual node's controller is also operative to induce said additional rBS to generate a selective quiet region in a domain by:

instructing the additional rBS, via the individual node's rUE, to employ an rRM-controllable channel for downlink communication in said region, wherein said rRM-controllable channel's content is controlled by an additional rRM residing at the additional node; and via the individual node's rUE, instructing the additional rRM to assign blank content to said rRM-controllable channel for downlink communication in said region.

Embodiment 6

A system according to Embodiment 5 wherein said individual node's controller is operative to induce said additional rBS to generate a selective quiet region in a domain only if a predetermined rule stipulates that the individual node is responsible for inducing said additional rBS to generate a selective quiet region.

Embodiment 7

A system according to Embodiment 6 wherein the said individual node's controller is operative to determine whether it is the individual node, or some other node, which is responsible for inducing said additional rBS to generate a selective quiet region, by comparing said individual node to at least one characteristic of at least one other node, obtained from the individual node's rUE.

Embodiment 8

A system according to Embodiment 1 wherein said selective quiet region is selected to enable the individual node's rBS to communicate with UEs served thereby and also to enable nodes within interference range of the individual node to communicate with UEs served by the nodes respectively, all without interference.

Embodiment 9

A system according to Embodiment 1 wherein said rBS is operative to determine content of at least one control channel, so as to ensure that the rRM-controllable channel is employed for downlink communication in said region.

Embodiment 10

A system according to Embodiment 7 wherein said characteristic comprises a Cell ID and wherein said predetermined rule stipulates, for a given set of Cell IDs, which Cell ID in the set, hence which node's controller, is responsible for inducing said additional rBS to generate a selective quiet region.

Embodiment 11

A system according to Embodiment 10 wherein said set of Cell IDs comprises all Cell IDs of a set of potentially mutually interfering nodes including the individual node and the nodes currently within interference range of the individual nodes, and wherein the controller of the node whose Cell ID is responsible according to said rule, is operative to induce rBS s of each node whose Cell ID is included in said set of Cell IDs, to generate quiet regions selected to enable the individual node's rBS to communicate with UEs served thereby and also to enable nodes within interference range of the individual node to communicate with UEs served by the nodes respectively, all without interference.

Embodiment 12

A system according to Embodiment 7 wherein an individual node's rBS is operative to broadcast said characteristic in a region which is at least partly randomly selected, thereby to ensure that statistically, nodes within a communication range each broadcast said characteristic at a different time.

Embodiment 13

A system according to Embodiment 7 wherein an individual node's rBS is operative to broadcast said characteristic in a region which is at least partly selected to facilitate parsimonious allocation of the domain.

Embodiment 14

A system according to Embodiment 12 wherein an individual node's rBS is operative to broadcast said characteristic in a region which is a first region which conforms to at least one requirement, thereby to facilitate parsimonious allocation of the domain.

Embodiment 15

A system according to Embodiment 14 wherein said requirement includes ensuring that control information broadcast by one of several nodes within a communication range, does not override control information broadcast by any other one of the nodes within the communication range.

Embodiment 16

A system according to Embodiment 14 wherein said region is defined within a time domain and wherein an individual node's rBS is operative first to wait an entire frame to determine which subframes are available given other nodes within communication range and in a frame succeeding said entire frame, to broadcast said characteristic within a first subframe from among said subframes found to be available after waiting a random time period.

Embodiment 17

A system according to Embodiment 15 wherein said region is defined within a time domain and wherein an individual node's rBS is operative first to wait an entire frame to determine which subframes are available given other nodes within communication range and in a frame succeeding said entire frame, to broadcast said characteristic at a delayed location, within a first subframe from among said subframes found to be available after waiting a random time period, wherein said delayed location is selected to adhere to said requirement.

Embodiment 18

A system according to Embodiment 3 wherein said 3GPP protocol comprises an LTE protocol.

Embodiment 19

A system according to Embodiment 1 wherein according to the protocol, at least one compulsory control channel is used for downlink communications and wherein said rRM-controllable channel is selected to be a channel which minimizes content travelling over the compulsory control channel at least when blank content is assigned to rBS-controllable channel.

There is also provided, according to certain embodiments, a system for multicarrier cellular communication in a cellular network including a multiplicity of nodes, the system comprising: at an individual moving relay from among the multiplicity of nodes, an rBS having downlink communication, according to a protocol, with UEs served thereby; and a co-located rRM (relay Resource Manager) having a controller; wherein the controller is operative to induce the rBS to generate a selective minimally interfered region in a domain and/or to coordinate between schedulers in the relay to ensure that each user has its own time and/or frequency such that channels do not overlap because time and/or frequency are shifted to prevent said overlap.

Certain embodiments of the present invention seek to provide a system e.g. as above which employs an algorithm of frequency and bandwidth allocation including any or all of the steps depicted in FIGS. 6a-b and 9.

The subject matter of the invention further contemplates a counterpart method and corresponding embodiments, mutatis mutandis.

The following terms may be construed either in accordance with any definition thereof appearing in the prior art literature or in accordance with the specification, or as follows:

access link: a bi-directional link between a relay node (RN) base station functionality and a mobile station (MS) served thereby or between a base station and a mobile station served thereby. It typically has an uplink portion and a downlink portion, both uni-directional.

Backhaul data: data being transferred, typically bi-directionally, over at least one backhauling link.

Backhauling link: bi-directional link other than an access link e.g. link between relays in adjacent levels or link between relay and static base station or link between relays and relay proxy or link between base station functionality or static base station or relay proxy and core. More generally, a backhauling link bi-directionally links distributed sites to each other or links access points e.g. base stations and a more centralized point e.g. a core. Typically a backhauling link has an uplink portion and a downlink portion, both uni-directional.

base station: one of a plurality of stationary or mobile nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base stations and mobile communication devices.

base station functionality: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base stations and mobile communication devices.

bi-directional link: a link between levels of a hierarchical communication network which includes both an uplink and a downlink.

cell: base station.

core: server in a cellular communication system that performs some or all of the following functions: (1) connects between mobile station (MS)s that are attached to the same core; and/or (2) connects between mobile station (MS)s that are attached to one core with mobile station (MS)s that are attached to a different core; and/or (3) connects mobile station (MS)s attached to the core to other servers such as an Internet server, terrestrial communication network servers, video servers, gaming servers (not shown), (4) managing mobility of the mobile stations, (5) managing quality of service for the mobile stations, (6) managing and controlling policies and billing of the mobile stations, (7) managing security aspects of the network (e.g. authentication, integrity, encryption).

Core Network: synonym for "core" or core plus network linked thereto, or core elements performing some or all of the core functions as described herein plus the network that interconnects all core elements/functions.

Ctrl or Control: e.g. as per LTE protocol.

donor: serving relationship e.g. a base station serving e.g. a relay node.

Downlink (DL): a uni-directional portion of a link e.g. backhauling or access link from a relay's base station functionality or static base station to a mobile station functionality or mobile station.

DL UE or Downlink (DL) UE: downlink to a user entity via a sequence of at least one relay down-stream (DS): flow of data from a higher point at the topology (closer to the core) to a lower point at the topology (further from the core).

eNB: base station, or base station functionality e.g. in a relay, which uses LTE protocol. Also termed herein "LTE base station".

GTP: a group of IP-based communications protocols used to carry General Packet Radio Service (GPRS) within GSM, UMTS and LTE networks.

GTP bearer: A bearer using a GTP protocol.

GTP tunnel: A tunnel using a GTP protocol.

Link: Telecommunications or radio link between nodes of a communication network. It is appreciated that a portion, typically uni-directional, of a typically bi-directional link is also sometimes termed a link. There may be one or more channels in a link, e.g. in LTE all the following channels are uplinks: PUCCH, PUSCH, PRACH.

Mobile station or mobile communication device: a portable electronic device which communicates with other such devices or with a terrestrial network via a cellular communication network, typically including allowing users of such devices to converse and/or exchange digital information between them. The device may even comprise a dongle connected to a computer or sensor with no user nearby.

Mobile station functionality: functionality, typically software implemented, residing on a relay which communicates with an antenna, transmitter and receiver to enable the relay to function as a mobile communication device. The mobile station functionality typically includes antenna, RF front-end, Modem (communications processor) but does not necessarily include an application processor nor appliances such as keyboard, screen, microphone, and speaker which serve a conventional mobile station.

Radio bearer, bearer: e.g. as per 3GPP terminology.

RE resource block: e.g. as per LTE standard or an adaptation thereof suitable for operation within communication standards other than LTE.

relay: a node in the cellular communication network equipped with an antenna, transmitter and receiver and functioning both as a mobile communication device and a base station and extending the coverage of the base-stations.

Relay link: link or radio segment between a relay node and a donor base station.

Segment: link.

Subframe: e.g. as per LTE protocol

Trans. Downlink (DL) backhauling: transmit backhauling using downlink.

Tunnel: as per protocols that enables tunneling such as but not limited to GRE and GPRS.

UE: user entity or mobile station or mobile communication device or mobile station functionality e.g. in a relay, which uses LTE protocol. Also termed herein "LTE mobile station".

Uplink (UL): a uni-directional portion of a pair of links e.g. of backhauling or access links, from a relay's mobile station functionality or mobile device to a relay's base station functionality or static base station.

Uplink backhaul data: data being transferred uni-directionally, over only the uplink portion of at least one backhauling link, typically from a base station to a core or more generally from an access point to a more centralized point.

upstream (US): flow of data from a lower point in a network topology (i.e. further from the core) to a higher point in a network topology (i.e. closer to the core).

Abbreviations:

TeNb or rBS: base station functionality in relay. Typically, rBS is synonymous with "relay Base Station", "base station functionality" and "mobile base station".

SeNB or BS: stationary base station

MS/BS: mobile/base station

MME: mobility management entity rRM: relay resource manager

SM: Served Mobile i.e. Mobile station

RN: relay node s/p gw: p-gateway or s-gateway or p-gateway+s-gateway.

tUE, rMS, rUE (relay user equipment): mobile station functionality in relay

SNR=Signal to Noise Ratio

SNIR=Signal to Noise and Interference Ratio

SIR Signal to Interference Ratio

BER=Bir Error Rate

BLER=BLock Error Rate

PER=Packet Error Rate

Eb/No=Energy of Bit over Noise spectral density

Ec/No=Energy of Carrier (symbol) over Noise spectral density

Ec/Io=Energy of Carrier (symbol) over Interference spectral density

RSSI=Received Signal Strength Indication (or as per LTE standard)

RSRP=as per LTE standard.

RSRQ=as per LTE standard.

MRB=Multicast radio bearer

NH=next hop

RB=resource block

IC=interference cancelation

NH=next hop

EPC=evolved packed core

SBS=static base station

SBS band=e.g. frequency band: 7, 13 . . .

s/s=subsystem

PUSCH=physical uplink shared channel

PDSCH=physical downlink shared channel

RS: relay server, typically resides in the core of a cellular/mobile communication network and has no mobile station nor base station functionality Manages the relays and, according to some embodiments, is operative for encapsulating and/or decapsulating tunnels, building a topology map, and running network-level normalization algorithms.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 1-36 illustrate various components of the present invention which may be provided together or separately, according to certain embodiments; note PCT Application No. PCT/IL2012/050072 (WO/2012/120510) describes a Cellular communication system utilizing upgraded moving relays and methods useful in conjunction therewith.

Figure 5:
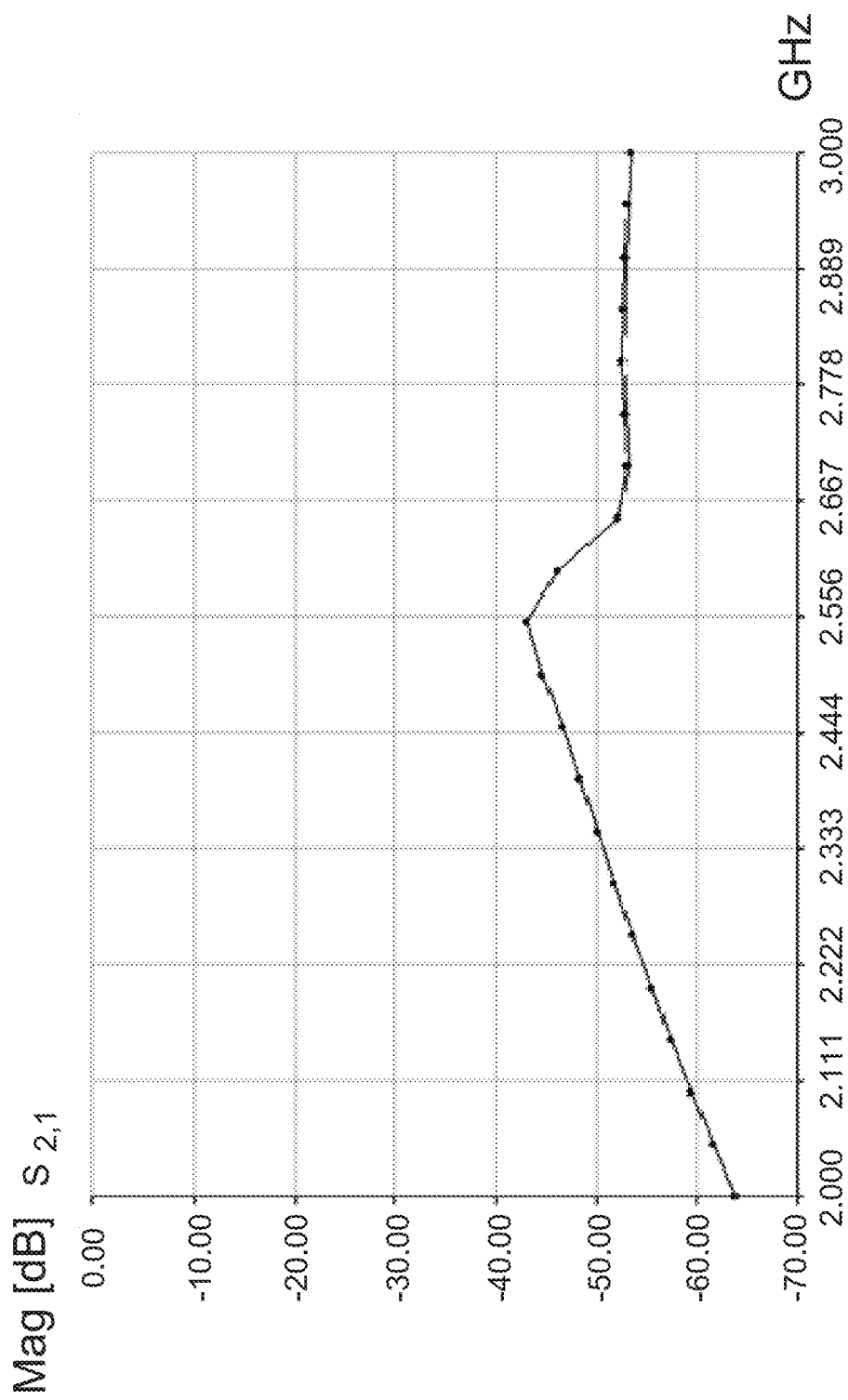

Certain of the prior art drawings in this application such as FIGS. 7a-7b, 14, 16-17, 26 are taken from "LTE, The UMTS Long Term Evolution: From Theory to Practice", by Wiley, e.g. from the 2011 version.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Aspects of the technology of PCT Application No. PCT/IL2012/050072 (WO/2012/120510) which describes a Cellular communication system utilizing upgraded moving relays and methods useful in conjunction therewith may be useful in implementing the following alternatives, e.g. Alternative 3 or 4 as described herein. Also, terminology herein may for example be defined in accordance with the teachings of PCT Application No. PCT/IL2012/050072 (WO/2012/120510).

Published PCT Application No. WO2011092698 describes a cellular communication system with moving base stations and methods and apparatus useful in conjunction therewith. It is appreciated that mutatis mutandis, any suitable mobile or cellular communication protocol may be employed. This technology, or other known technologies in which the base station or access point is mobile, optionally in conjunction with the teachings of PCT Application No. PCT/IL2012/050072 (WO/2012/120510), is also termed herein MAN (Moving Access Network) technology. A moving relay according to such technology, except as described herein, including the following co-located components: base station and mobile device functionalities and a relay resource manager (rRM) including a radio resource subsystem having a radio resource manager, is also termed herein a MAN, or a MAN node. The term "co-located" is intended to include any apparatus in which the above components all move together such that their relative locations remain constant or that are all physically connected.

Operation of a cellular communication system that utilizes moving relays as well as a hierarchical cellular network is described in PCT Application No. PCT/IL2011/000096 entitled "Cellular communication system with moving base stations and methods and apparatus useful in conjunction therewith" filed on Jan. 27, 2011 published as Published PCT Application No. WO/2011/092698. The following embodiments inter alia are known in the art by virtue of being described in the above publication:

Embodiment 1

A moving cellular communication system comprising:
a plurality of moving relays each including base station functionality, a radio manager and mobile station functionality, all co-located,
wherein each base station functionality is operative to communicate via antennae with at least one mobile station thereby to define a first radio link there between, and wherein each base station functionality has a physical connection to its co-located radio manager, wherein each mobile station functionality communicates via antennae with a unit which has base station functionality thereby to define a second radio link,
wherein the radio manager in each individual moving relay comprises:
  a radio resource manager; and
  functionality for exchanging information with radio managers included in moving relays other than said individual moving relay,
wherein said information is used by said radio resource manager to select, for at least one individual mobile station seeking to be served, one of:
  a static base station; and
  a base station functionality,
to which to connect said individual mobile station in order to provide cellular communication services thereto.

Embodiment 2

A system according to embodiment 1 operative in conjunction with a cellular network including a core device, at least one static base station, and a population of mobile stations communicating via antennae with at least one of the base stations, wherein at least one topological change in said system occurs dynamically, said topological change comprises a dynamic change in at least one connection between a moving relay and at least one of a moving relay and a static base station.

Embodiment 3

A system according to embodiment 2 wherein at least one radio resource manager locally stores at least some of the information it uses to make a decision regarding selection of a cellular communication service provider for an individual mobile station seeking to be served, even after said decision has been made, thereby to generate a database co-located with said radio resource manager.

Embodiment 4

A system according to embodiment 1 wherein said information used by said radio resource manager includes information obtained from its co-located base station functionality Embodiment 5

A system according to embodiment 1 or embodiment 4 wherein said information used by said radio resource manager includes information obtained from its co-located mobile station functionality Embodiment 6

A system according to embodiment 5 wherein said information obtained from said co-located mobile station functionality is derived from at least one measurement of at least one characteristic of said second radio link.

Embodiment 7

A system according to embodiment 6 wherein said functionalities are provided in accordance with a cellular communication standard and wherein said information includes information provided by said mobile station functionality in accordance with said standard.

Embodiment 8

A system according to embodiment 7 wherein said cellular communication standard comprises 3GPP E-UTRAN LTE.

Embodiment 9

A system according to embodiment 8, where the information includes at least one of RSSI, RSRP, RSRQ.

Embodiment 10

A system according to embodiment 1 wherein each said moving relay and each said mobile station constitutes a cellular communication node and wherein said links generate routes interconnecting said nodes and wherein at least one radio resource manager residing at an individual node is operative to compute a route quality parameter characterizing quality of at least one individual route passing through said individual node, by combining information pertaining to links along said individual route.

Embodiment 11

A system according to embodiment 10 wherein said radio resource manager operative to compute a route quality parameter combines information pertaining to links along said individual route by computing a minimum from among values characterizing respective qualities of all links forming said individual route.

Embodiment 12

A system according to embodiment 10 wherein said system is operative in conjunction with a cellular network including a core device, at least one static base station, and a population of mobile stations communicating via antennae with at least one of the base stations, and wherein said individual route comprises a route connecting said individual node to at least one of the static base stations.

Embodiment 13

A system according to embodiment 1 wherein said system is operative in conjunction with a static network including a core device, at least one static base station, and a population of mobile stations communicating via antennae with at least one of the base stations and wherein each individual radio manager that does not have a sufficiently high quality connection to the static network can provide communication, via said individual radio manager's co-located base station functionality, between mobile stations that are connected to said co-located base station functionality Embodiment 14

A system according to embodiment 13 wherein said system is operative in conjunction with a static network including a core device, at least one static base station, and a population of mobile stations communicating via antennae with at least one of the base stations and wherein each radio manager that does not have a connection to the static network can provide communication, via said individual radio manager's co-located base station functionality, between mobile stations that are connected to said co-located base station functionality Embodiment 15

A system according to embodiment 1 wherein at least one individual radio manager can provide communication, via at least one base station functionality linked to said radio manager, between mobile stations that are connected to said at least one base station functionality Embodiment 16

A system according to embodiment 1 wherein each resource manager is operative to selectably establish communication between at least one mobile station connected to its co-located base station functionality and at least one mobile station connected to a moving relay to which said resource manager's co-located mobile station functionality is linked via a route.

Embodiment 17

A system according to embodiment 16 wherein said route includes a plurality of links Embodiment 18

A system according to embodiment 10 wherein said radio resource manager residing at said individual node computes a plurality of route quality parameters for a corresponding plurality of route alternatives.

Embodiment 19

A system according to embodiment 18 wherein said radio resource manager provides said plurality of route quality parameters to an individual mobile station connected to the base station functionality co-located with said radio resource manager.

Embodiment 20

A system according to embodiment 19 wherein said individual mobile station is operative, when in a mode in which it is its own decision to which unit having base station functionality it is to be connected, to make said decision based at least in part on said plurality of route quality parameters.

Embodiment 21

A system according to embodiment 6 wherein said information obtained from said co-located mobile station functionality includes said at least one measurement itself.

Embodiment 22

A system according to embodiment 4 wherein said information obtained from said co-located base station functionality is derived from at least one measurement of at least one characteristic of said first radio link.

Embodiment 23

A system according to embodiment 22 wherein said information obtained from said co-located base station functionality includes said at least one measurement itself.

Embodiment 24

A system according to embodiment 8 or embodiment 9 where the information includes a rsSINR (reference signal SINR) metric.

Embodiment 25

A system according to embodiment 1 in which an individual mobile station is connected to an individual base station functionality and wherein a decision to transfer said individual mobile station away from said individual base station functionality is made by a resource manager co-located with said individual base station functionality Embodiment 26

A system according to embodiment 1 and also comprising a cellular network including a core device, at least one static base station, and a population of mobile stations communicating via antennae with at least one of the base stations.

Embodiment 27

A system according to embodiment 26 and also comprising a relay network manager (DisNetRM) located at a static network core device.

Embodiment 28

A system according to embodiment 1 wherein, for at least one mobile station functionality in at least one individual moving relay, said unit which has base station functionality comprises a base station functionality of a moving relay other than said individual moving relay.

Embodiment 29

A system according to embodiment 1 operative in conjunction with a cellular network including a core device, at least one static base station, and a population of mobile stations communicating via antennae with at least one of the base stations,
wherein, for at least one mobile station functionality in at least one individual moving relay, said unit which has base station functionality comprises said static base station.

Embodiment 30

A system according to embodiment 1 wherein said information, but for said exchanging, is accessible to only a subset of said radio managers.

Embodiment 31

A system according to embodiment 1 wherein said information comprises link information characterizing at least one of said radio links Embodiment 32

A system according to embodiment 28 wherein for the mobile station functionality co-located with said moving relay other than said individual moving relay, said unit which has base station functionality also comprises a base station functionality of a moving relay rather than a static base station, thereby to provide multi-hop capability to said system.

Embodiment 33

A system according to embodiment 27 in which an individual mobile station is connected to an individual base station functionality and wherein a decision to transfer said individual mobile station away from said individual base station functionality is made centrally by said relay network manager (DisNetRM).

Embodiment 34

A system according to embodiment 20 and also comprising a cellular network including a core device, at least one static base station, and a population of mobile stations communicating via antennae with at least one of the base stations wherein said individual mobile station decides to establish connection with the unit having base station functionality which, according to said plurality of route quality parameters, provides said individual mobile station with the best route to one of the static base stations.

Embodiment 35

A mobile communication network system operative in conjunction with a core network including a core device and at least one static base station, the system comprising:
a plurality of base stations; and
a population of mobile stations communicating via antennae with the base stations; the base stations including at least one moving base station which communicates via antennae with the mobile stations and includes base station functionality, a first radio manager and mobile station functionality all co-located with the base station functionality,
the base station functionality having a physical back-connection to the first radio manager, the first radio manager having a physical connection with the mobile station functionality, the mobile station functionality communicating via antennae with at least one selectable static base station,
wherein the first radio manager comprises:
  a radio resource manager; and
  functionality for receiving information from, and sending information to, other radio managers, respectively co-located with other moving base stations, and for using the information to determine whether to reject at least one mobile station seeking to be served by an individual base station associated with the individual co-located radio manager,
wherein the information used to determine whether to reject includes at least one of the following:
  location of said at least one moving base station; and
  statistics re measurements of link quality.

Embodiment 36

A system according to embodiment 35 wherein said information comprises information regarding qualities of respective connections of respectively co-located radio managers back to the core network is provided by respectively co-located radio managers via a selected one of:
a static base station from among the at least one static base station of the core network; and
a moving base station capable of providing service to the individual radio manager's co-located mobile device.

Embodiment 37

A system according to embodiment 35 wherein said information regarding quality of its own connection back to the core network is provided by its own co-located mobile station.

Embodiment 38

A system according to embodiment 35 wherein said information includes information regarding channel quality which other base stations are able to provide mobile stations in the vicinity of the individual co-located radio manager and which is provided by reports generated by said mobile stations in said vicinity.

Embodiment 39

A system according to embodiment 35 wherein said information regarding quality of service available from its own base station for mobile stations in the vicinity of the individual co-located radio manager is provided by its own co-located mobile station.

Embodiment 40

A system according to embodiment 35 wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 41

A system according to embodiment 40 wherein said parameter is based upon a minimum SNR (signal noise ratio) value, over sections which together compose a route, each section having its own SNR (signal noise ratio) value.

Embodiment 42

A system according to embodiment 40 wherein said parameter characterizing route quality is a combination of measured qualities of route sections and fluctuations thereof such that route sections with largely fluctuating quality measurements are devalued due to their unpredictability.

Embodiment 43

A system according to embodiment 35 wherein at least one individual co-located radio manager includes a mobile-to-mobile direct communication facilitation functionality operative to provide direct communication, not requiring said core network, between a plurality of mobile devices in said individual radio manager's vicinity.

Embodiment 44

A system according to embodiment 35 wherein said moving base station observes a silence period during which it refrains from transmitting to its own co-located mobile station.

Embodiment 45

A system according to embodiment 44 wherein at least one characteristic of said silence period is dynamically determined by the moving base station's co-located radio manager.

Embodiment 46

A system according to embodiment 45 wherein said characteristic comprises a zone in which silence is observed which is defined over at least one of a frequency band and a time window.

Embodiment 47

A system according to embodiment 35 wherein said network comprises a tactical E-UTRAN network.

Embodiment 48

A system according to embodiment 35 wherein if a multi-hop communication route is used, in which a relay R that is connected to the core network via another relay A, relay R sends a message to a backhauling relay that R is A's anchor.

Embodiment 49

A system according to embodiment 35 wherein said static base station is co-located with said core device.

Embodiment 50

A system according to embodiment 35 wherein said physical back-connection comprises an Ethernet back-connection.

Embodiment 51

A system according to embodiment 35 wherein said radio resource manager comprises an E-UTRAN radio resource manager.

Embodiment 52

A mobile communication networking method comprising:
providing a core network including a core device and at least one static base station; a plurality of base stations; and a population of mobile stations communicating via antennae with the base stations;
  the base stations including at least one moving base station which communicates via antennae with the mobile stations and includes base station functionality, a first radio manager and mobile station functionality all co-located with said base station functionality,
  the base station functionality having a physical back-connection to the first radio manager, the first radio manager having a physical connection with said mobile station functionality, the mobile station functionality communicating via antennae with at least one selectable static base station,
  wherein said first radio manager comprises a radio resource manager; and
  functionality for receiving information from, and sending information to, other radio managers, respectively co-located with other moving base stations; and
using said information to determine whether to reject at least one mobile station seeking to be served by an individual base station associated with said first radio manager.

Embodiment 53

A system according to embodiment 35 wherein users are shown a good location for Quality Grade Result (QGR).

Embodiment 54

A system according to embodiment 53 wherein statistical measurements of a co-located mobile station (MS) in each at least one relay are attached to location results of the relay and wherein said system includes at least one relay radio manager (rRM) having a functionality that computes and indicates to the user locations with good QGC (quality grade control).

Embodiment 55

A system according to embodiment 48 wherein the back-hauling relay becomes aware that another relay is connected to it and finds a good place to remain.

Embodiment 56

A system according to embodiment 35 wherein said information includes information regarding qualities of other base stations' respective connections back to the core network.

Embodiment 57

A system according to embodiment 35 wherein said information includes information regarding quality of the first radio manager's moving base station's connection back to the core network.

Embodiment 58

A system according to embodiment 35 wherein said information includes information regarding channel qualities which said first radio manager's own base station, and base stations other than said first radio manager's own base station, are respectively able to provide, to mobile stations in the vicinity of the first radio manager.

Embodiment 59

A method according to embodiment 52 wherein said information includes information regarding qualities of other base stations' respective connections back to the core network.

Embodiment 60

A method according to embodiment 52 wherein said information includes information regarding quality of the first radio manager's moving base station's connection back to the core network.

Embodiment 61

A method according to embodiment 52 wherein said information includes information regarding channel qualities which said first radio manager's own base station, and base stations other than said first radio manager's own base station, are respectively able to provide, to mobile stations in the vicinity of the first radio manager.

Embodiment 62

Combinations of embodiments with other embodiments.

Embodiment 63

A mobile communication network system operative in conjunction with a network including a core device, a plurality of base stations including at least one static base station, and a population of mobile stations communicating via antennae with at least one of the base stations, the system comprising:
at least one moving base station included in said plurality of base stations which communicates via antennae with the mobile stations and includes base station functionality, a first radio manager and mobile station functionality all co-located with the base station functionality,
the base station functionality having a physical back-connection to the first radio manager, the first radio manager having a physical connection with the mobile station functionality, the mobile station functionality communicating via antennae with at least one selectable base station,
wherein the first radio manager comprises:
  a radio resource manager; and
  functionality for receiving information from, and for sending information to, other radio managers, respectively co-located with other moving base stations, and for using the information to determine whether to reject at least one mobile station seeking to be served by an individual base station associated with the individual co-located radio manager.

Embodiment 64

A mobile communication network system operative in conjunction with a network including a core device, a plurality of base stations including at least one static base station, and a population of mobile stations communicating via antennae with at least one of the base stations, the system comprising:
at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station,
wherein the first radio manager comprises:
  a radio resource manager; and
  functionality for receiving information from, and sending information to, other radio managers, respectively co-located with other moving base stations,
wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information, and wherein the plurality of routes of base stations via which the individual moving base station can communicate with the core network includes at least one route characterized by multi-hop backhauling.

Embodiment 65

A system according to embodiment 63 wherein said mobile station seeking to be served by said individual base station includes a mobile station currently being served by said individual base station.

Embodiment 66

A system according to embodiment 63 wherein said individual base station is co-located with the individual co-located radio manager.

Embodiment 67

A system according to embodiment 63 wherein said individual base station is served by the individual co-located radio manager.

Embodiment 68

A system according to embodiment 63 wherein said functionality is also operative to determine a base station other than said individual base station, which is more suitable than said individual base station to serve said mobile station seeking to be served.

Embodiment 69

A system according to embodiment 63 wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information.

Embodiment 70

A system according to embodiment 64 wherein each said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 71

A system according to embodiment 64 wherein the radio manager computes said route comparison information for an individual moving base station served thereby whose mobile station functionality is communicating in idle mode, via antenna, with at least one selectable base station.

Embodiment 72

A system according to embodiment 64 wherein the radio manager computes said route comparison information for a moving base station co-located therewith whose mobile station functionality is communicating in active mode, via antenna, with at least one selectable base station.

Embodiment 73

A system according to embodiment 71 and wherein the individual moving base station camps on said serving base station selected at least partly based on said information indicative of said route comparison information.

Embodiment 74

A system according to embodiment 72 and wherein the individual moving base station is handed over to said serving base station selected at least partly based on said information indicative of said route comparison information.

Embodiment 75

A system according to embodiment 63 and also comprising a core device and wherein the core device allocates constant communication session bandwidth between each mobile station functionality and the base station with which it is communicating so as to maintain a constant active mode of communication between each mobile station functionality and the base station.

Embodiment 76

A system according to embodiment 64 and also comprising a core device and wherein the core device allocates constant communication session bandwidth between each mobile station functionality and the base station with which it is communicating so as to maintain a constant active mode of communication between each mobile station functionality and the base station.

Embodiment 77

A mobile communication network system serving a population of mobile stations communicating via antennae with base stations, the system including: a plurality of base stations including at least one static base station and at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station; and a core device which allocates constant communication session traffic between each mobile station functionality and the base station with which it is communicating so as to maintain a constant active mode of communication between each mobile station functionality and the base station.

Embodiment 78

A system according to embodiment 56 wherein said other base stations include all base stations along a route connecting said moving base station and said core, via which route said core serves said moving base station.

Embodiment 79

A system according to embodiment 77 wherein said other base stations include all base stations along a route connecting said moving base station and said core, via which route said core serves said moving base station.

Embodiment 80

A system according to embodiment 64 wherein said information includes information regarding channel qualities which said first radio manager's own base station, and base stations other than said first radio manager's own base station, are respectively able to provide, to mobile stations in the vicinity of the first radio manager.

Embodiment 81

A system according to embodiment 63 wherein said functionality is operative for detecting the quality of each end-user section and the quality of each backhauling section according to mobile stations' and mobile station functionalities' measurements and for combining said qualities into quality grade results for a current route and for alternative routes for at least one mobile station.

Embodiment 82

A system according to embodiment 81 and wherein said quality grade results are broadcast to at least one mobile station.

Embodiment 83

A system according to embodiment 81 wherein at least one handover decision, to hand over a node from one base station to another, is made by taking into account, for at least one alternative route, the quality grade result of access and backhauling sections.

Embodiment 84

A system according to embodiment 81 wherein at least one cell admission decision is made by taking into account, for at least one alternative route, the quality grade result of access and backhauling sections.

Embodiment 85

A system according to embodiment 81 wherein at least one cell reselection decision is made by taking into account, for at least one alternative route, the quality grade result of access and backhauling sections.

Embodiment 86

A system according to embodiment 81 wherein said mobile stations' and mobile station functionalities' measurements include RSRP.

Embodiment 87

A system according to embodiment 81 wherein said mobile stations' and mobile station functionalities' measurements include RSRI.

Embodiment 88

A system according to embodiment 81 wherein said mobile stations' and mobile station functionalities' measurements include RSRQ.

Embodiment 89

A system according to embodiment 63 wherein each radio manager uses measurements from at least one other radio manager over a sub-network, and at least one of RSRP, RSRI and RSRQ measurements from at least one of its co-located mobile station functionality and a mobile station, to build a radio resource measurements table.

Embodiment 90

A system according to embodiment 89 wherein at least one of said measurements is distributed by broadcast message type to all radio managers.

Embodiment 91

A system according to embodiment 81 wherein the Quality Grade Result (QGR) of all alternative routes is distributed to mobile stations using a broadcast message.

Embodiment 92

A system according to embodiment 91 wherein the broadcast message relating to each individual base station is sent to all mobile stations camping on said individual base station.

Embodiment 93

A system according to embodiment 64 wherein said information includes information regarding qualities of other base stations' respective connections back to the core network.

Embodiment 94

A system according to embodiment 63 wherein said information is transmitted between "colleague" radio managers via radio.

Embodiment 95

A system according to embodiment 63 wherein at least one radio manager "masquerades" as a base station by sending a request to a mobile station functionality to execute an NMR (Network Measurement Report) measurement.

Embodiment 96

A system according to embodiment 63 wherein said information includes information regarding quality which the first radio manager's mobile station functionality would be served by each base station capable of serving the first radio manager's mobile station functionality Embodiment 97

Combinations of a subset of features of certain embodiments with a subset of features of other embodiments.

Embodiment 98

A system according to embodiment 1 and wherein said radio manager includes an in-band multi-hop backhauling functionality Embodiment 99

A system according to embodiment 98 wherein said in-band multi-hop backhauling functionality is operative to enhance immunity due to interference by creating new alternative routes to replace routes that are dropped due to interference, wherein each new alternative route includes a section between the end-user mobile station and mobile relay it is connected to, and a backhauling section, including the links between the mobile relays that take part as nodes in the route.

Embodiment 100

A system according to embodiment 1 wherein backhauling connectivity is provided by utilizing multi-hop routes between said moving relays.

Embodiment 101

A system according to embodiment 1 wherein backhauling of said moving relays comprises in-band multi-hop backhauling.

Embodiment 102

A system according to embodiment 1 wherein for at least one mobile station functionality in at least one individual moving relay, said unit which has base station functionality comprises an LTE base station functionality Embodiment 103

A system according to embodiment 1 wherein for at least one mobile station functionality in at least one individual moving relay, said unit which has base station functionality comprises a 2G base station functionality Embodiment 104

A system according to embodiment 1 wherein for at least one mobile station functionality in at least one individual moving relay, said unit which has base station functionality comprises a 3G base station functionality A relay node for use in the context of the present application, including a base station functionality, mobile station functionality and resource relay manager, may be constructed as per the teachings of the above-referenced PCT publication other than as shown and described herein.

Certain embodiments of the present invention can be utilized inter alia in scenarios incorporating a mobile relay which may be built based on base station functionality (TeNB), mobile station functionality (TUE or tUE) and relay radio/resource manager (e.g. rRM) functionality as described in PCT Application No. PCT/IL2011/000096 entitled "Cellular communication system with moving base stations and methods and apparatus useful in conjunction therewith" filed on Jan. 27, 2011 and published as WO/2011/092698 on 4 Aug. 2011.

It should be highlighted that all techniques, methods and examples described in the following can be implemented also in a network in which some or all relays are static.

FIG. 1 illustrates one embodiment of a DL Physical layer
FIG. 2 illustrates one embodiment of a UL Physical layer
FIG. 3 illustrates one embodiment of Channels (e.g. transport and Phy) and Layers.

| Radio link | Channel type | Channel | Physical Channel | Purpose |
|---|---|---|---|---|
| Uplink | TrCh (between MAC and Phy) | UL-SCH | PUSCH | Carries user UL data |
| | | RACH | PRACH | UE establish connection |
| | Control Information | UCI (Uplink Control Information) | PUSCH PUCCH | Scheduling request, HARQ, CQI |
| Downlink | TrCh | DL-SCH | PDSCH | Carries user UL data/RRC |
| | | BCH | PBSCH | MIB |
| | | PCH | PDSCH | Paging |
| | | MCH | PMCH | Multicast |
| | Control Information | CFI (Control Format Indicator) | PCFICH | Number of symbols are used for PDCCH in a subframe |
| | | HI(HARQ Indicator) | PHICH | Ack/Nack feedback to the UE for the uplink blocks |
| | | DCI (Downlink Control Information) | PDCCH | PUSCH grant, PDSCH assignment, |
| | | | P-SS S-SS RS | Synchronization Channel estimation |

Referring now to FIG. 4, a MAN (Moving Access Network) refers herein to a network which includes at least one moving relay. MAN includes moving relay nodes that operate adjacent to each other. Each node typically implements two transmit/receive channels over the same frequency band (also known as in-band backhauling):

Access channels (from/to an LTE subscriber) and/or
    Backhauling channels (from/to the next LTE site/node/relay/BS)

This proximity of channels in each moving relay and of adjacent Moving relays generates several mutual interference types:

1. From the DL transmit channel of the rBS to the rUE receiver and/or
2. From the UL transmit channel of the rUE to the rBS receiver and/or
3. From the DL channel of the rBS to DL channels of adjacent Moving relays (at UEs receivers) and/or
4. From the UL channel of the rBS-served UEs (mobile devices) to UL channels of adjacent Moving relays UEs (at rBSs/BSs receivers).

In FIG. 9 interference types 1-4 are shown (as dashed bold arrows). It can be seen that interference type 1 can happen between DL transmitted by the rBS and rUE reception from either a static BS or from other relay rBS. It can be also seen that interference type 2 can happen between UL transmitted by the rUE and rBS reception from its served UE(s) or rUE(s).

The main objective is: Reduce some or all of the above mutual interferences and enable the proper operation of all Moving relays. In the rest of the description we will focus on the first two interference types as the latter two are partly handled by the standard and the base-stations.

The interference can affect all type of channels of the protocol/standard being used. The interference reduction can be realized by enhancing the isolation/separation between the backhauling and access channels used by the relay. For example, in LTE, Signals and Channels whose isolation is to be enhanced in the DL Physical Layer may include some or all of:

P-SS, S-SS
    Reference Signal (DMRS, CRS)
    PDSCH
    PBCH
    PDCCH
    MBSFN if PMCH is employed
    PCFICH
    PHICH For example, in LTE, Signals and Channels whose isolation needs to be enhanced in the UL Physical Layer may include some or all of:

DMRS
    Sounding RS
    PUSCH
    PUCCH
    PRACH

In a moving relay the problem of mutual interference can be more serious than in the case of static relays because in the case of moving relays the scenario is dynamic and changing all the time. In addition, in the case of moving relays, the size of the power amplifier and antenna of the rBS can be smaller that the power amplifier and antenna that can be mounted on static infrastructure, a fact that can make interference type 2 more severe (especially when the power amplifier and antenna of rBS and rUE are similar in their performance). In the case of multi-hop (multi-layers hierarchical) network there such interference can occur between two adjacent relays, in addition to interference between static BS and relay.

To separate between the access channels and the backhauling channels, it may be necessary to isolate between them to more than 100 dB.

Any of the following methods may be employed to reach the required isolation:

Separation/isolation in space and frequency
Separation/isolation in time using a dedicated scheduler
Separation/isolation in time using MBSFN channels
Combinations of some, part of or all the above methods.

To separate access channels (3+4 interference types mentioned above), it is customary to solve the problem using mechanisms built-in in the standards or in the equipment, for example:

Intelligent scheduler
Placing the base station in proximity to the mobile devices
Allocate frequencies according to the distance from the base station
SON (Self Organizing Network)

There are several ways to mitigate type 1 and/or 2 interferences. Each of the following paragraphs describes an example alternative mitigation method (termed herein "alternatives 1-4") including guidelines and features of each solution. Later in the detailed description, each of the solutions is further elaborated.

Alternative 1—Separation in Space and Frequency
The required isolation may be accomplished with some or all of the following three components:
50-65 dB separation can be achieved by—antenna assembly that separates between the access and backhaul channels/antennas.
30-35 dB separation can be achieved by—interference cancelling mechanism that can cancel the interference signal and extract the wanted signal.
30-40 dB separation can be achieved by—managing frequency resources, e.g. separating in the frequency domain between access and backhauling channels.

Alternative 2·Time Separation Using a Dedicated Scheduler
Implementing dedicated scheduler in the base station functionality (rBS) of the relay.
The scheduler may split individual frequency and time resources (resource blocks=RBs) among channels having a potential for interference.
For example: rUE can transmit over the uplink in the RB(s) which rBS does not listen to and vice versa; that is, rBS can transmit over DL in RB(s), which rUE does not listen to (e.g. which are not allocated for the rUE).
The solution may require coordination between the static base stations and the mobile base stations (i.e. rBSs) that interface externally with the scheduler or between mobile base stations (i.e. rBSs) and other mobile base stations (i.e. rBSs).

Alternative 3—Separation in Time Using MBSFN Channels
Using standard MBSFN channels that enable sending broadcast data for mobile TV transmissions.
Dividing the frame into 10 subframes for backhauling and access.
Use of the MBSFN subframes as a backhauling subframe (downlink) for transmitting messages upstream and downstream.
May require using base stations functionality (rBS) and mobile devices (rUE) that support MBSFN (e.g. as of 3GPP LTE Release 9).
May require developing dedicated MAC (medium access control) and network communication layers over the MBSFN PHY (physical) layer.

Alternative 4—Integration of a Dedicated Scheduler and MBSFN

Combination of alternatives 1, 2 and 3.
Using dedicated scheduler for:
Dynamically allocating time-deflected (shifted) subframes in DL
Dynamically allocating PUSCH and PUCCH channels
Using MBSFN channels as almost blank subframes in DL (due to lack of transmission of CRS in MBSFN).
Additional separation in space and frequency (Alternative 1) can be added to increase the performance (e.g. enlarging the range and coverage area).
Use of an antenna and IC mechanisms to isolate control and CRS messages.
It may be possible to waive the need to deflect (shift) time in DL.

Alternative 1 in Detail—Time and Frequency Separation as Per One Possible Embodiment:

As mentioned above, the required isolation may be accomplished with some or all of three components: special antenna assembly, interference cancelling mechanisms and managing frequency resources.

FIG. 5 (Separation in Time and Frequency-Special Antenna Assembly) illustrates a solution based on generating isolation and separation between access and backhauling antennas in the same assembly, using several physical dimensions of separation.

A result of simulation of such a special antenna assembly is shown in FIG. 5. The X-axis is the frequency dimension and the Y-axis is the isolation between the access and backhauling antennas. At the lower frequencies (e.g. 2-2.3 GHz) and at the higher frequencies (2.66-3 GHz), an isolation of more than 50 dB can be achieved.

Separation in Time and Frequency—Interference Cancellation:

Signal processing interference cancellation technology may be used to cancel interferences. Known techniques can reach cancellation capabilities of up to 35 dB.

Figure 6A:
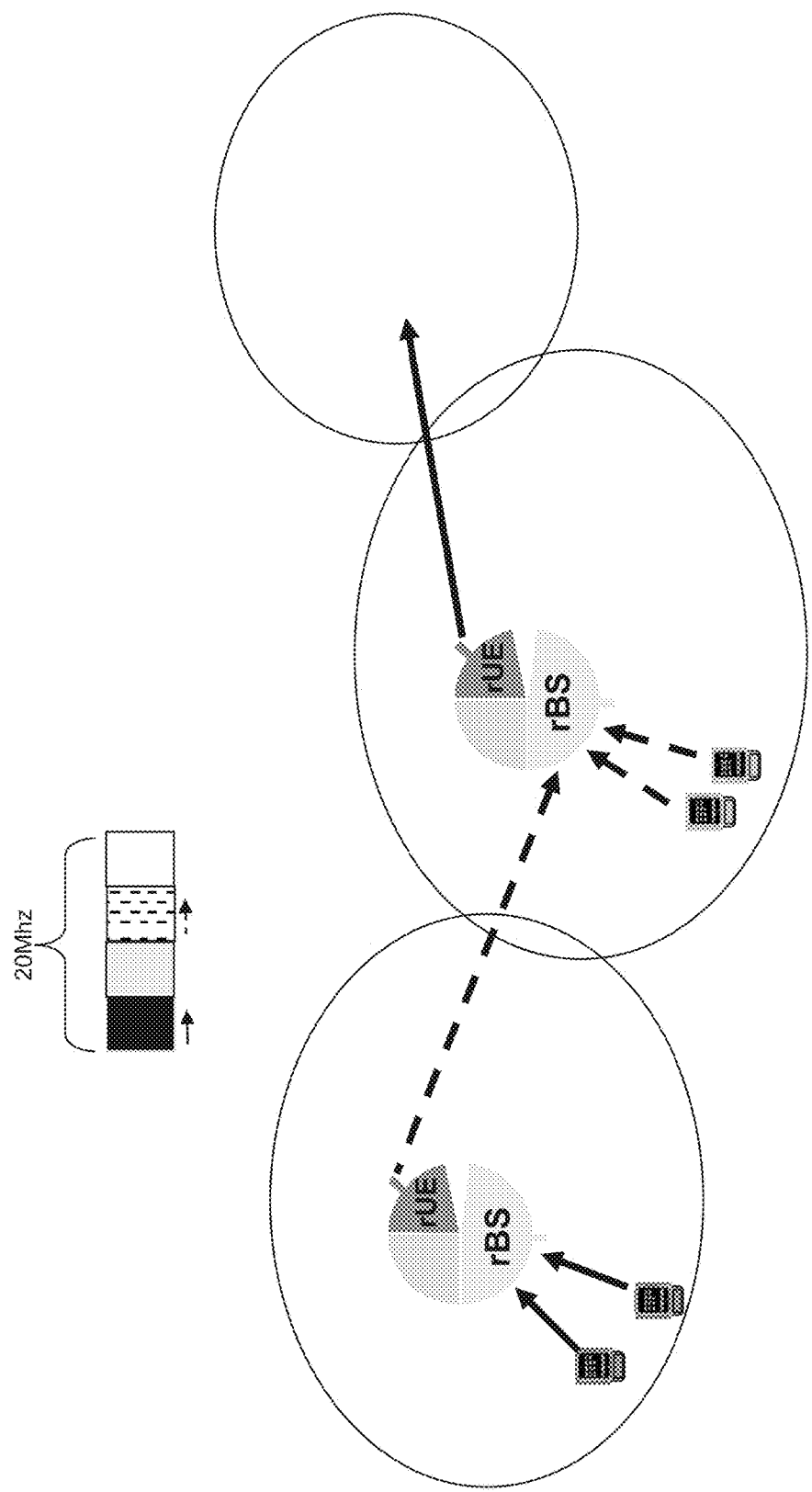
Figure 6B:
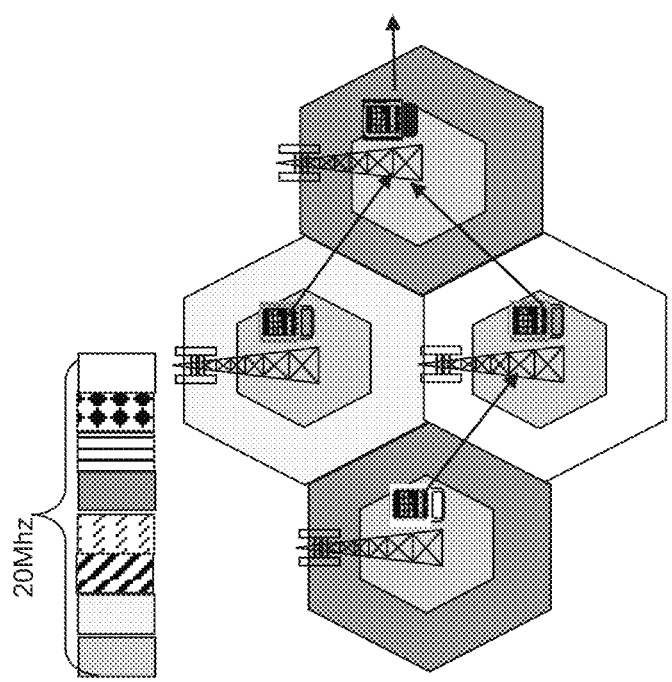

FIGS. 6a-6b pertain to Separation in Time and Frequency—Frequencies Management.

The spectrum is allocated to several frequency bands that optionally include a guard band.

FIG. 6a illustrates an example of 4×5 MHz=20 MHz. There is distribution into color graphs, each color representing a frequency band.

In 5 MHz, there are effectively two colors, represented as black/solid and dashed.

A difference of 5 MHz may be required between neighbors if no adequate filters are used. It is possible to resolve this by dividing into more colors (with less bandwidth) e.g. as depicted in FIG. 6b.

As a result of the moving relays scenario, it may be necessary to use a method to allocate frequencies dynamically caused by the proximity of neighboring moving relays approaching the relay and operating with the same color (center frequency).

For example, a relay that can monitor two adjacent relays, may detect that those two adjacent relays are operating in the same center frequency, and coordinate them so that one of them changes its center frequency to a free center frequency.

An example method for detecting two adjacent relays that are operating in the same frequency, according to certain embodiments of the invention, is by moving randomly to a different frequency when the rBS detects a drop in the RSRP level as reported by attached (connected) UEs. Another method for detecting interference of adjacent neighbors employs an allocation table that maps cellID to allocated frequency. The allocation table is typically distributed between the relay stations with an additional table that maps GPS location to a cellID In the event that two adjacent cells are close to each other and starts to interfere with one another, a graph coloring optimization algorithm typically operating in conjunction with a bully algorithm, operative for forcing only one cell to change its frequency, may be employed to resolve interference between neighboring cells.

Figure 7B:
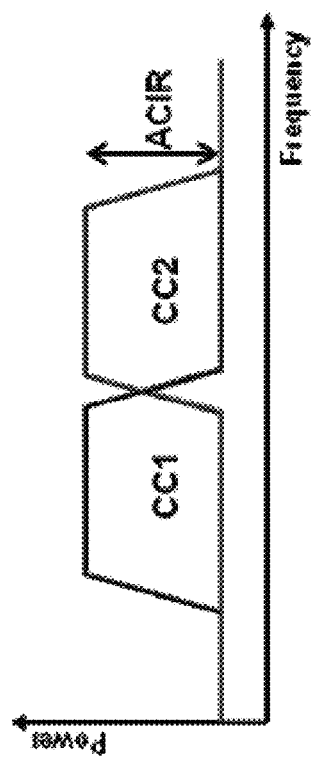

FIGS. 7a, 7b are prior art illustrations taken from Artist4G d3.4_v2.0 and illustrating Separation in Time and Frequency—Frequency Separation.

FIG. 8 is a prior art illustration taken from Artist4G d3.4_v2.0 and illustrating a Separation in Time and Frequency—Frequency Separation and antenna isolation requirement.

With only one antenna capable of an isolation of 65 dB, it may be possible to reach a range up to 500 m whereas with 85 dB it may be possible to reach a range of 1.5 km (SINR=6 dB). Again, the analyzed scenario of standard static relay having only one layer of relays (connected to the static base stations) typically does not require as high a level of isolation as does the case of moving relays, especially e.g. in a hierarchical multi-hop topology.

FIG. 9 relate to Separation in Time and Frequency—Interfacing with a Static Network.

If the static base stations are allocated 5 MHz, then it is possible to treat the base station as a relay station (case #1).

Since the BCH channels are in six central RBs, than e.g. 5 MHz or 1.4 or 3 MHz) allocations not residing in the center 1.4 MHz of the SBS bandwidth can be devoted to the relays, and 20 MHz BS bandwidth may remain for the static network (case #2).

In some cases, the separation may not be enough because of interference to the PDCCH of the SBS (Static BS).

Separation in Time and Frequency may be characterized by some or all of the following:

May require changes to only L3 of rBS and rUE

Supports simple interface with the static network

May require changing the frequency of the base station functionality (while in operation and serving UEs) due to the dynamic scenario and the possibility for frequency collision between moving relays that approach each other.

Special antennas assembly.

Alternative 2 is now described in detail, including re Separation Using a Dedicated Scheduler, with reference to FIGS. 10a-10b.

A Dedicated Scheduler is typically provided which is responsible for allocating RB to UL and DL by the base station.

With a dedicated scheduler, it is possible to separate between the backhauling and access channels in time and frequency e.g. in the example depicted in FIGS. 10a-10b, The example has four users and two rUEs allocated to each TTI in different base stations. Use of a Dedicated scheduler, e.g. as shown and described herein, in both UL and DL is further described hereinbel1ow.

Figure 11:
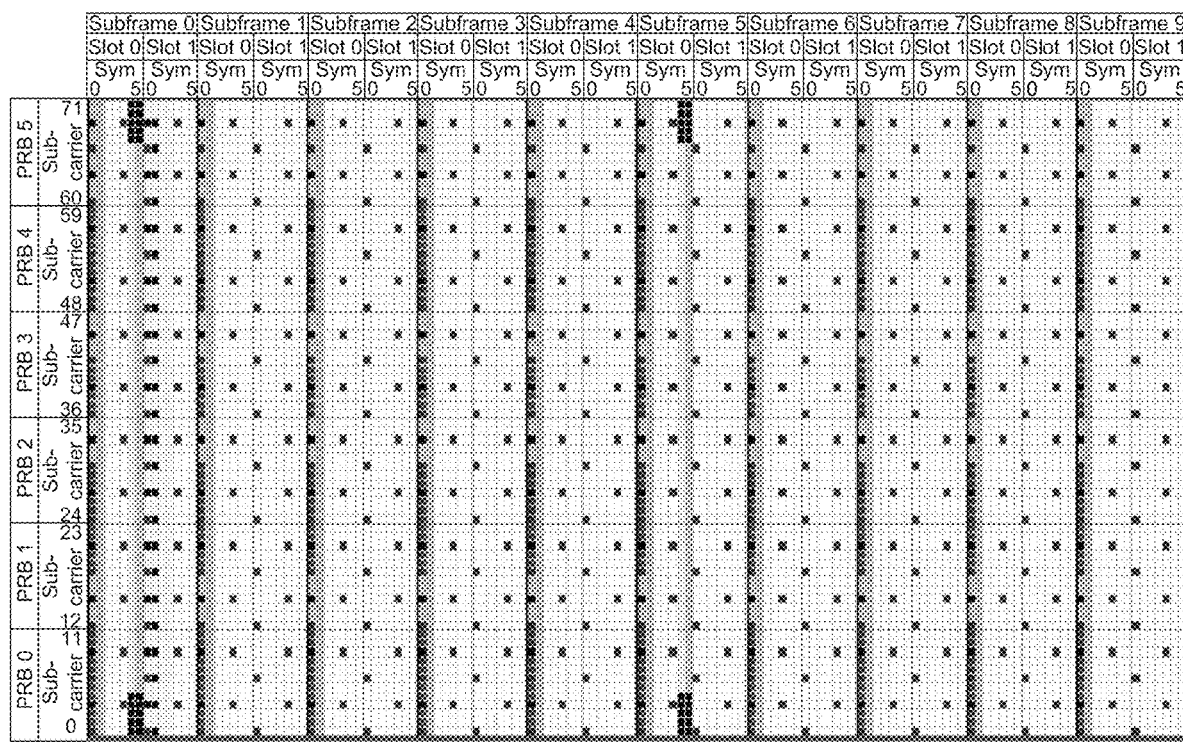

FIG. 11 pertains to a Dedicated Scheduler—Synch signals and PBCH Channel.

In the first subframe of each frame of the main six RBs of the allocated bandwidth Without significant separation, an rUE typically cannot synchronize or even receive a BCH channel of neighboring stations because the rBS interferes with the rUE's BCH channel.

It is possible to separate by shifting the subframe of access and backhauling so no overlap between Synch signals and BCHs are apparent. Synch signals and PBCH channel are further described hereinbelo2w.

Figure 12:
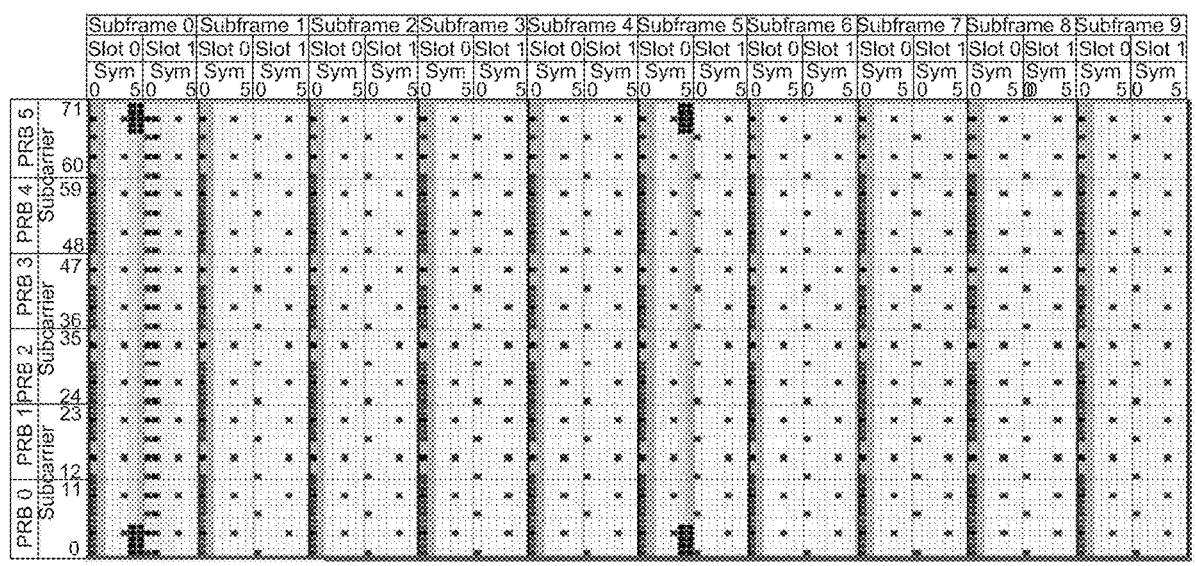

FIG. 12 pertains to a Dedicated Scheduler—PDCCH Channel.

The PDCCH channel is present through the entire bandwidth; therefore rBS may interfere with the reception of the PDCCH of rUE from another rBS It is possible to solve this problem conventionally by separating in time only (subframe or symbol resolution), or by cancelling the PDCCH in some subframes using interference cancellation techniques. Handling PDCCH is further described hereinbelo3w.

Figure 13A:
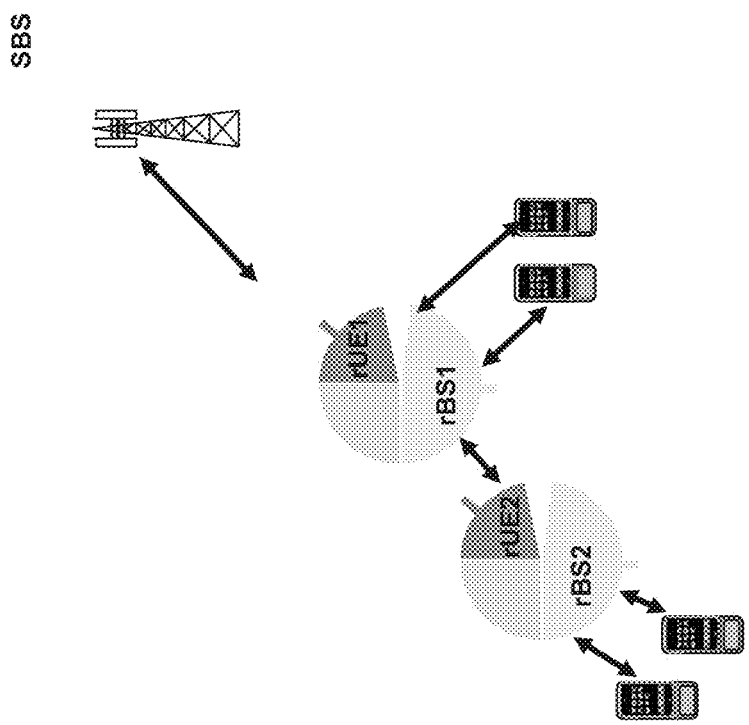
Figure 13B:
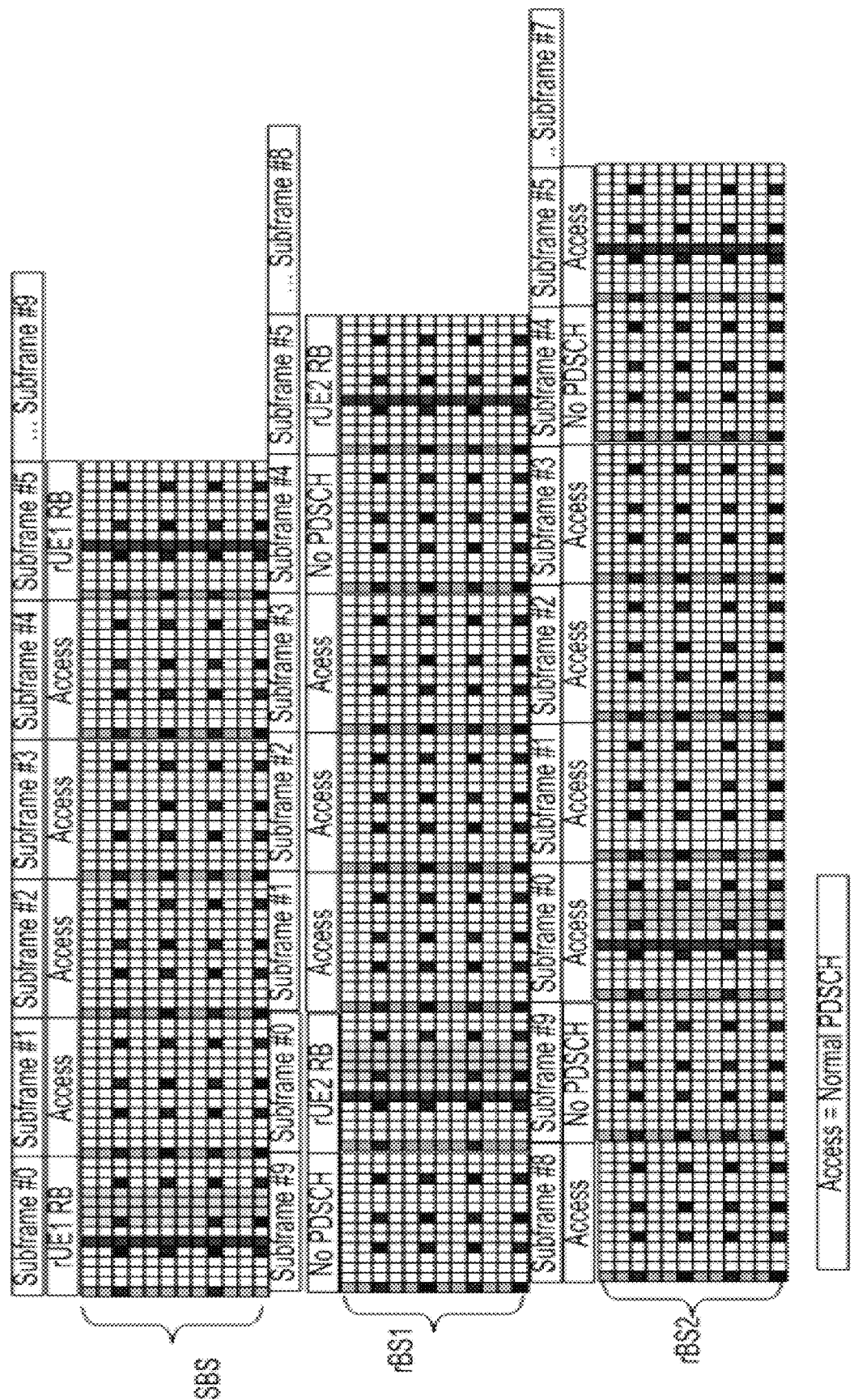

FIGS. 13a-13b pertain to a Dedicated Scheduler—PDCCH Channel.

It is possible to solve this problem conventionally by moving, say, 15-16 symbols in each relay with respect to the transmission of the other relays nearby. This is suitable for three "colors" in MIMO 2*2 and more "colors" in SISO mode.

Interferences of RS to B-CH and P-SS may be resolved using orthogonal antenna ports. Handling PDCCH is further described hereinbel3ow.

Figure 14:

FIG. 14 pertains to a Dedicated Scheduler—R-PDCCH.

Figure 15:
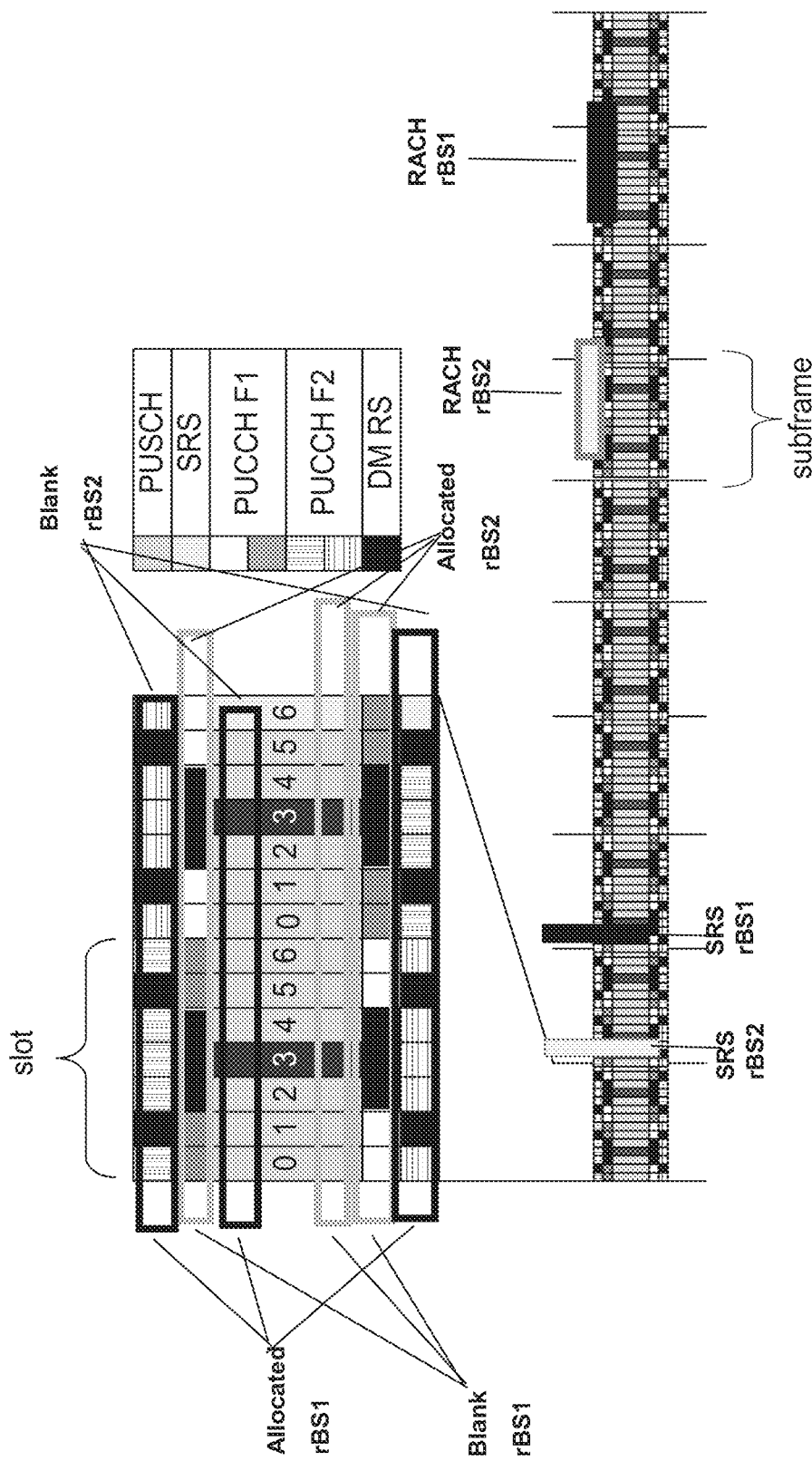

To prevent shifting or cancellation of certain PDCCH symbols, the standard added R-PDCCH. R-PDCCH is in a fixed RE in the PDSCH channel. R is relevant to Rel. 10 and up FIG. 15 pertains to a Dedicated Scheduler—PUCCH.

In PUCCH, it is possible to separate in both frequency and in time

In RACH, it is possible to separate in both time and frequency (6 RB)

In Sounding RS, it is possible to separate in time only (as it may be required to make measurements over the entire frequency)

Handling PUCCH is further described hereinbelo4w.

Dedicated Scheduler—Coordination:

It may be necessary to coordinate among the base stations of the relays, and between them and the static stations to send messages uplink and downlink. It may be necessary to synchronize the time between base stations to properly operate the scheduler in each It may be necessary to adjust free slots to transmit PDCCH and PBCH. And/or, it may be necessary to adjust free subframes to transmit access and backhauling A dedicated adjustment channel may be required to allocate channels and transfer allocations at a rate that is suitable for the scheduler.

Coordination between different network entities is further described hereinbelow5.

Dedicated Scheduler—Uplink Adjustment:

in the uplink, transmission typically occurs by receiving a grant from the base station; it may be necessary to coordinate between the base station that serves rUE and the base station that serves rBS.

It is possible to allocate static/semi-static GBR/SPS channels in advance. Coordination in the UL between different network entities is further described hereinbelo5w.

Dedicated Scheduler—Interfacing with a Static Network:

If it is required to connect the rUE to the static network and it is not possible to control the scheduler of its base station:

It is possible to add an IC mechanism in rUE and rBS to cope with interferences in ODCCH and PUCCH and move PBCH in time
    It is not definite that the IC mechanism provides the required separation
It is possible to add a UE proxy similar to the MBSFN solution
It is possible to add a base station whose scheduler can be controlled
A different band or small deviation (within the standard) in frequency may be used to add separation.

Separation Using a Dedicated Scheduler may be characterized by some or all of the following:
    Use of nearly standardized channels
    Includes the possibility for idle in rUE
    Possible separation in the UL frequency provided it is possible to control the allocation of PUCCH
    May require changes in PHY or relying on advanced standards (e.g. Rel. 10).

Figure 16:
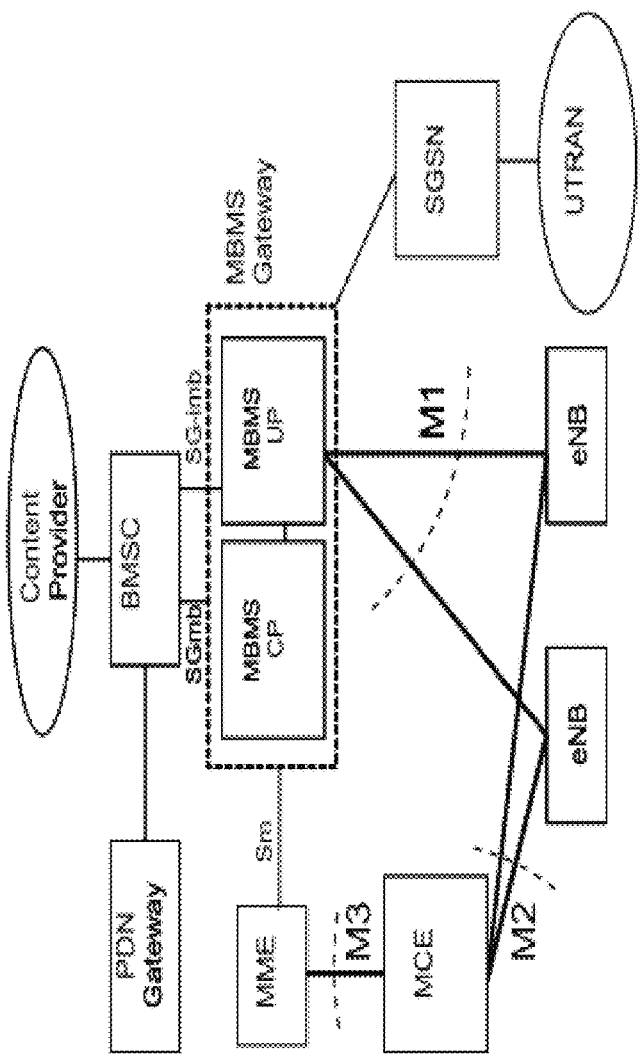
Figure 17:
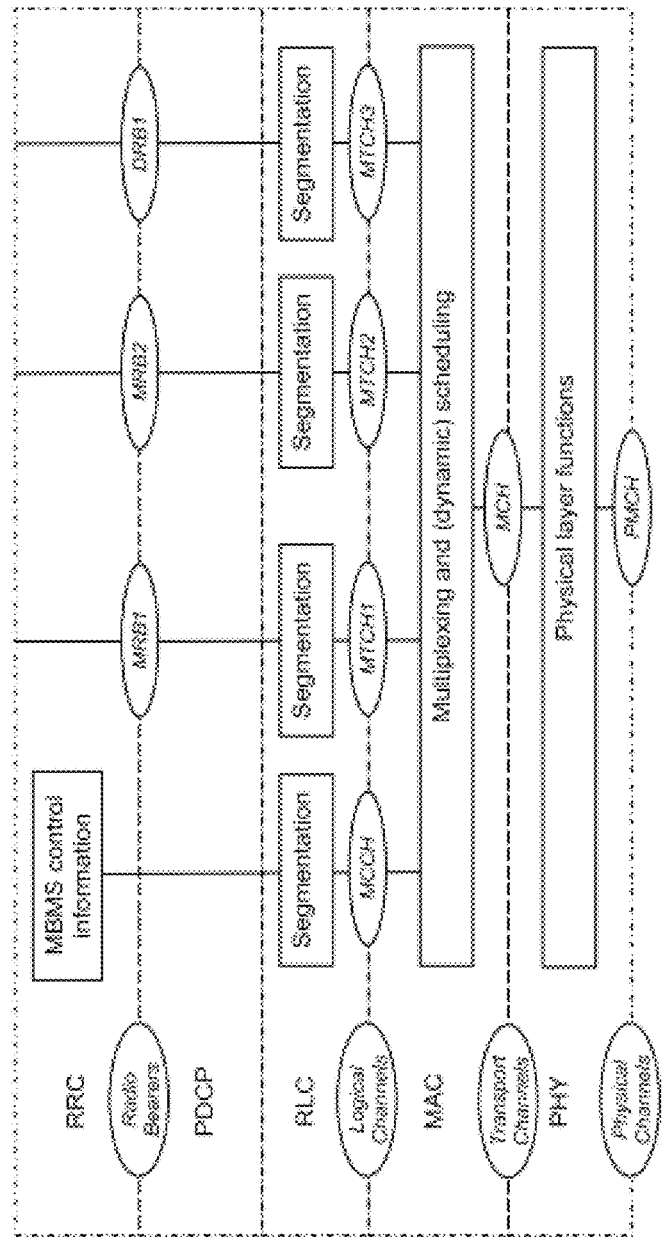
Figure 19:
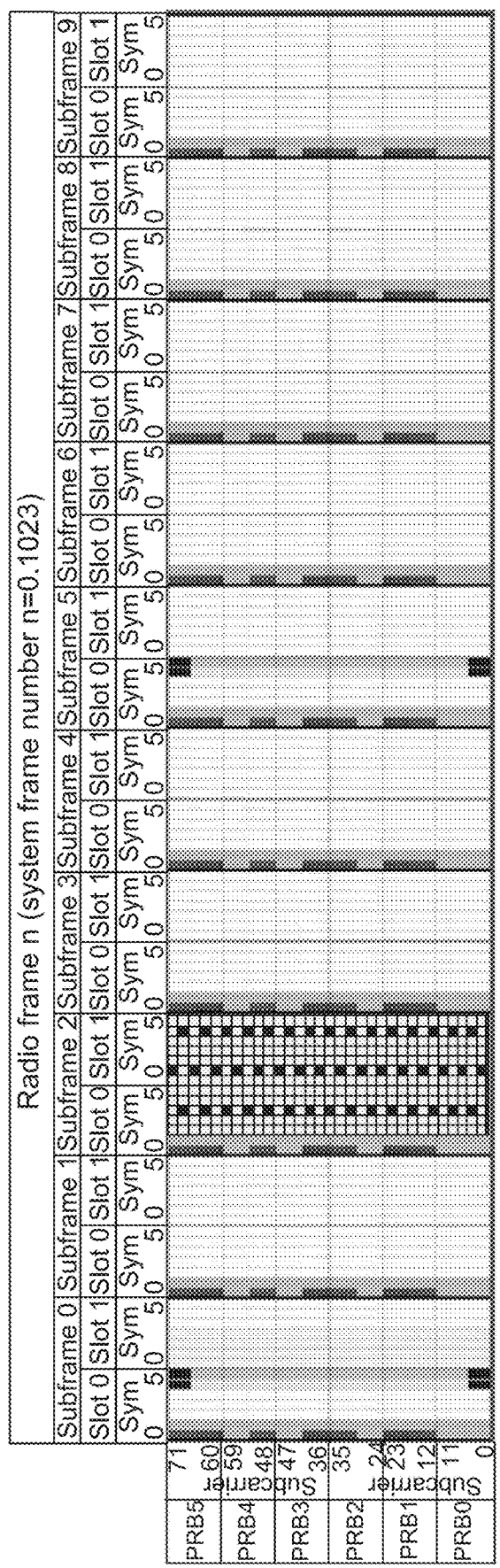
Figure 20:
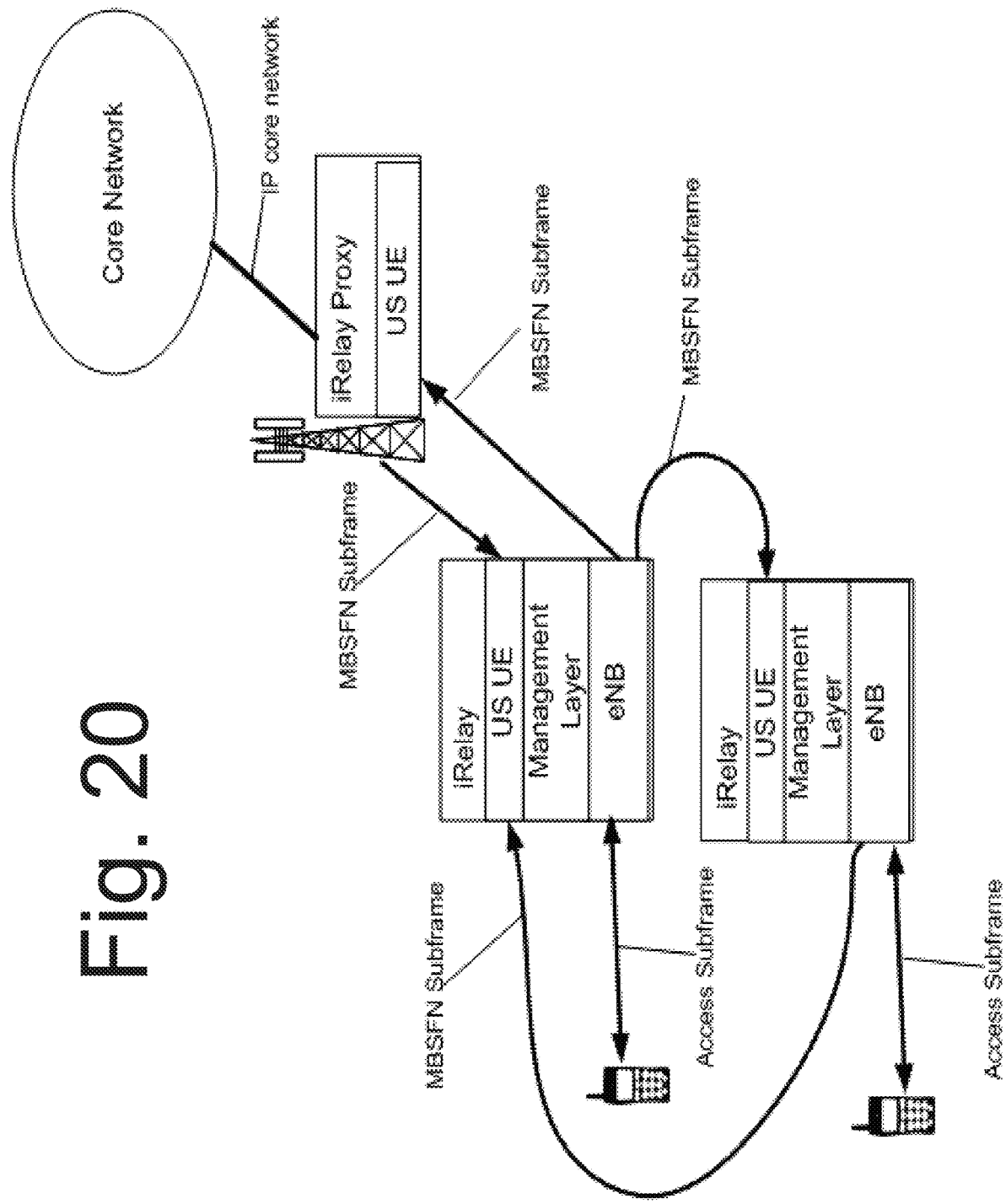
Figure 21:
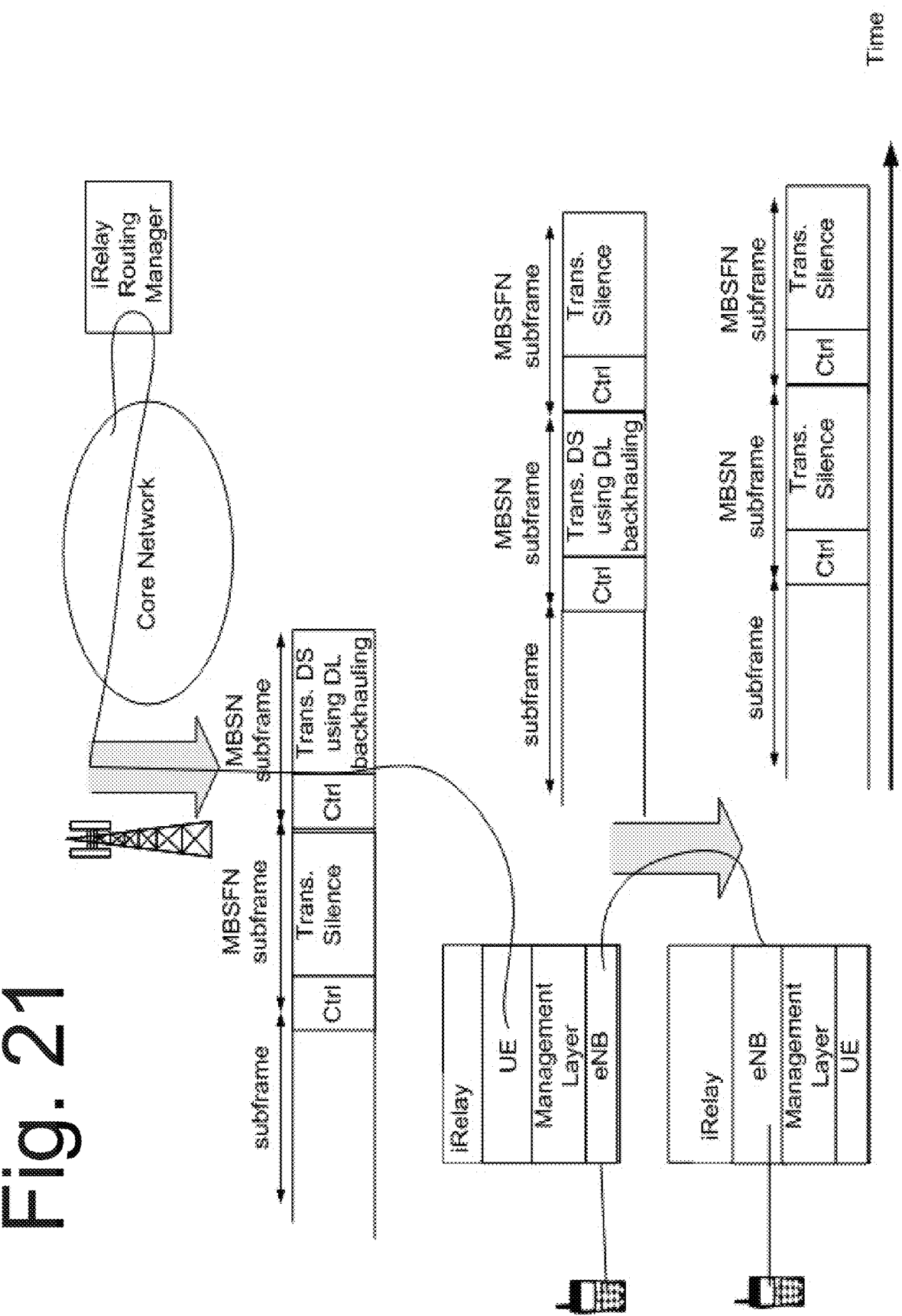
Figure 22:
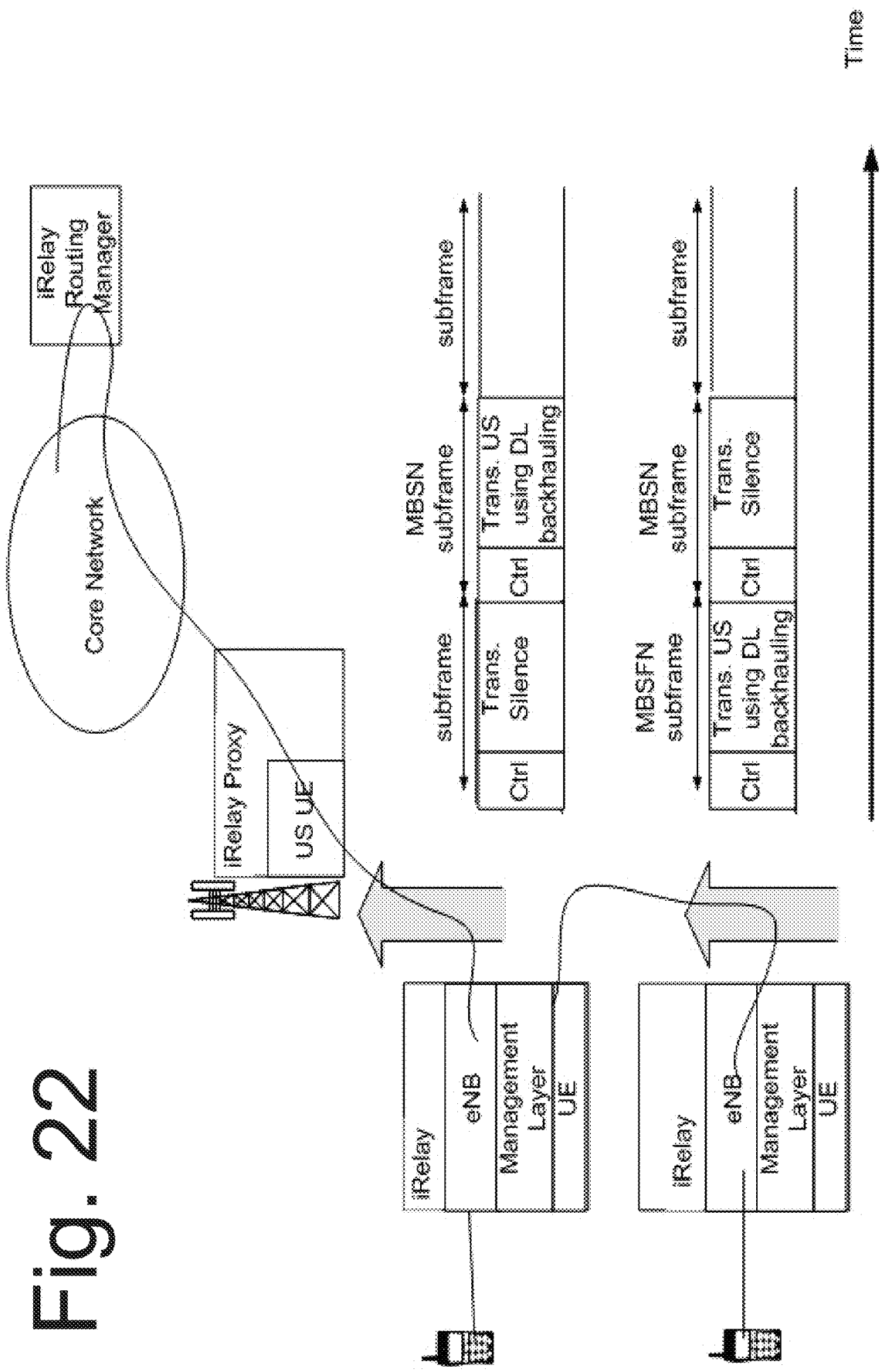
Figure 23:
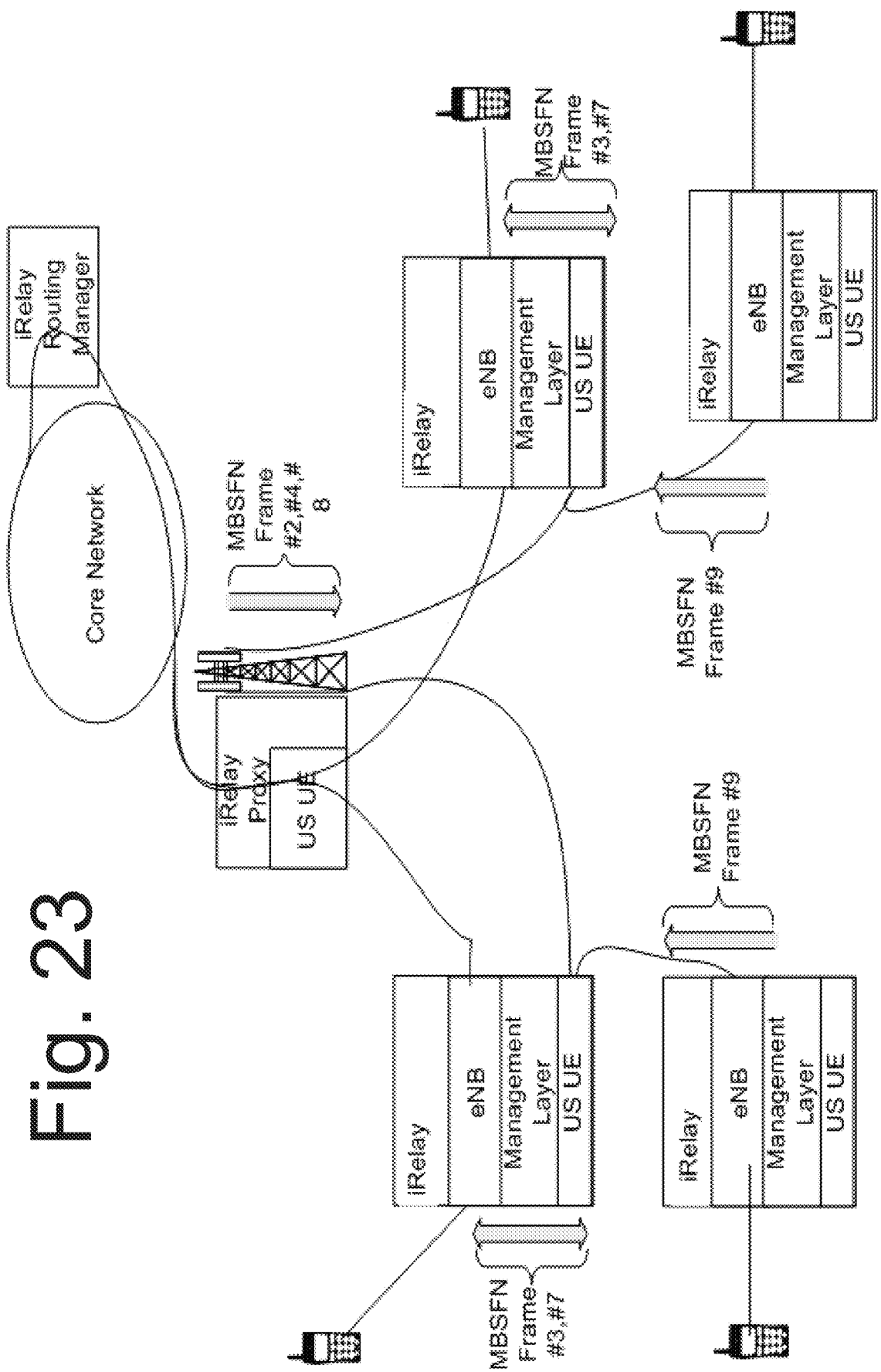

Alternative 3 including Separation Using MBSFN for Transmission is illustrated in FIG. 16 (MBMS Architecture).
FIG. 18 shows Distribution into Subframes.
    Typically, the standard defines subframes that can handle MBSFN transmissions. Some of the subframes may contain control signals; therefore, they can typically only transmit access (subframes 0,4,5,9 in FDD and 0,1,2,5,6,9 in TDD).
FIG. 19 shows a Frame Structure.
    The MBSFN channel takes an entire subframe, except for PDCCH, e.g. as shown in subframe 2 in FIG. 19.
        The MBSFN channel has unique DMRSs; typically, there is no transmission of CRSs that are in the PDCCH area
    FIGS. 20-22 are described in detail below.
    FIG. 23 pertains to use of MBSFN. Shown is an example of reuse of subframes ( #3,7,9) between two separated groups of relays (two right-side relays and two left-side relays) that are both connected to the static base station.

MBSFN Separation—Dedicated Communications Layer:
    A dedicated communications layer may be required on the multicast radio bearer; it may be used to transmit backhauling messages
    The communications layer includes MAC and network layers similar to the MAC layers in a mesh network
    It is possible to make channel measurements based on the MBSFN's RS or via another method (TPC, DFS) in higher layers.

MBSFN Separation may be characterized by some or all of the following:
    Does not affect the bandwidth of UL
    May require one amplifier for rBS only
    Significant flexibility in color reuse
    Does not require full rUE but mainly an MBSFN receiver
    May require time synchronization between moving relays
    Addition of a UE proxy
    Implementing dedicated MESH-type Layers 2+3
    Implementing dedicated handover mechanisms Alternative 4 is now described in detail, including an Integrated Solution having a Dedicated Scheduler, Empty MBSFN and Space and Space Separation.
MBSFN Separation may be:
    Similar to Alternative 2
        May provide an option of making measurements more easily in backhauling subframes
    May require time synchronization between moving relays
    May require base stations that support MBSFN
    May require interfaces to modify symbols timing Comparison between the Alternatives may yield some or all of the following differences:

|  | Frequency + Space | Dedicated Scheduler | MBSFN | Integrated |
|---|---|---|---|---|
| Hardware requirements may include: | Dedicated antenna, IC, base station and standard dongle | Base station, dedicated dongle + Re (eICIC), synchronization clock | MBSFN-based case station and dongle, synchronization clock | Dedicated base station and dongle, eICIC + Re (MBSFN), synchronization clock |
| Required feature may include: | Dedicated antenna; manager for allocating frequency resources | Dedicated scheduler and interfaces for BS and rUE Manager for managing allocation of RBs in DL and UL Solution for synchronization and BCH channels | Dedicated scheduler + MAC Manager for managing the allocation of subframes | Dedicated scheduled and interfaces for BS and rUE Manager for managing allocation of RBs in DL and UL Solution for synchronization and BCH channels |

Comparison between the Alternatives may also yield some or all of the following differences:

|  | Frequency and Space | Dedicated Scheduler | MBSFN | Integrated |
|---|---|---|---|---|
| Operation with an existing network | Simple | May require coordination with a scheduler of the static network May require scheduler with a blank subframe | May require UE proxy | May require coordination in UL In DL it is possible to rely on the MBSFN map |
| Characteristics | Changes in rUE, rBS only in Layer 3 Standard SBS Use of DL for DS and UL for US | Use of DL in DS and UL in US Flexibility of bitrates Possible separation in the UL frequency provided it is possible to control the allocation of PUCCH | May require an amplifier in rBS only No need for rUE, mainly an MBSFN receiver Use of DL for DS and DL for US (does not affect UL) | Similar to solution 2 including improvement in RS measurements in channels defined as MBSFN almost blank subframe |

-continued

|  | Frequency and Space | Dedicated Scheduler | MBSFN | Integrated |
|---|---|---|---|---|
|  |  |  | Based on the standards Very flexible in reuse colors |  |

Comparison between the alternatives may yield some or all of the following differences:

|  | Frequency and Space | Dedicated Scheduler | MBSFN | Integrated |
|---|---|---|---|---|
| Disadvantages | Dedicated antenna and IC Low bandwidth (rigid distribution of the frequency) Dedicated solution to replace the main frequency | Changes in rUE, rBS in Layer 1 May require synchronization between all base stations (rBS, SBS) May require (rBS, sBS) scheduler with blank subframe Separation in DL only at the time level | May require for MBSFN supported in Rel. 9 May require synchronization between all base stations (rBS, SBS) Addition of rUE proxy for the static network Addition of dedicated Layers 2 + 3 May require Dedicated measurement and handover mechanisms Separation in time only | May require for MBSFN supported in Rel. 9 May require synchronization between all base stations (rBS, SBS) May require interfaces to change timings to Layer 1 and rBS |

An embodiment of Alternatives 3 and 4, characterized by Separation in Time through MBSFN Channels for Relaying, according to certain embodiments, is now described.

Figure 24:
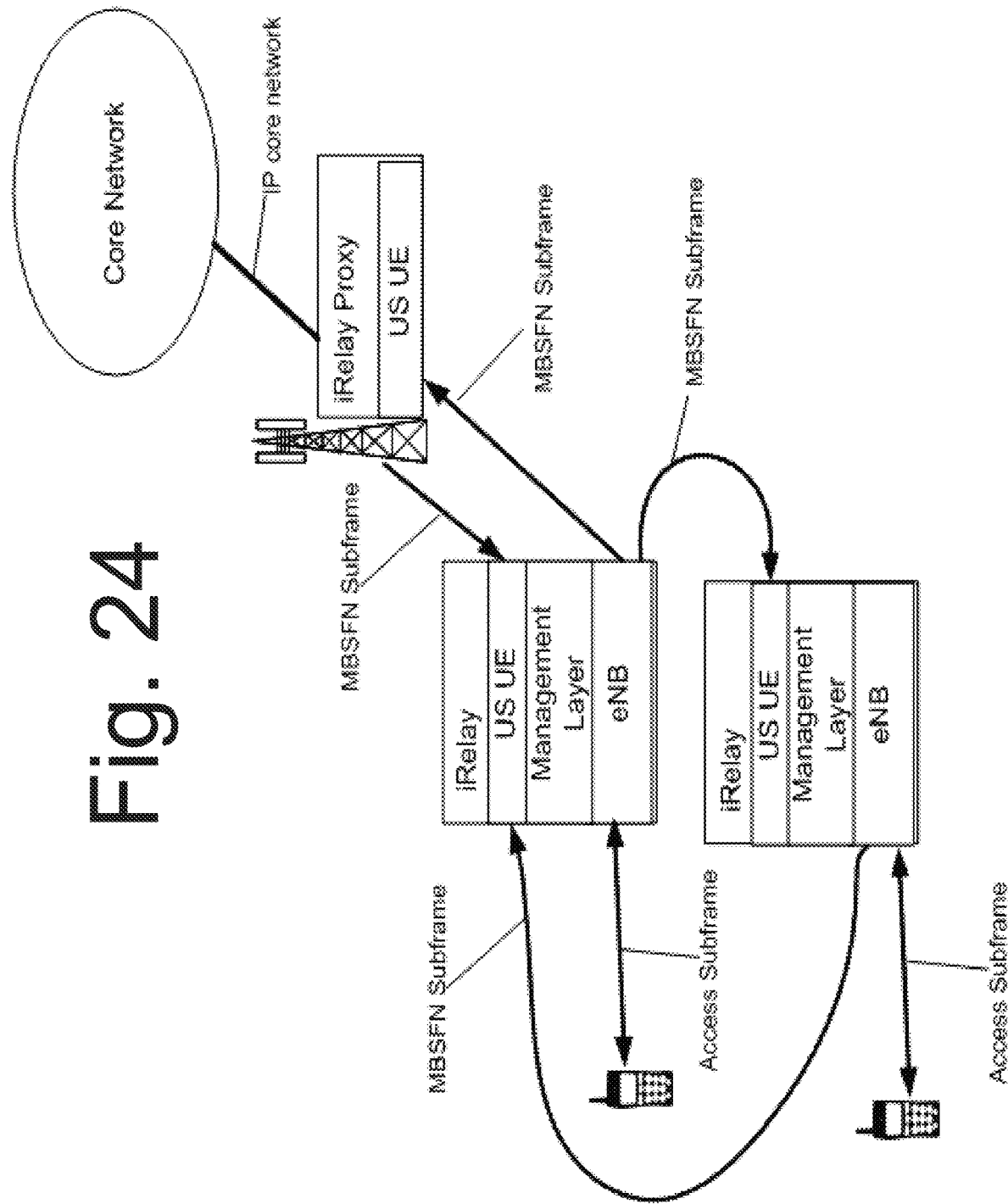
Figure 25:
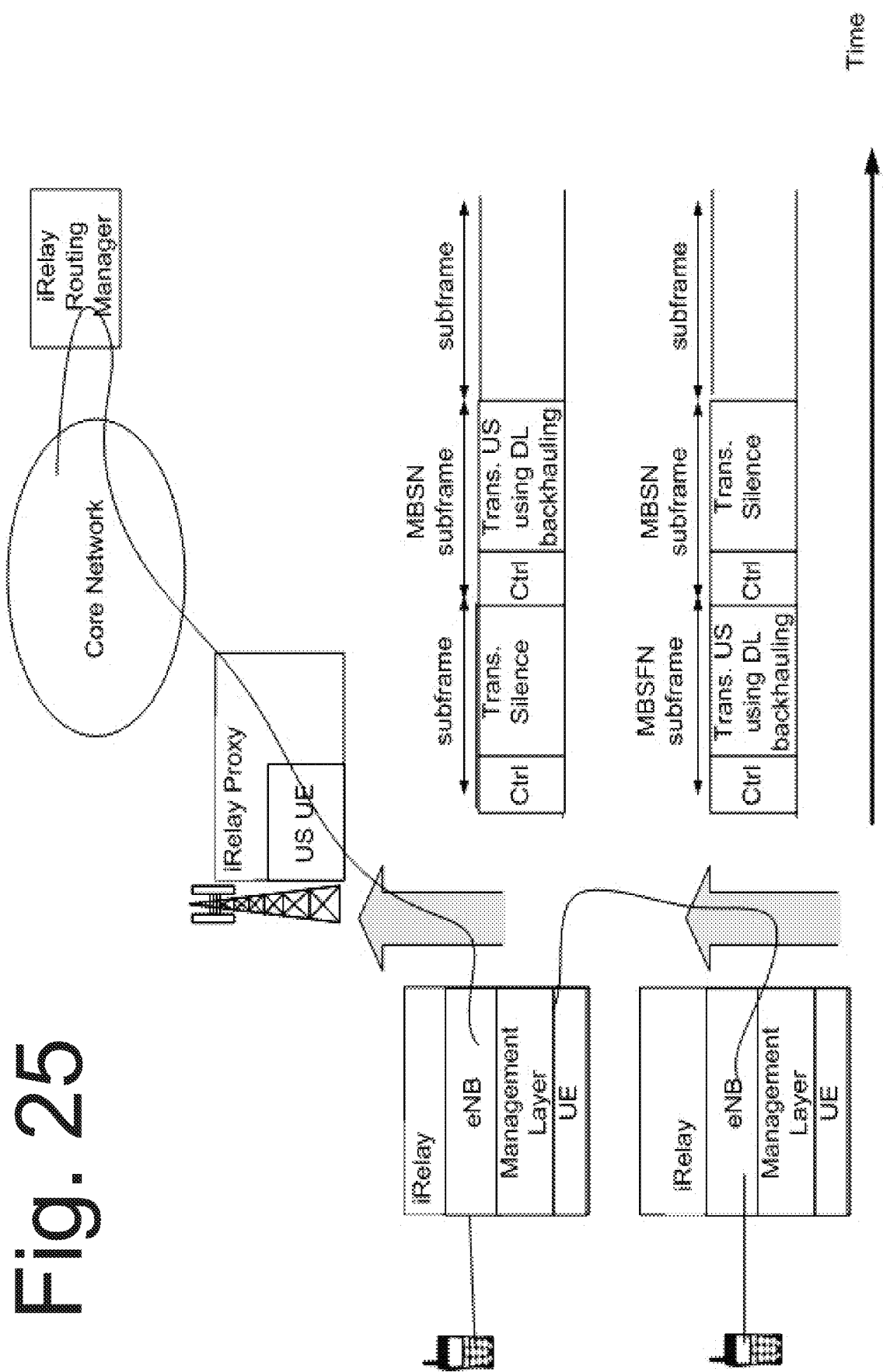

FIG. 24 shows Alternative 3 which employs use of MBSFN—DL: e.g. as per FIG. 21, as described in detail hereinbel7ow.

FIG. 22 illustrates Alternative 3—Using MBSFN—UL and an example, e.g. as described in detail hereinbel8ow.

Figure 26:
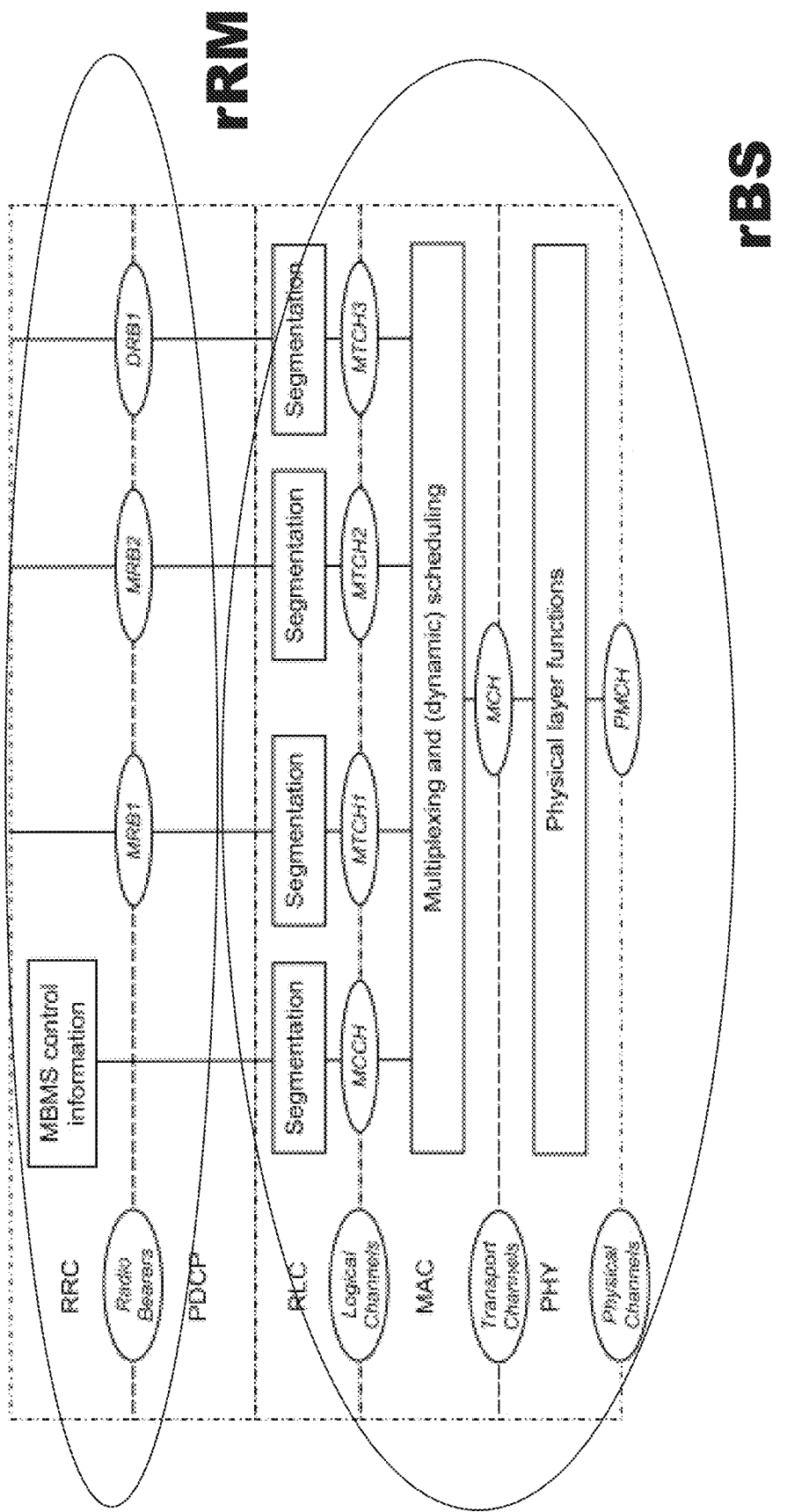
Figure 27:
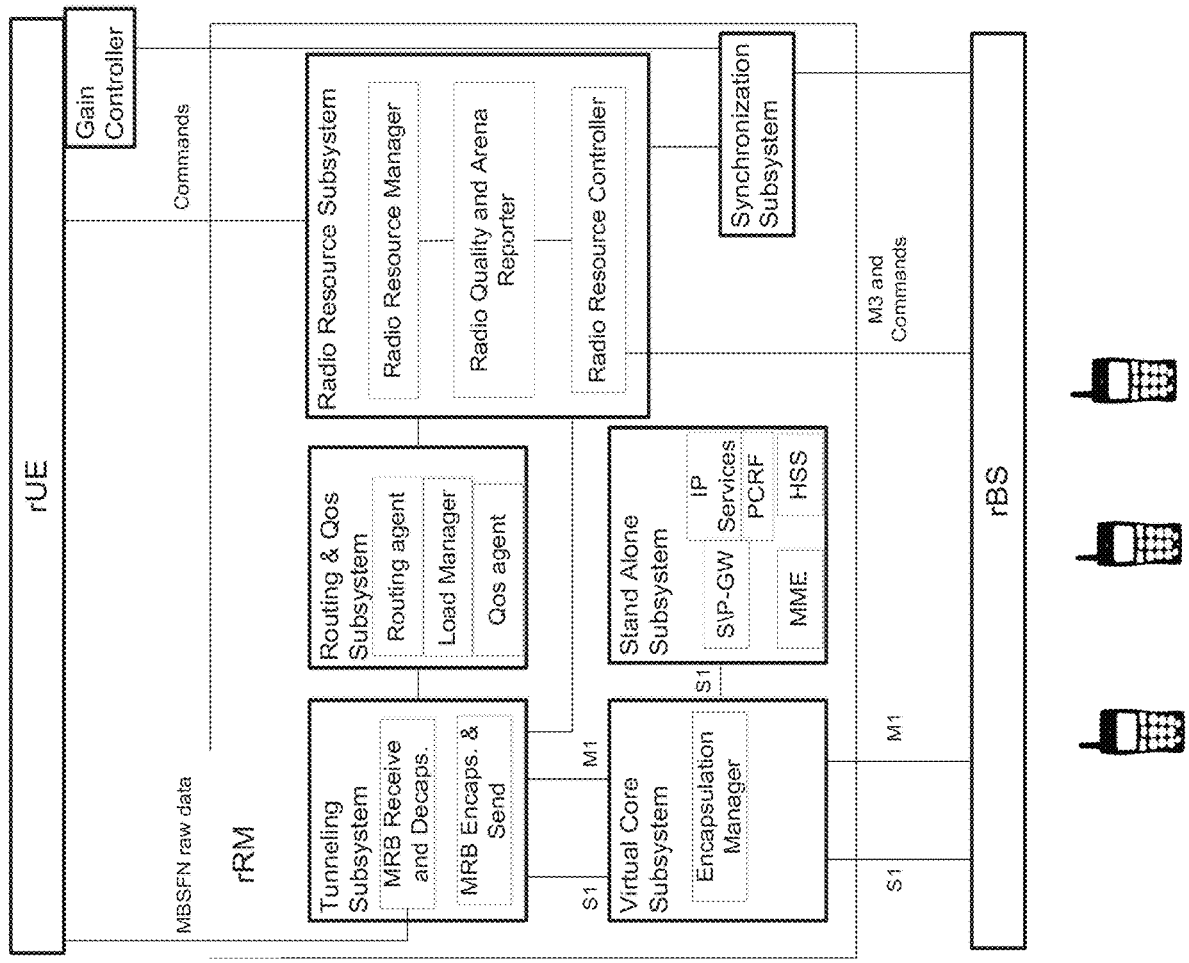

FIG. 26 pertains to MBMS in LTE and the allocation of functionalities to the different parts of the relay (rBS and rRM). FIG. 27 pertains to Alternative 3—rRM Structure and interfaces.

Figure 28:
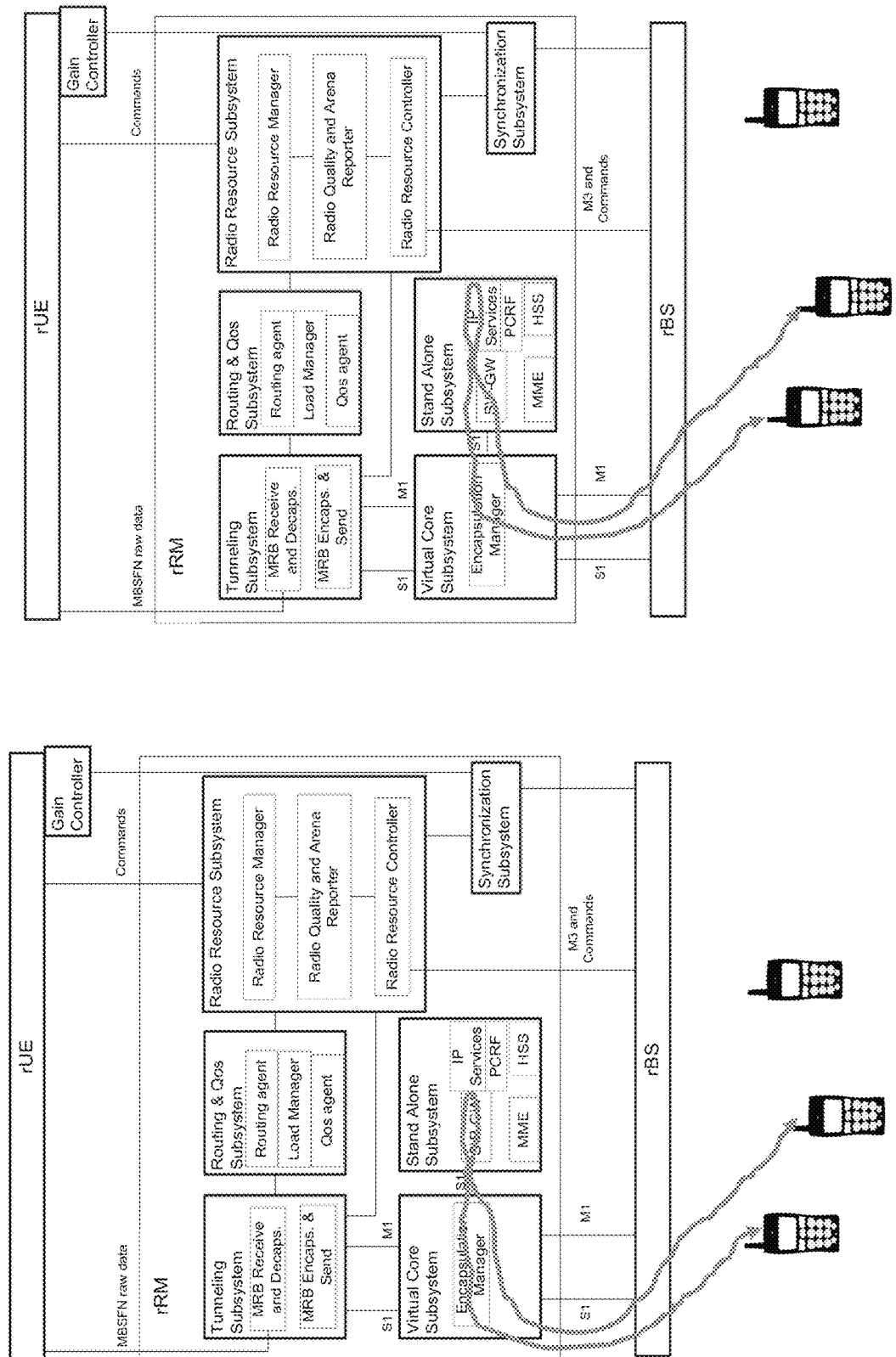

FIG. 28 pertains to Alternative 3—Local Service of two relays; there follows below a detailed description of certain considerations for the embodiments of FIGS. 26-28.

Figure 29:
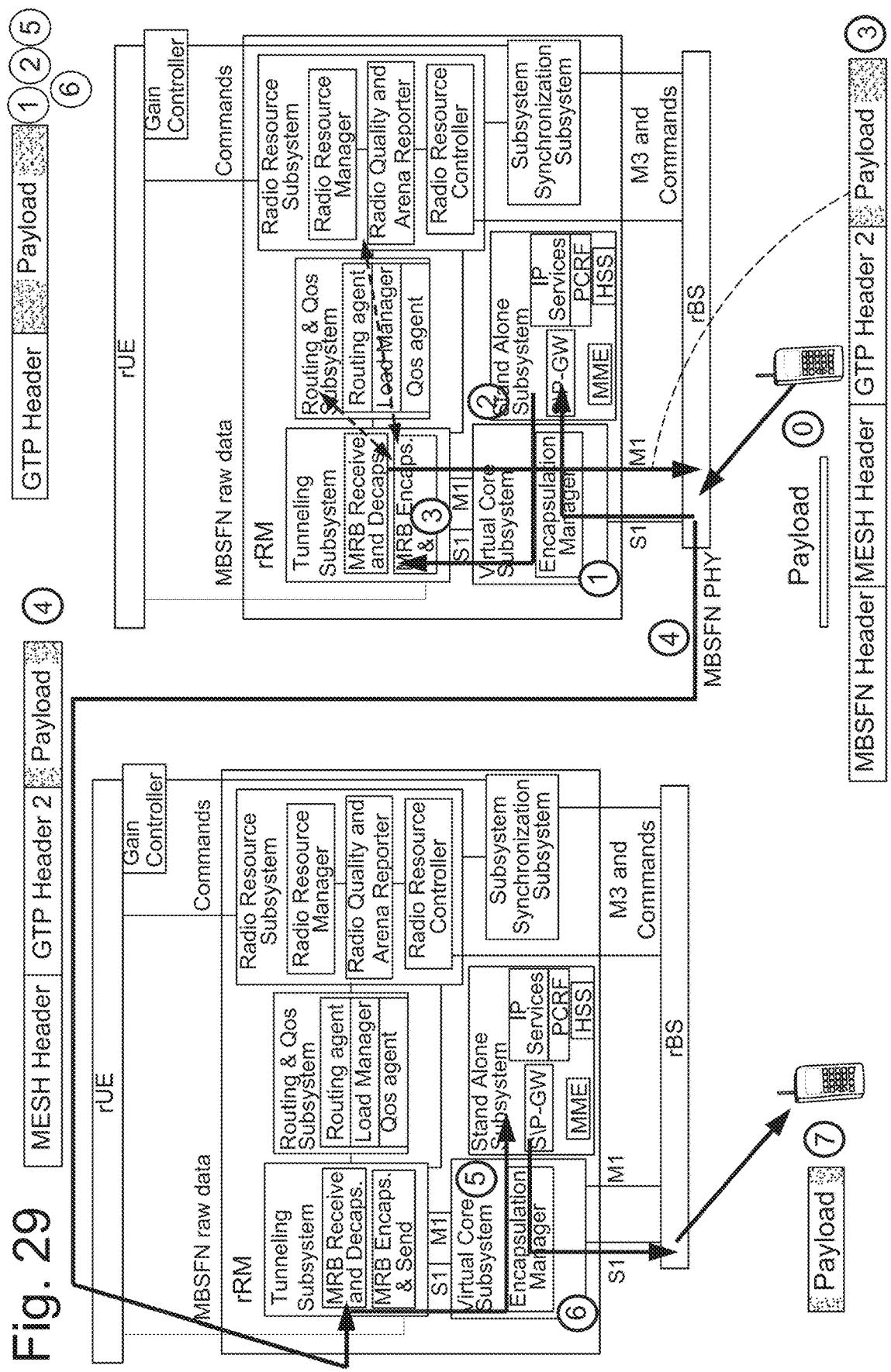

FIG. 29 pertains to Alternative 3—Backhauling Support. In this example a link between two mobile devices each connected to different relay is described.

Step 0—payload is sent over the standard air interface from mobile device to rBS.

Step 1—the payload is then transferred from the rBS over the S1 interface to the Virtual Core Subsystem of the relay located inside the rRM. The Virtual Core Subsystem then transfers the payload to the P-GW inside the Stand-Alone Subsystem (local core).

Step 2—The P-GW understand that this payload is destined to different core and then is encapsulate it and send it to the target core. This message is then transferred to the Virtual Core Subsystem and from there it is routed internally to the Tunneling Subsystem (S/S).

Step 3—The Tunneling S/S first adds a MESH header with the destination node of the message. In addition, by questioning the Routing and QOS S/S and Radio Resource S/S, Tunneling S/S determines the radio subframe (time-slot) and MRB that Tunneling S/S is to use and adds the appropriate MBSFN Header. Then Tunneling S/S transfers the message to the rBS for transmission in MBSFN channel.

Step 4—The rBS decapsulates the MBSFN header and transmits the rest of the message over the requested MBSFN subframe. This message is received by the destined rUE, which transfers the message to the Tunneling S/S.

Step 5—The Tunneling S/S decapsulates the MESH header and determines that the destination is the Stand-Alone S/S (local core). Then it transfers the rest of the message to the Stand-Alone S/S through the Virtual Core S/S.

Step 6—The Virtual Core S/S then transfers the data, e.g. using a GTP standard tunnel, to the local rBS.

Step 7—The rBS transmits the payload over the standard air interface.

Alternative 3: Tunneling Subsystem is characterized by some or all of the following:

Responsible for introducing and transferring messages in the relay network, e.g.:
  S1 or moving relay control messages
  Connects between the destination address and MRB (Multicast radio bearer), adds the corresponding header (including encryption), and sends the header over M1 to a virtual core subsystem Responsible for adding a proprietary mesh header to the relays network, for example, in case of a multihop Receives MBSFN messages from rUE e.g.
Separates between S1 or Moving relay messages
Manages queues and sends Ack/Nack
Sends multihop messages to NH
Decapsulate/opens messages Typically, according to Alternative 3, the Virtual Core Subsystem is characterized by some or all of the following:

Switch apparatus which differentiates data which is to arrive directly at the rBS over the S1, from data which data which is to arrive at another base station over a broadcast channel e.g. M1. The switch apparatus may comprise a Switch point between data from the EPC; may require encapsulation to M1 that goes to the tunneling subsystems, and data from the EPC and then directly to the rBS Switch point between a disconnect state (sends to a standalone EPC) and a connect state (stationary EPC)

Analyzes network traffic to identify various states e.g.:
Active bearers
Disconnect or no disconnect state Alternative 3—Standalone Subsystem may be characterized by some or all of the following functionalities:

Provides EPC in case of a disconnection from the static network

Figure 30:
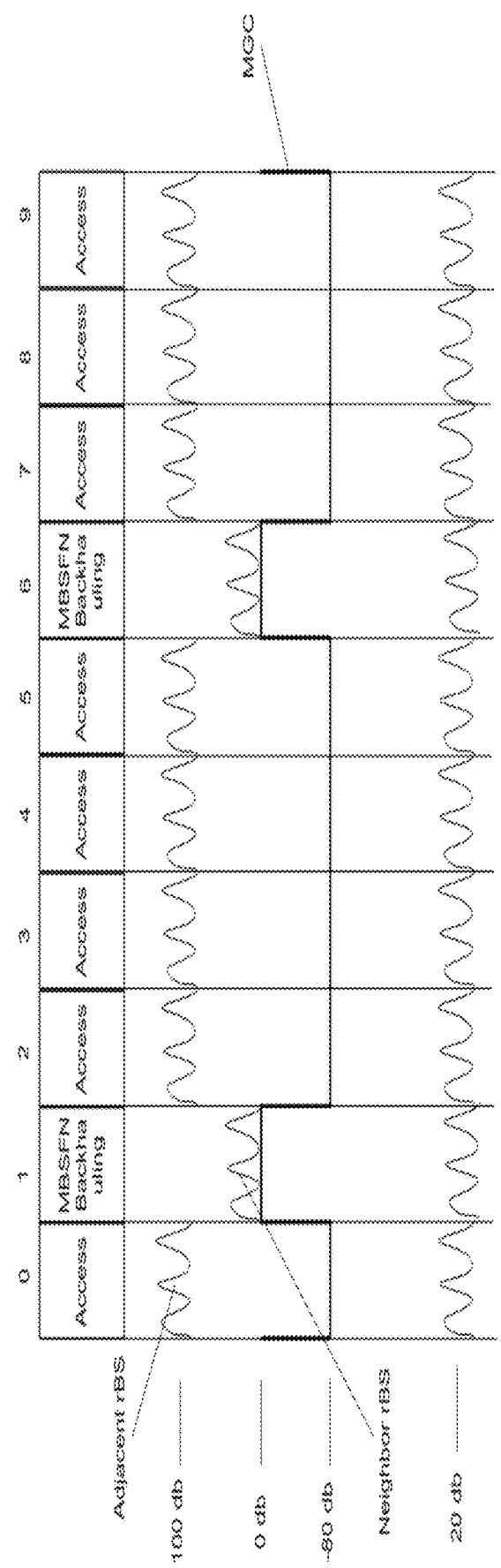

When operating with distributed EPCs, typically provides communication services to all users registered e.g. attached or connected registered in the base station, and to other users registered in the local EPC or in other EPCs Alternative 3—Routing and QoS Subsystem may be characterized by some or all of the following functionalities:

Responsible for QoS and routing in the multihop system
Manages the routing table to the multihop network
Receives updates of records from the radio resource subsystem and from other routing agents in the system
Manages the mesh routing method
Responsible for load control, management of the number of registered users, allocation of larger backhauling bandwidth/with higher frequency Alternative 3—Radio Resource Subsystem may be:
Responsible for managing MRBs e.g.:
Creates MRBs
Manages allocations and erases channels
For example, as a result of bandwidth requests or topology changes
Coordination and registration with neighboring stations
Radio measurements for the backhauling network Alternative 3—Synchronization Subsystem may provide:
Time synchronization at an open level, from a symbol between base stations (also in disconnected state); and/or
Time synchronization with the radio resource subsystem and with rUE Alternative 3—Adding Core Stationary: typically, MBSFN gateway:
Converts S1 to M1 and/or
Manages the mesh network into several UE proxies and/or
Manages the MRB of the static base stations UE proxy FIG. 30: Dedicated Gain Control, is typically characterized by one or more of the following:

Using a mechanism similar to Limiter, Blanking, MGC (Manual Gain Control) or IAGC (Instantaneous Automatic GC) to normalize the signal received in rUE, rUE synchronizes to the adjacent rBS' signal but receives MBSFN transmissions of the neighbor base station while the adjacent rBS is silent E.g. 80 dB attenuator that can operate at 0.1 micro may be employed.

Alternative 3—Base Station Requirements may include some or all of:

Support of MBSFN and M1, M3 interface or similar
Support of dynamic changes in SIB13 of the rBS from external-to-rBS source (using the interface between the Radio Resource S/S to the rBS)
Support of several service areas of MBSFN
Extended CP operation (in MBSFN areas)
Interfacing with an external clock for Synch
Support of blank MBSFN subframe
There is no RS in an empty transmission of MBSFN Alternative 3—rUE Requirements may include some or all of:

Support receiving standard MBSFH channels
Possibility to cope with transmission
Synchronization of the receive power for the data area only (without control area)
Extended CP operation
Possibility to read SIB13 without attachment Scheduler Separation Using Empty MBSFN Channels is now described.

Alternative 4 typically includes Integration of a Dedicated Scheduler and MBSFN:

Dedicated scheduler for effecting some or all of the following:
Dynamic allocation of time-diverted subframes in DL
Dynamic allocation of PUSCH and PUCCH channels in UL, and/or
Use of MBSFN channels as almost blank subframes in DL e.g.
Useful due to lack of CRS transmission in MBSFN FIG. 31 pertains to a Dedicated Scheduler (UL example) e.g. as described in detail hereinbelow.

Figure 32:
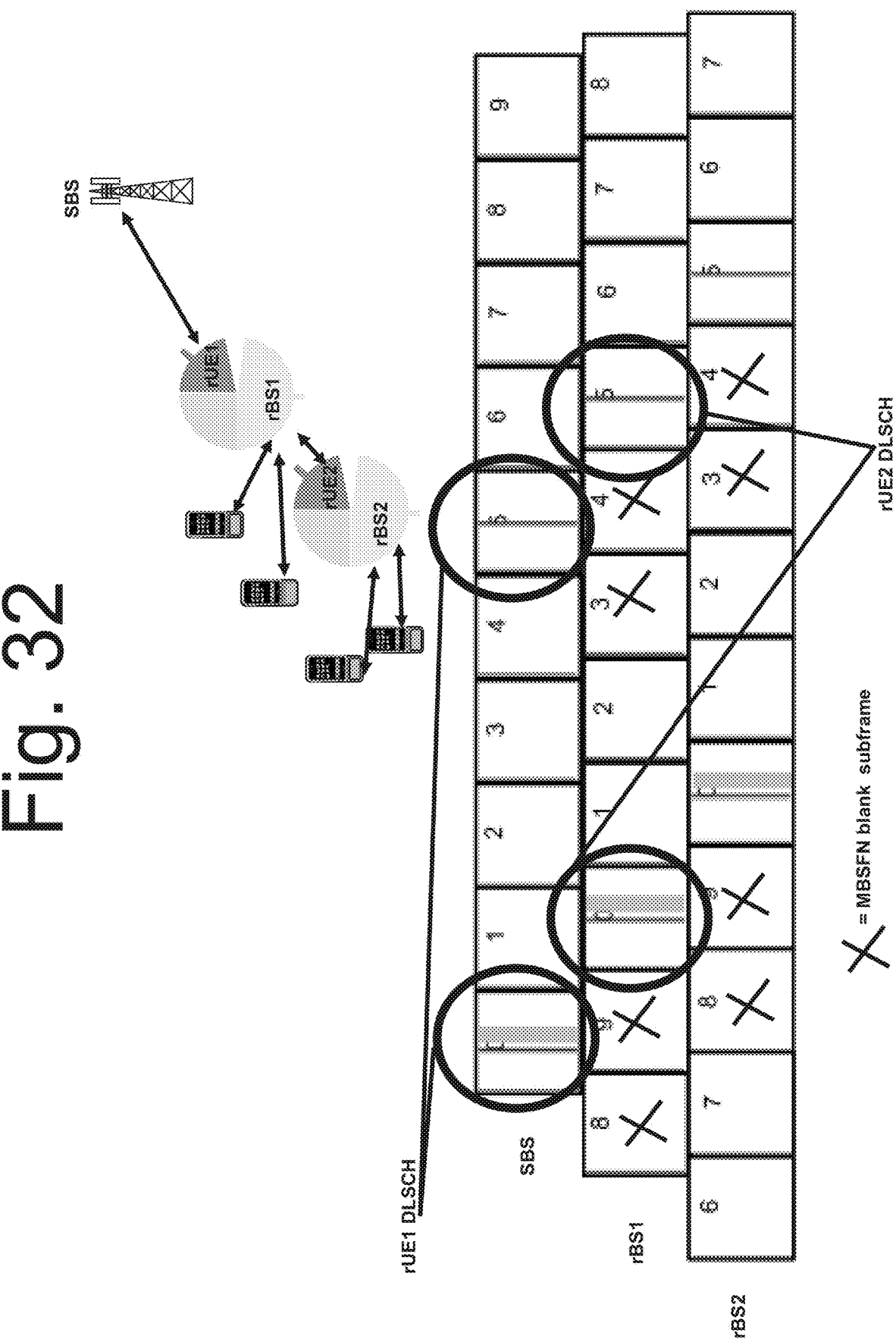

FIG. 32 pertains to a Dedicated Scheduler for DL. The scheduler may be characterized by at least one of the following:

Movement of 15-16 symbols (forward and backward) in each hop to solve the problem of running over BCH, PDCCH
Use of MBSFN to silence "PDSCH area" of the subframe and reducing the content in PDCCH as much as possible.
Optional addition of a dedicated interferences cancellation or dedicated gain control mechanisms to cancel/lower interferences.

Figure 33:
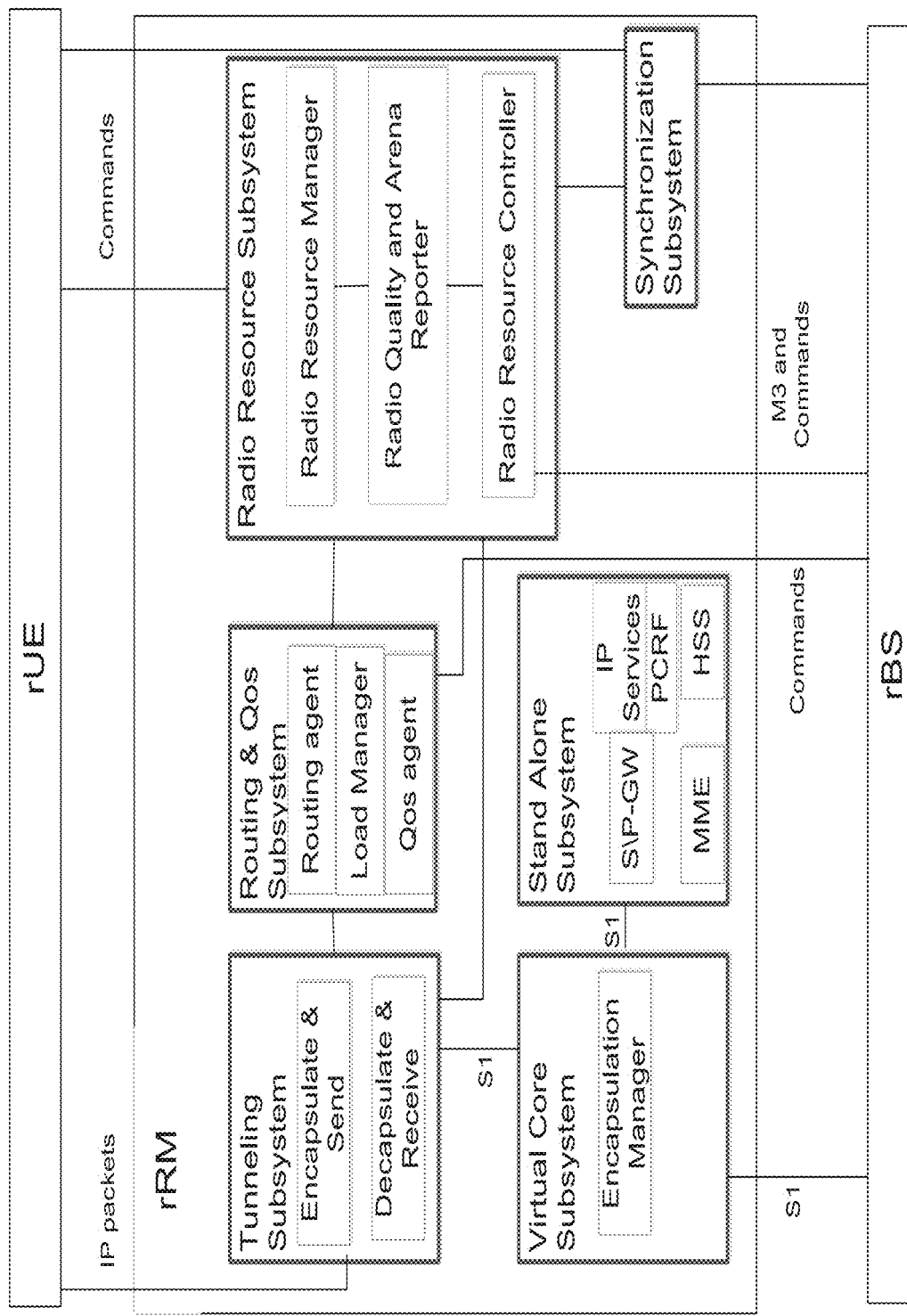

FIG. 33 pertains to RRM Structure and interfaces for Alternative 4.

Figure 34:
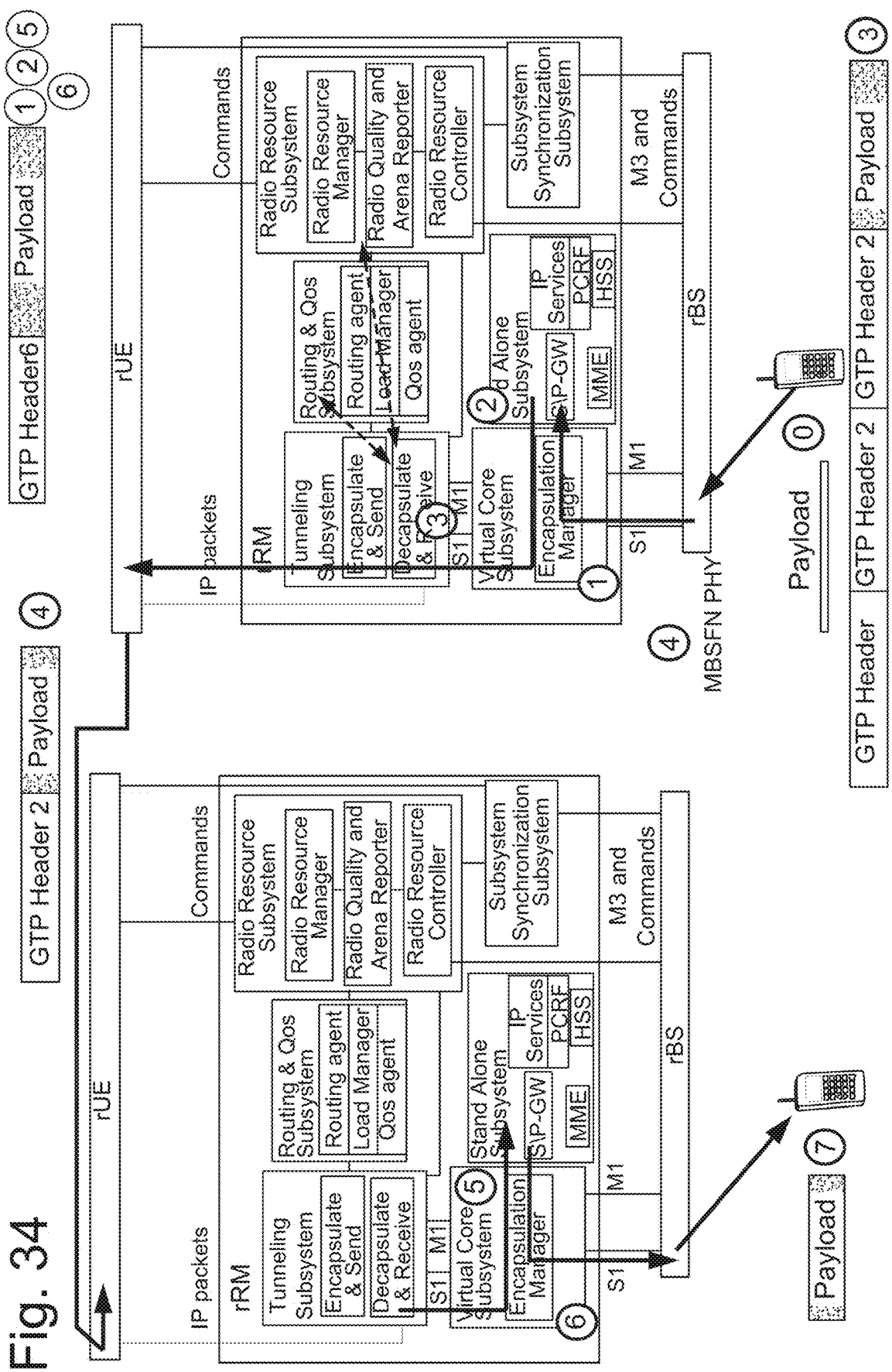

FIG. 34 pertains to Backhauling Support for Alternative 4. Alternative 4 typically comprises a Tunneling Subsystem which is typically characterized by one or more of the following:

Responsible for introducing messages [in/to] the relays network
S1 or Moving relay control messages and/or
Receives and sends backhauling messages via rUE
Separates between S1 or Moving relay control messages and/or
Encrypts/opens messages Alternative 4 typically comprises a Virtual Core Subsystem, which is typically characterized by one or more of the following: Switch apparatus which determines whether to route data directly over S1 to rBS, or whether to route the data to the tunneling subsystem as data destined for the genuine core or for another base station. The switch apparatus may comprise a Switch point between data from the EPC; may require encapsulation to S1, then goes to the tunneling subsystems, and between data from the EPC and then directly to the rBS and/or Switch point between a disconnect state (sends to a standalone EPC) and a connect state (stationary EPC) and/or Analyzes network traffic to identify various states
        Active bearers
        Disconnect or no disconnect state Alternative 4—Standalone Subsystem, is typically characterized by one or more of the following:

Provides EPC in case of a disconnection from the static network, and/or

When operating with decentralized EPCs, provides communication services to all users that are Attached i.e. Connected or are registered in the base station, and also to other users registered in the local EPC or in other EPCs Alternative 4—Routing and QoS Subsystem, is typically characterized by one or more of the following:

Responsible for QoS and routing in the multihop system
        Manages the routing table to the multihop network, and/or
        Receives updates of records from the radio resource subsystem and from other routing agents in the system and/or
        Manages the tree of hierarchies and/or
        Responsible for at least one of: load control, management of the number of registered users, allocation of larger backhauling bandwidth/with higher frequency Alternative 4—Radio Resource Subsystem, is typically characterized by one or more of the following:

Responsible for managing the radio resources of rBS
        Marks silent and transmission areas in UL/DL and/or
        Coordinates and logs with neighboring stations and/or
        Receives and measures neighbors via rUE/rBS and/or
        Determines the symbol for commencing transmission Alternative 4—Synchronization Subsystem, is typically characterized by one or more of the following:

Time synchronization at an open level, from a symbol between base stations (also in disconnected state) and/or Time synchronization with the radio resource subsystem and with rUE Alternative 4—Base Station Requirements may include some or all of:

Support of blank MBSFN subframe transmission
        Support of dynamic changes in SIB 13 and/or
    Support of synchronization of the first symbol and/or
    Interfacing with an external clock and/or
    External handover command and/or
    Control of frequency allocation of PUCCH, PUSCH and Sounding RS frequency and/or
    Control of time allocation of PDSCH, Sounding RS, PRACH and/or
    Control of allocation of PDCCH (option).

Figure 35:
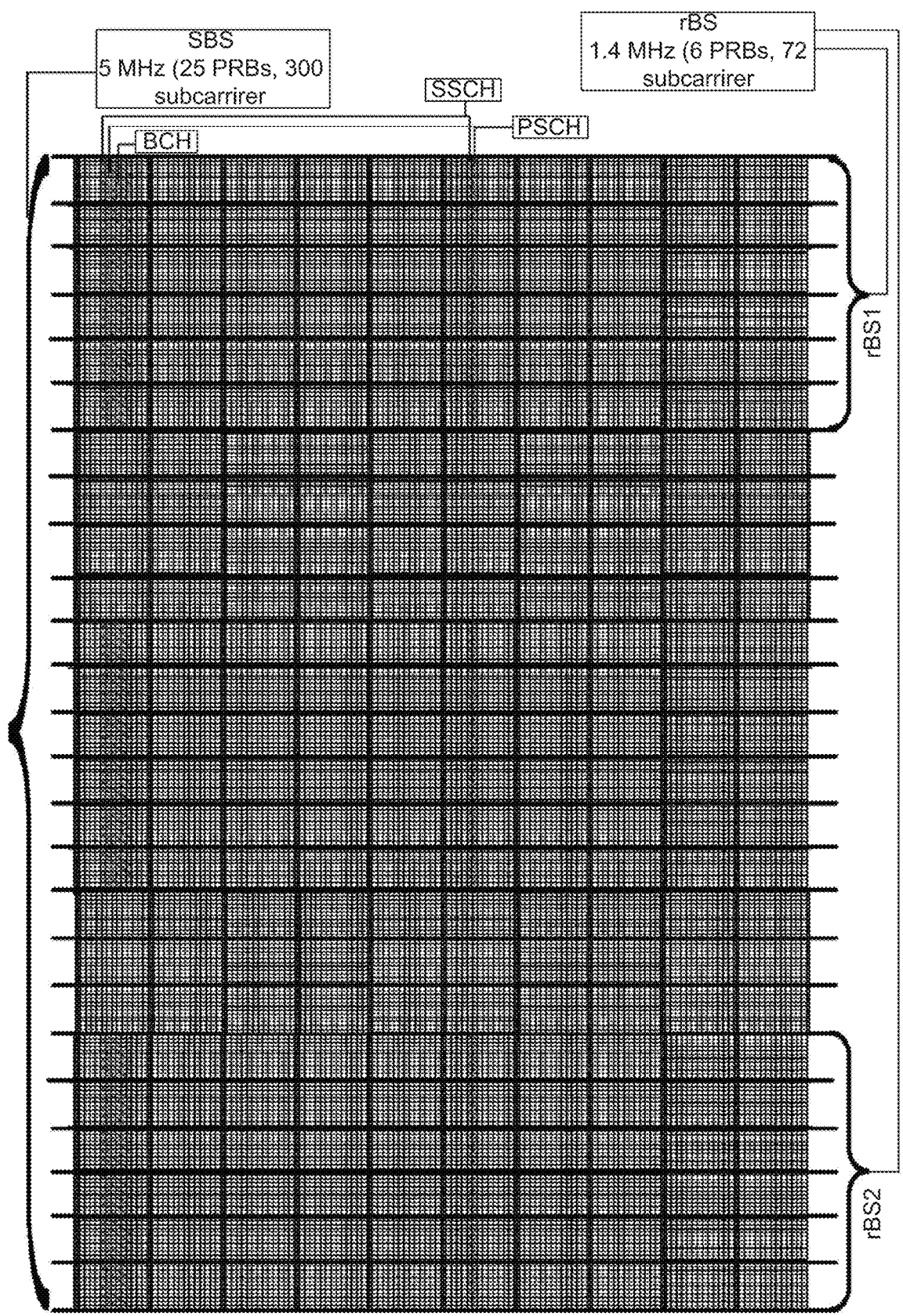
Figure 36:
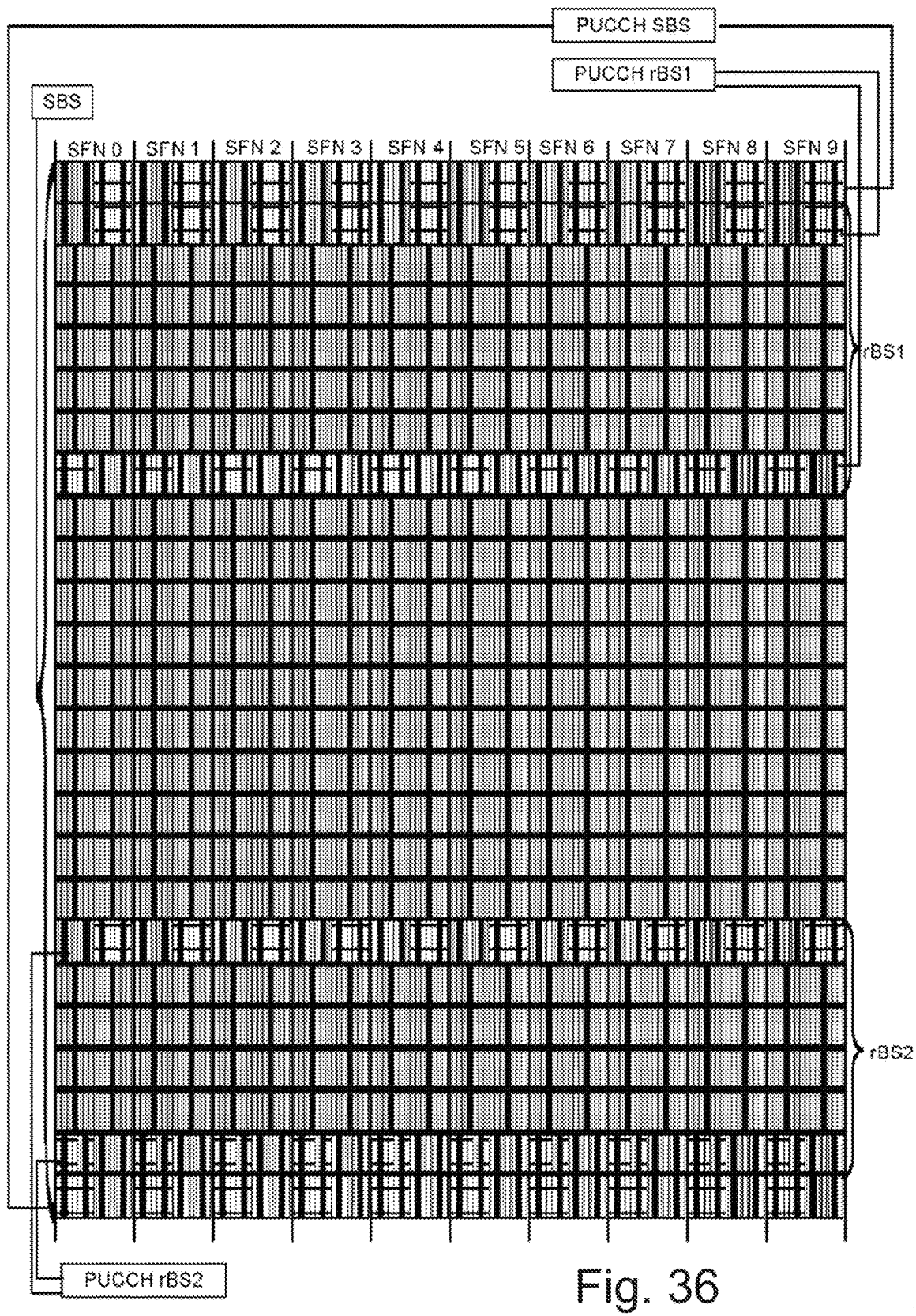

Alternative 4—rUE Requirements may include some or all of:

Support of MCH allocation identification
    Possibility to read SIB13
    Executes measurements and sends them to rRM FIGS. 35 and 36 illustrate a DL and a UL resource (time and frequency) grid, respectively, and an optional method for separating between SBS and rBS (base station functionality) in both UL and DL (uplink and downlink) Certain embodiments are further described hereinbelo10w.

The term "mobile (communication) device" as used herein is intended to include but not be limited to any of the following: mobile telephone, smart phone, play-station, iPad, TV, remote desktop computer, game console, tablet, mobile e.g. laptop or other computer terminal, embedded remote unit.

Referring again to FIGS. 10a-10b, use of a Dedicated scheduler, e.g. as shown and described herein, in both UL and DL is now further described:

FIG. 7a-7b describes a technique that reuses the lower and upper band borders of the SBS band. In the illustrated example, relays T1 and T2 are allocated (for 5 Mhz in the example) in the lower and upper borders of the allocated SBS BW (20 Mhz in the example). This technique can be used also with 1.4/3/5 Mhz BW allocation for the relay and 20/10 Mhz for the SBS.

When an SBS receives reports of interference from its registered UEs e.g. by getting measurement reports, e.g. interference in the lower or upper bounds of the bandwidth assigned to the base station, the SBS typically prefers to allocate resources e.g. RB to areas deemed to be free of interference, e.g. in the center of the bandwidth assigned to the base station to a UE which tends to be aware of interference in these areas and to allocate areas deemed to suffer from interference to other UEs which are not reporting interference. For example, when the SBS serves UEs that are located in the cell coverage of the SBS, measurement reports may arrive which indicate interference in the lower or upper bounds of the BW. In this case the SBS may prefer to allocate RB that are located in an area where there is no interference by the relay, for example in the median area that is not interfering with the relay station.

Synchronization of time between the SBS and the relay stations T1 and T2 may improve synchronization of the mobile station functionality (rUE) collocated with the relay station, to the relay's serving station (SBS in the example). Typically, coordination is provided between different base stations' scheduler in order to minimize interference between these schedulers.

FIG. 10a depicts an example of a distributed coordinated scheduler. The scheduler correlates between resources required via the UEs (UE1, UE2, UE3, UE4 in the illustrated embodiment) and the available backhauling BW. FIG. 10b depicts the RB map after the scheduling and coordination has been carried out according to BW required and SNR available in each link. In the DL, the serving BS of the rUE1 allocates enough RB in order to forward it to the attached UEs, UE1 and UE2. The BS serving rUE2 allocates enough RB in order to forward it to the attached UEs, UE3, UE4 and rUE1. The coordinated scheduler separates between the DL RB of the backhauling (rUE) from the DL RB of the attached clients. In the illustrated example the rUE1 is receiving data in the DL while its collocated BS keeps these RBs blank and the collocated BS uses RBs that are not used by its collocated rUE. In the UL the method may be similar: the rUE may employ RB that are not assigned to attached UEs and the colocated BS does not use RB that are assigned to the rUE. Typically, special coordination between BSs is provided in order to achieve significant orthogonality between BSs. This may for example be accomplished using the following method:

1. Using a small constant bit rate predefined control channel to inform attached relays about the next incoming RB. For as long as the rUE listens to the predefined channel the collocated BS is silent. The predefined control channel may be used for both DL and UL signalling 2. Once the control information is sent the scheduler knows the amount of data and where in the map the backhauling information resides and in that way thes scheduler keeps that portion of the map blank for the access channels.

This technique may add some delay e.g. one or more TTI, but gains flexibility and dynamics that enable allocation of RB according to backhauling needs without interfering with the access data channels.

Referring again to FIG. 11, typical considerations pertaining to Synch signals and PBCH channel are now further described: In LTE the dedicated coordinated scheduler can be implemented on data that is sent over the PUSCH (physical uplink shared channel) and PDSCH (physical downlink shared channel). Suitable adjustments may be made, mutatis mutandis, if other physical channels are employed. The PBSCH is in the first subframe of each frame in the main six RBs, separating different relays, and BS having different center frequency is described e.g. in FIGS. 6a-7b and 35-36. In the event that the base stations and relay station are using the same frequency and band, the synchronization channel and PBSCH of the interfered base station are typically not synchronized to the rUE's serving base station synchronization channel and PBSCH channel. This may be effected, e.g. by shifting the access channel from the backhauling channels by one subframe.

Referring again to FIGS. 13a-13b, Handling of PDCCH, according to certain embodiments, is now further described:

The PDCCH channel is present through the entire bandwidth. It may be allocated in symbol1, symbol1-symbol2, symbol1-symbol3 or in symbol1-symbol4 of every subframe; the various allocation formats typically being determined by the BW and/or the PDCCH format.

An individual rBS, within a given relay station, is typically operative to blank some of the PDCCH symbols in order to enable the rUE to decode the PDCCH symbols of the base station which serves the individual rBS. While this technique is not part of the standard, it is operative nonetheless because the UE assumes that if it cannot decode PDCCH channel then there is no related information to it. Other options for separating between the PDCCH symbols of the collocated rBS and the serving rBS\BS may be employed, alternatively or in addition. For example, the separation may be effected by shifting 1 symbol. In order to reduce interference, additionally, between other physical channels such as P-SS S-SS and BCH it is typically better to shift by, say, 15-16 symbols e.g. as depicted in FIG. 13b. It is also possible to reduce the interference in the RS and thereby improve channel estimation computation of the rUE in SISO mode by using any of the four standard antenna ports getting 4 available colors for each neighboring cell or 2 colors in case of MIMO 2*2. 2 colors are typically enough because typically, what needs to be separated is the RS of the collocated BS vs. the RS received by the rUE from its serving BS. In the event that the rUE is handed over to a base station having the same antenna port as its collocated BS antenna ports, the collocated BS typically changes its antenna port to the alternate one.

Referring again to FIG. 15, considerations for handling PUCCH, according to certain embodiments, are now further described:

On the uplink, separation on the PUSCH may be effected by using the dedicated scheduler of FIG. 10b in order to separate the PUCCH channel. The method of FIG. 36 may be employed, or time divisions areas may be added where the rUE is able to send PUCCH messages and the rBS attached UEs do not use it. The RACH physical channel allocates 6 RB in the map, in the illustrated embodiment. It is possible to allocate different 6 RB, having different timing, frequency or both, so as to gain separation between the RACH channel of the collocated BS and the RACH channel of the rUE's serving BS.

Coordination, e.g. in the uplink, between different network entities, according to certain embodiments, is now further5 described:

In order to coordinate between the different schedulers it is possible to choose the BS that the rUE attached to it as the coordinator and all attached rUEs as the coordinated clients. This means that the serving base station is responsible for getting the backhauling requirements in advance (minimum one subframe ahead) and allocating the resources to the clients. It is the coordinator's responsibility to divide the resources between the coordinated clients and send the allocated resources map to the coordinated clients. The rUE's receive the allocated resource map and forward such to the collocated base station. When a base station receives the allocation map, that base station knows the available PDSCH RB and PUSCH RB for access and the allocated PDSCH RB and PUSCH RB for backhauling for the next N TTI. In particular, that base station knows what PDCCH symbols are to be blanked. The BS also receives, where appropriate, the time shift to be effected and an indication of where to place the PRACH and PUCCH channel. Requirements may for example be sent to the coordinator using a constant GBR (garneted bit rate) or SPS (semi-persistent scheduling) channel.

Figure 31:
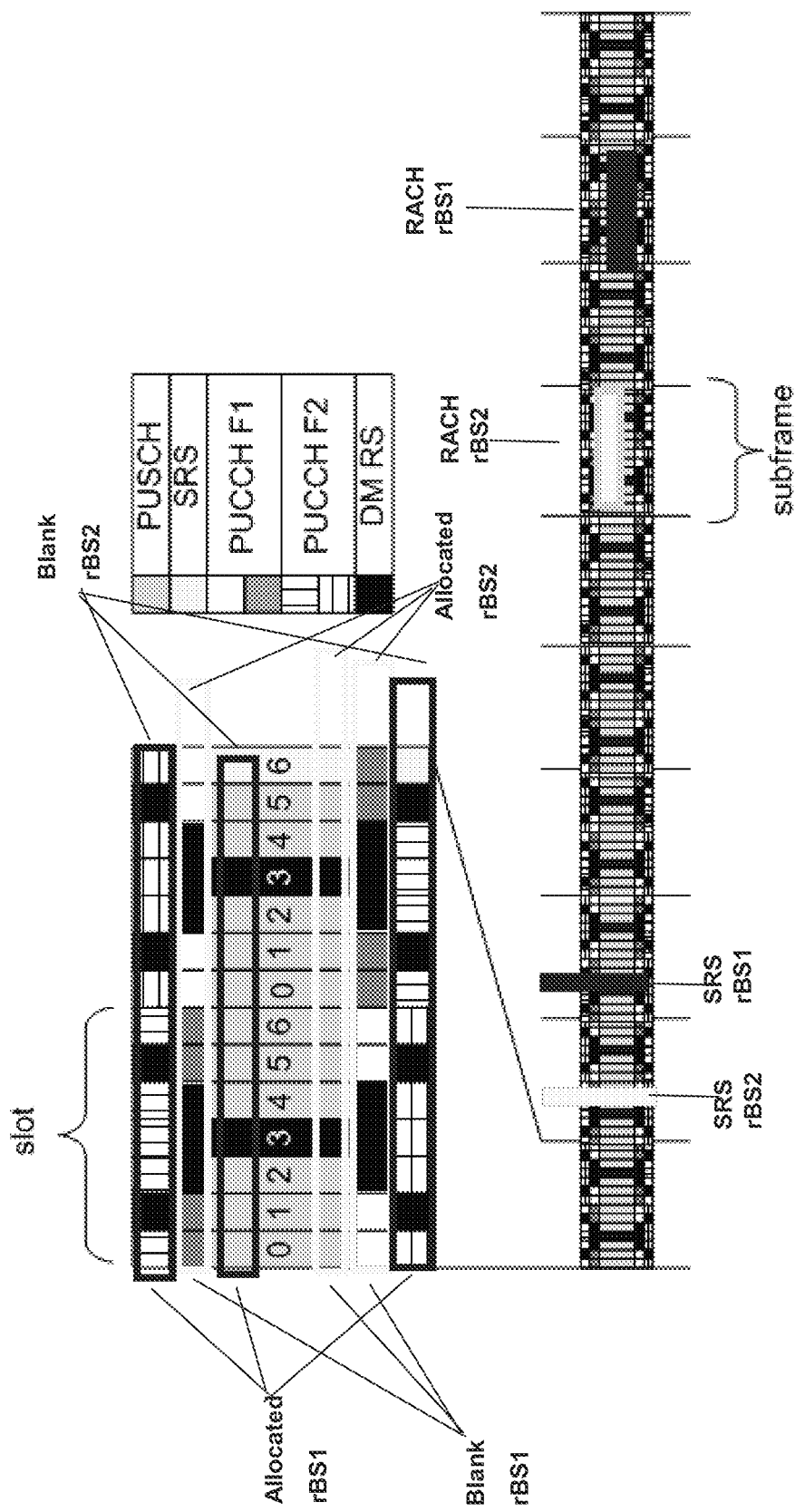

The above embodiment may for example be used in conjunction with the embodiment of FIG. 11 and/or in conjunction with the embodiment of FIG. 31 which pertains to a Dedicated Scheduler (UL example).

Referring again to FIG. 20, it is appreciated that the embodiment of FIG. 20 is operative for minimizing interference between rUE and its collocated rBS in a relay node using, typically, an MBSFN subframe in order to send backhauling data. The SBS typically has a collocated US UE which resides, typically, in an iRelay (inverse relay) Proxy. The US UE is responsible for receiving backhauling data sent by relay nodes on the UL to the core network using MBSFN subframes. The iRelay Proxy may receive the data and forward it as if it were sent by the eNB which resides in the iRelay. On the DL, the backhauling data is sent over MBSFN suframe. The US UE which resides in the iRelay receives the MBSFN subframe, and forwards the data to the management layer. The management layer is responsible for sending the backhauling data that is relevant to the collocated eNB to the collocated eNB and for forwarding the backhauling data that is relevant to the next hop over another MBSFN channel using the collocated eNB.

Referring again to FIG. 21, it is appreciated that this embodiment is operative for using MBSFN subframes in order to send backhauling data. In the illustrated example the stationary base which resides in the iRelay sends backhauling information that is relevant to the second iRelay, whereas the second and the stationary base station sends blank MBSFN subframe. The stationary base station sends backhauling information to the iRelay station on an additional subframe and is received by the UE which resides in the iRelay.

Referring again to FIG. 24 which shows Alternative 3 which employs use of MBSFN—DL, here too, the embodiment described just above with reference to FIG. 21, may be employed.

Referring again to FIG. 22 which illustrates Alternative 3—Using MBSFN—UL, it is appreciated that the method on the UL may be similar to that described previously. The bottom relay station may employ an MBSFN subframe in order to send UL backhauling data using its base station functionality, while all other neighboring base station are sending a blank subframe. The backhauling UL data is typically received by the UE of the second relay and forwarded, when its time comes, using its preserved subframe while all other neighboring base stations are sending blank subframes.

Reference is again made to FIG. 33 which is a detailed block diagram of relay resource manager (rRM) of a relay (and also, optionally, to FIGS. 27-29 and 34). As shown, the relay resource manager typically comprises some or all of: a Tunneling subsystem, Radio Resource subsystem, Virtual core subsystem and Routing and QoS Subsystem, suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces with the mobile station functionality rUE e.g. over a standard IP stack.

The Virtual core subsystem typically constitutes the gateway between the core (stationary) on the one hand, and various resource management subsystems and the base station functionality rBS on the other hand. The Virtual core subsystem may communicate with the base station functionality rBS or core (of the static network) e.g. using standard S1-MME and S1-U or proprietary management and control (M&C) over IP interface with the base station functionality rBS and remote core. The Virtual core subsystem may send some or all of the S1-MME, S1-U, and/or management and control messages to the core e.g. through the Tunneling Subsystem. The Encapsulation manager function of the Virtual core subsystem typically implements a Network event listener and a Network event handler. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received by the Routing and QoS Subsystem to/from the core being used, for example messages to create or delete a bearer.

In addition, the Encapsulation manager function of the Virtual core subsystem may optionally include functionality for exchanging information between the relay resource manager rRM that the Virtual core subsystem resides within element and: (1) another relay resource manager located inside another relay, and/or (2) Relay/s Server located as part of the static network. The Virtual S-GW and Virtual MME may have corresponding standard S-GW and MME interfaces with the base station functionality rBS accordingly. If a remote core is used by the relay, the Virtual S-GW and Virtual MME may emulate these core functions as proxies so that the base station functionality rBS works smoothly and seamlessly despite remoteness of the core.

The Routing & QoS subsystem may comprise some or all of a routing agent, Load manager and QoS Agent. Routing & QoS subsystem communicates with the mobile station functionality (rMS) e.g. using AT Commands or any suitable proprietary interface. Routing & QoS subsystem communicates with the base station functionality rBS e.g. using the M&C interface. Using the M&C interface the Routing and QOS subsystem may command a change in various parameters in the base station functionality rBS 4740 such as PLMN, and/or may command the base station functionality rBS 4740 to initiate a handover mechanism of an attached mobile station. Using the mobile station functionality (rMS) interface the Routing and QoS subsystem may receive radio measurements of served base stations or neighboring base stations, and may send fake radio measurements to the mobile station functionality (rMS) that the mobile station functionality may send to its serving base station in order to intervene with the handover mechanism. Routing and QoS subsystem may register to specific access point names (APN) and/or create additional bearers.

The Load manager is operative for balancing traffic loads between different relays. Load manager 4729 may perform actions such as but not limited to: indicating other relay resource manager elements such as but not limited to any or all of: Radio Resource Subsystem 4714, Routing agent 4727, QoS agent 4730 or Encapsulation manager (block of the Virtual Core Subsystem 4715 or mobile station functionality 4741 or base station functionality rBS 4740 or mobility management entity MME of remote core (of the static network or) that which current site loaded. Load manager 4729 may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent is operative for creating bearers according to the current attached mobile stations and their bandwidth requests in case there is a need for a additional bearer due to the multi-hop mechanism.

The Radio Resource Subsystem 4714 may comprise some or all of: Radio resource manager 4724, Radio Quality and Arena Reporter 4725 and Radio Resource Controller 4726. The radio resource subsystem 4714 is operative for reducing interference between: (1) relay's access links which may be sent and received by the base station functionality rBS 4740) and relay's backhauling links which may be sent and received by the rUE (rMS) 4740; (2) relay's access links and other relays' access links; and (3) relay backhauling links and other relays' backhauling links. The Radio resource controller 4726 is operative for controlling different radio resources of the mobile station functionality rUE 4741 and of base station functionality rBS 4740 e.g. some or all of: lower base station functionality transmission power, blanking particular base station functionality resource blocks/subframe/s, request for mobile station functionality uplink grant, changing center frequency, changing bandwidth.

The Radio Quality and Arena Reporter may be operative for gathering a radio measurement report indicating received power reports of the base station functionality rBS and base station functionality rBS's neighboring base stations from the connected mobile stations reporting to the base station functionality rBS and from the mobile station functionality rUE. The radio measurement report may indicate one or more of: the mobile station functionality's serving base station's radio measurements; and/or radio measurements of mobile station functionality rUE's active set, e.g. list of neighboring base stations that mobile station functionality rUE is operative to measure periodically. The Radio Resource Subsystem sends the measurement report through the interface to the Virtual Core subsystem, typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter and from neighboring relays' Radio quality and arena reporters. The radio resource manager may compute the level of interference between the various stations, e.g. of relays and optionally of the static network. The radio resource manager may also provide radio resource configuration recommendations to its local radio resource controller and/or to its neighboring relays' radio resource controller/s through interface and using the encapsulation manager of the Virtual core subsystem.

The Radio resource manager can optionally communicate in interface e.g. using AT Commands or other proprietary protocol with the mobile station functionality rUE 4741. The Radio resource manager can further optionally communicate via an interface e.g. using M&C protocol with the base station functionality rBS. The Radio resource manager can further optionally communicate with other relays' radio resource subsystems through an interface e.g. using the virtual core subsystem Encapsulation manager.

The tunneling, Routing & QoS and Radio Resource Subsystems are of course optional subsystems of the relay resource manager rRM. All, none or any subset of these subsystems can be added to the relay resource manager rRM as per need.

The relay resource manager (rRM) of a relay may have an internal router service application for multi-hop encapsulation. This router service application can be added to the upgraded relay to enable it to do extended tunnels for multi-hop encapsulation.

Alternatively or in addition, the RRM may also be constructed and operative in accordance with any of the teachings of published PCT Application No. PCT/IL2012/050082 "Moving cellular communication system operative in an emergency mode" filed 8 Mar. 2012.

Referring again to FIGS. 35-36 which illustrate a DL and a UL resource (time and frequency) grid, respectively, and an optional method for separating between SBS and rBS (base station functionality) in both UL and DL (uplink and downlink), Certain embodiments are now further described:

FIGS. 35-36 illustrate a detailed possible implementation of the UL and DL LTE frame given the scenario of FIGS. 7a-7b by way of example. FIG. 35 illustrates an LTE DL frame map where rBS1 is allocated in the upper 5 Mhz boundary and rBS2 is allocated in the lower 5 Mhz boundary. FIG. 36 illustrates an LTE UL frame map where the PUCCH of the SBS is in the lower and upper regions of the allocated BW. The first RB (RB #1) and last RB (RB #N), rBS1 and rBS2, use the lower and upper bands of their allocated BW respectively. In the example the rBS's are allocated 1.4 Mhz and the SBS is allocated 5 Mhz so the SBS uses RB #0 and RB #24 for the PUCCH channel, rBS1 uses RB #1 and RB #6 and rBS2 uses RB #18 and RB #23 respectively. This technique is also applicable for different BW, mutatis mutandis, e.g. 5 Mhz for the rBS and 20 Mhz for the SBS. Typically, the areas used in the rBS for PUCCH and in the SBS for PUSCH will be unused for PUSCH, otherwise the PUCCH messages will interfere with the PUSCH messages. Maintaining these areas as unused may be achieved by directing the scheduler to the relevant areas or this may be done automatically e.g. responsive to interference that the SBS senses in the areas of the PUCCH. In this way the scheduler reduces interference in the PUCCH channel between the rBS and SBS.

For brevity, some embodiments are described herein only for downlink. However, it is appreciated that these same embodiments may be employed, mutatis mutandis, for uplink as well.

It is appreciated that certain embodiments of the present invention are particularly useful in reducing interference in control channels, as opposed to existing systems which reduce interference for data channels, PUSCH and/or PDSCH channels and the like.

Methods depicted herein by flowcharts may comprise some or all of the illustrated steps, suitably ordered e.g. as illustrated.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. A node may for example be any node in a cellular communication network e.g. wireless hierarchical communication network. A relay is an example of a node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for multicarrier cellular communication in an LTE cellular network including a multiplicity of nodes including a plurality of moving relays, the system comprising:

at an individual moving relay from among the plurality of moving relays, an rBS having downlink communication, according to an LTE protocol, with UEs served thereby; and a co-located rRM (relay Resource Manager) having a controller; and a scheduler;

wherein said controller is operative to induce said rBS to coordinate between schedulers in at least some of the plurality of moving relays to ensure that each user has its own time and/or frequency such that channels do not overlap because time and/or frequency are shifted to prevent said overlap, wherein separation of different resources assigned to different nodes respectively is achieved Using a Dedicated Scheduler, wherein at least one relay that can monitor two adjacent relays, detects when those two adjacent relays are operating in the same center frequency, and coordinates them so that one of them changes its center frequency to a free center frequency, wherein coordination in the uplink, between different network entities is provided and wherein, in coordinating between the different schedulers the BS that the rUE is attached to is selected as the coordinator and all rUEs attached thereto are deemed coordinated clients and wherein the serving base station is configured for getting backhauling requirements in advance and allocating resources to said clients and wherein the coordinator is configured to divide resources between the coordinated clients and send the allocated resources map to the coordinated clients, and wherein the rUE's receive the allocated resource map and forward said map to the collocated base station and wherein, when a base station B receives the allocation map, base station B knows the available PDSCH RB and PUSCH RB for access and the allocated PDSCH RB and PUSCH RB for backhauling for the next N TTI and knows what PDCCH symbols are to be blanked and wherein the BS also receives, at least once, a time shift to be effected and an indication of where to place the PRACH and PUCCH channel.

2. A system according to claim 1, wherein the individual node also comprises an rUE (relay User Equipment, also termed herein relay's mobile station functionality) and wherein at least one additional node within the multiplicity of nodes is close enough to said individual node such that an additional rBS residing at the additional node communicates with said rUE, and wherein said individual node's controller is also operative to induce said additional rBS to generate a selective quiet region in a domain.

3. A system according to claim 2, wherein said individual node's controller is also operative to induce said additional rBS to generate a selective quiet region in a domain, by:
   instructing the additional rBS, via the individual node's rUE, to employ an rRM-controllable channel for downlink communication in said region, wherein said rRM-controllable channel's content is controlled by an additional rRM residing at the additional node; and
   via the individual node's rUE, instructing the additional rRM to assign blank content to said rRM-controllable channel for downlink communication in said region;
   wherein the said individual's node controller is operative to determine whether it is the individual node, or some other node, which is responsible for inducing said additional rBS to generate a selective quiet region, by comparing said individual node to at least one characteristic of at least one other node, obtained from the individual nodes' rUE.

4. A system according to claim 3, wherein said selective quiet region is selected to enable the individual node's rBS to communicate with UEs served thereby and also to enable nodes within interference range of the individual node to communicate with UEs served by the nodes respectively, all with tolerable interference.

5. A system according to claim 2, wherein said individual node's controller is also operative to induce said additional rBS to generate a selective quiet region in a domain, by: instructing the additional rUE residing at the additional node, via the individual node's rBS, to employ an rRM-controllable channel for downlink communication in said region, wherein said rRM-controllable channel's content is controlled by an additional rRM residing at the additional node; and via the individual node's rBS, instructing the additional rRM to assign blank content to said rRM-controllable channel for downlink communication in said region, and
   wherein said node's controller is also operative to induce bi-directional communication between said individual and additional nodes by generating a selective first quiet region ("individual node quiet region") in a domain by the individual rBS in whose first quiet region the additional node rBS can first transmit a downlink channel to the individual node rUE, and, optionally in parallel and/or simultaneously, instructing the additional node rBS to generate a second quiet region in a domain in whose second quiet region the individual node rBS can transmit a second downlink channel to the additional node rUE.

6. A system according to claim 2, wherein said individual node's controller is operative to induce said additional rBS to generate a selective quiet region in a domain only if a predetermined rule stipulates that the individual node is responsible for inducing said additional rBS to generate a selective quiet region.

7. A system according to claim 1, wherein said controller is operative to induce said rBS to generate a selective quiet region in a domain by: instructing the rBS to employ an rRM-controllable channel whose content the rRM controls, for downlink communication in said region; and assigning blank content to said rRM-controllable channel for downlink communication in said region.

8. A system according to claim 7, wherein said rBS is operative to determine content of at least one control channel, so as to ensure that the rRM-controllable channel is employed for downlink communication in said region.

9. A system according to claim 7, wherein according to the protocol, at least one compulsory control channel is used for downlink communications and wherein said rRM-controllable channel is selected to be a channel which minimizes content travelling over the compulsory control channel at least when blank content is assigned to rBS-controllable channel.

10. A system according to claim 1, wherein said protocol comprises a 3GPP protocol operating in MBMS broadcast mode, said rBS comprises an eNB and wherein said rRM comprises an MCE.

11. A system according to claim 1,
    wherein the individual's node controller is operative to compare the individual node to at least one characteristic of at least one other node, obtained from the individual nodes' rUE, and
    wherein the individual node also comprises a mobile station functionality and wherein at least one additional node within the multiplicity of nodes is close enough to said individual node such that an additional base station functionality residing at the additional node communicates with said mobile station functionality, and wherein said individual node's controller is also operative to induce said additional base station functionality to generate a selective quiet region in a domain by:
    instructing the additional rBS, via the individual node's mobile station functionality, to employ an rRM-controllable channel for downlink communication in said region, wherein said rRM-controllable channel's content is controlled by an additional rRM residing at the additional node; and
    via the individual node's mobile station functionality, instructing the additional rRM to assign blank content to said rRM-controllable channel for downlink communication in said region,
    wherein said individual node's controller is operative to induce said additional base station functionality to generate a selective quiet region in a domain only if a predetermined rule stipulates that the individual node is responsible for inducing said additional base station functionality to generate a selective quiet region,
    wherein said characteristic comprises a Cell ID and wherein said predetermined rule stipulates, for a given set of Cell IDs, which Cell ID in the set, hence which node's controller, is responsible for inducing said additional rBS to generate a selective quiet region, and
    wherein said set of Cell IDs comprises all Cell IDs of a set of potentially mutually interfering nodes including the individual node and the nodes currently within interference range of the individual nodes, and wherein the controller of the node whose Cell ID is responsible according to said rule, is operative to induce rBS s of each node whose Cell ID is included in said set of Cell IDs, to generate quiet regions selected to enable the individual node's rBS to communicate with UEs served thereby and also to enable nodes within interference range of the individual node to communicate with UEs served by the nodes respectively, all with tolerable interference.

12. A system according to claim 1,
    wherein the individual's node controller is operative to compare the individual node to at least one characteristic of at least one other node, obtained from the individual nodes' rUE, and
    wherein the individual node also comprises a mobile station functionality and wherein at least one additional node within the multiplicity of nodes is close enough to said individual node such that an additional base station functionality residing at the additional node communicates with said mobile station functionality, and wherein said individual node's controller is also operative to induce said additional base station functionality to generate a selective quiet region in a domain by:

instructing the additional rBS, via the individual node's mobile station functionality, to employ an rRM-controllable channel for downlink communication in said region, wherein said rRM-controllable channel's content is controlled by an additional rRM residing at the additional node; and via the individual node's mobile station functionality, instructing the additional rRM to assign blank content to said rRM-controllable channel for downlink communication in said region, wherein said individual node's controller is operative to induce said additional base station functionality to generate a selective quiet region in a domain only if a predetermined rule stipulates that the individual node is responsible for inducing said additional base station functionality to generate a selective quiet region, wherein an individual node's rBS is operative to broadcast said characteristic in a region within a domain which is at least partly randomly selected, thereby to ensure that statistically, nodes within a communication range each broadcast said characteristic at a different time, wherein an individual node's rBS is operative to broadcast said characteristic in a region within a domain which is a first region which conforms to at least one requirement, thereby to facilitate parsimonious allocation of the domain, wherein said requirement includes ensuring that control information broadcast by one of several nodes within a communication range, does not override control information broadcast by any other one of the nodes within the communication range, and wherein said region is defined within a time domain and wherein an individual node's rBS is operative first to wait an entire frame to determine which subframes are available given other nodes within communication range and in a frame succeeding said entire frame, to broadcast said characteristic at a delayed location, within a first subframe from among said subframes found to be available after waiting a random time period, wherein said delayed location is selected to adhere to said requirement.

13. A system according to claim 1, employing an algorithm of detection and selection of transmission time on the DL side of a starting symbol, wherein the algorithm detects the symbol time offset according to the transmission of the neighboring cells.

14. A system according to claim 1, which is operative for using rUE measurements in order to determine scheduling of DL\UL resources.

15. A system according to claim 1, which is operative for shifting of frames and/or symbols in order to reduce mutual interference between cells.

16. A system according to claim 1, which includes a dynamic power control mechanism for mobile base stations which is operative to reduce at least one of: network interfering and/or battery power consumption.

17. A system according to claim 1, wherein the cellular network is operative to support multi-hop communication and wherein the controller in each of at least some relays is operative to coordinate topology and not only to coordinate requirements, thereby to facilitate said multi-hop communication.

18. A system according to claim 1, wherein some frequencies are unused at specific times and wherein, as a result, some frequencies and some time-slots are assigned to backhauling whereas other frequencies and other time-slots are assigned to access.

19. A system according to claim 1, wherein the time-synchronized set of nodes also includes a grandson node which is a son of the son node and is time-synchronized to the son and to the ancestor in that at least some frames transmitted by the grandson are time-shifted relative to frames transmitted by the ancestor thereby to define ancestor-son-grandson time-shifts and wherein the ancestor-son-grandson time-shifts for at least some frames are selected to ensure that at least one ancestor-transmitted subframe which includes control data temporally coincides with at least a portion of a subframe in which both the son and the grandson are constrained not to transmit control data.

20. A system according to claim 1, wherein a dedicated adjustment channel is used to allocate channels and transfer allocations at a rate that is suitable for the scheduler.

21. A system according to claim 1, wherein separation of different resources assigned to different nodes respectively is achieved Using a Dedicated Scheduler is characterized by changes at a physical-layer level.

22. A system according to claim 1, wherein a dedicated scheduler is used for dynamically allocating time-deflected (shifted) subframes in downlink.

23. A system according to claim 1, wherein a dedicated scheduler is used for dynamically allocating PUSCH and PUCCH channels.

24. A system according to claim 1, wherein a dedicated scheduler uses MBSFN channels as almost blank subframes in DL due to lack of transmission of CRS in MBSFN.

25. A system according to claim 1, wherein separation in space and frequency is increased to enhance performance.

26. A system according to claim 1, wherein an antenna and IC mechanisms are used to isolate control and CRS messages.

27. A system according to claim 1, wherein a base station is selected to be a coordinator operative to coordinate between plural schedulers thereby to define the coordinator's attached rUEs as coordinated clients and wherein the coordinator is operative to divide resources between said coordinated clients and send the allocated resources map to said coordinated clients.

28. A system according to claim 1, wherein coordination is provided between plural base stations' schedulers to minimize interference between said schedulers.

29. A system according to claim 1, wherein once control information is sent the scheduler knows an amount of data and a map portion where the backhauling information resides and the scheduler is operative to keep said map portion blank for access channels.

30. The system of claim 1, wherein the first transmitter comprises the ancestor and the second transmitter comprises the son.

31. The system of claim 1, wherein the first transmitter comprises the son and the second transmitter comprises the ancestor.

32. The system of claim 1, wherein the synchronization subsystem provides Time synchronization with the radio resource subsystem and with rUE.

33. A method for multicarrier cellular communication in an LTE cellular network including a multiplicity of nodes including a plurality of moving relays, the method comprising:
- providing at an individual moving relay from among the plurality of moving relays, an rBS having downlink communication, according to an LTE protocol, with UEs served thereby; and
- a co-located rRM (relay Resource Manager) having a controller; and
- a scheduler;
- wherein said controller is operative to induce said rBS to coordinate between schedulers in at least some of the plurality of moving relays to ensure that each user has its own time and/or frequency such that channels do not overlap because time and/or frequency are shifted to prevent said overlap,
- wherein the individual moving relay comprises a cellular communication network node including an antenna, transmitter and receiver and functioning both as a mobile communication device and a base station,
- wherein the scheduler generates a resource block map taking into account at least (a) resources required by user entities pertinent to said overlap; (b) available backhauling bandwidth and (c) bandwidth required and SNR (signal noise ratio) available in each link,
- wherein the multiplicity of nodes includes at least one time-synchronized set of nodes including an ancestor node and a son node which is a son of the ancestor node and is time-synchronized to the ancestor in that at least some frames transmitted by the son are time-shifted relative to frames transmitted by the ancestor thereby to define an ancestor-son time-shift,
- wherein the time-shift is selected, for at least some frames, to be a time-shift which causes at least one ancestor-transmitted subframe which includes control data to temporally coincide with at least a portion of a subframe in which the son is constrained not to transmit control data,
- the method also including providing a synchronization subsystem, configured for performing an individual blanking scheme from among n schemes which respectively perform cyclic subframe-level blanking with n respective start shifts; and
- wherein a system clock introduces a time shift that shifts at least one start of at least one symbol in at least one frame according to said individual blanking scheme,
- wherein separation of different resources assigned to different nodes respectively is achieved Using a Dedicated Scheduler, and
- wherein at least one relay that can monitor two adjacent relays, detects when those two adjacent relays are operating in the same center frequency, and coordinates them so that one of them changes its center frequency to a free center frequency
- wherein coordination in the uplink, between different network entities is provided and wherein, in coordinating between the different schedulers the BS that the rUE is attached to is selected as the coordinator and all rUEs attached thereto are deemed coordinated clients and wherein the serving base station is configured for getting backhauling requirements in advance and allocating resources to said clients and wherein the coordinator is configured to divide resources between the coordinated clients and send the allocated resources map to the coordinated clients, and wherein the rUE's receive the allocated resource map and forward said map to the collocated base station and wherein, when a base station B receives the allocation map, base station B knows the available PDSCH RB and PUSCH RB for access and the allocated PDSCH RB and PUSCH RB for backhauling for the next N TTI and knows what PDCCH symbols are to be blanked and wherein the BS also receives, at least once, a time shift to be effected and an indication of where to place the PRACH and PUCCH channel.

34. The method of claim 33, wherein the Radio resource controller is operative for controlling at least said lower base station functionality transmission power.

35. The method of claim 33, wherein the Radio resource controller is operative for controlling at least blanking of particular base station functionality resource blocks/subframe/s.

36. The method of claim 33, wherein the Radio resource controller is operative for controlling at least said request for mobile station functionality uplink grant.

37. The method of claim 33, wherein the Radio resource controller is operative for controlling at least said changing of said center frequency.

38. The method of claim 33, wherein the Radio resource controller is operative for controlling at least said changing of said bandwidth.

39. A computer program product, comprising a non-transitory tangible computer readable medium having computer readable program code embodied therein, said computer readable program code adapted to be executed to implement a method for multicarrier cellular communication in an LTE cellular network including a multiplicity of nodes including a plurality of moving relays, the method comprising:
- providing at an individual moving relay from among the plurality of moving relays, an rBS having downlink communication, according to an LTE protocol, with UEs served thereby; and
- a co-located rRM (relay Resource Manager) having a controller; and
- a scheduler;
- wherein said controller is operative to induce said rBS to coordinate between schedulers in at least some of the plurality of moving relays to ensure that each user has its own time and/or frequency such that channels do not overlap because time and/or frequency are shifted to prevent said overlap,
- wherein the individual moving relay comprises a cellular communication network node including an antenna, transmitter and receiver and functioning both as a mobile communication device and a base station,
- wherein the scheduler generates a resource block map taking into account at least (a) resources required by user entities pertinent to said overlap; (b) available backhauling bandwidth and (c) bandwidth required and SNR (signal noise ratio) available in each link, and
- wherein the multiplicity of nodes includes at least one time-synchronized set of nodes including an ancestor node and a son node which is a son of the ancestor node and is time-synchronized to the ancestor in that at least some frames transmitted by the son are time-shifted relative to frames transmitted by the ancestor thereby to define an ancestor-son time-shift, and
- wherein the time-shift is selected, for at least some frames, to be a time-shift which causes at least ancestor-transmitted subframe which includes control data to temporally coincide with at least a portion of a subframe in which the son is constrained not to transmit control data, the method also including providing a synchronization subsystem, configured for performing an individual blanking scheme from among n schemes which respectively perform cyclic subframe-level blanking with n respective start shifts;

wherein a system clock introduces a time shift that shifts at least one start of at least one symbol in at least one frame according to said individual blanking scheme, wherein separation of different resources assigned to different nodes respectively is achieved Using a Dedicated Scheduler, and wherein at least one relay that can monitor two adjacent relays, detects when those two adjacent relays are operating in the same center frequency, and coordinates them so that one of them changes its center frequency to a free center frequency wherein coordination in the uplink, between different network entities is provided and wherein, in coordinating between the different schedulers the BS that the rUE is attached to is selected as the coordinator and all rUEs attached thereto are deemed coordinated clients and wherein the serving base station is configured for getting backhauling requirements in advance and allocating resources to said clients and wherein the coordinator is configured to divide resources between the coordinated clients and send the allocated resources map to the coordinated clients, and wherein the rUE's receive the allocated resource map and forward said map to the collocated base station and wherein, when a base station B receives the allocation map, base station B knows the available PDSCH RB and PUSCH RB for access and the allocated PDSCH RB and PUSCH RB for backhauling for the next N TTI and knows what PDCCH symbols are to be blanked and wherein the BS also receives, at least once, a time shift to be effected and an indication of where to place the PRACH and PUCCH channel.

* * * * *